United States Patent
Johnson et al.

(10) Patent No.: US 10,535,016 B2
(45) Date of Patent: *Jan. 14, 2020

(54) APPARATUS AND METHOD OF IMPLEMENTING BATCH-MODE ACTIVE LEARNING FOR TECHNOLOGY-ASSISTED REVIEW OF DOCUMENTS

(71) Applicant: Legility Data Solutions, LLC, Nashville, TN (US)

(72) Inventors: Jeffrey A. Johnson, Frisco, TX (US); Md Ahsan Habib, The Colony, TX (US); Chandler L. Burgess, Dallas, TX (US); Tanay Kumar Saha, Indianapolis, IN (US); Mohammad Al Hasan, Fishers, IN (US)

(73) Assignee: Legility Data Solutions, LLC, Nashville, TN (US)

( * ) Notice: Subject to any disclaimer, the term of this patent is extended or adjusted under 35 U.S.C. 154(b) by 704 days.

This patent is subject to a terminal disclaimer.

(21) Appl. No.: 15/260,444

(22) Filed: Sep. 9, 2016

(65) Prior Publication Data

US 2017/0116544 A1 Apr. 27, 2017

Related U.S. Application Data

(60) Provisional application No. 62/288,660, filed on Jan. 29, 2016, provisional application No. 62/246,719, filed on Oct. 27, 2015.

(51) Int. Cl.
*G06N 20/00* (2019.01)
*G06N 7/00* (2006.01)
*G06N 3/08* (2006.01)

(52) U.S. Cl.
CPC ............... *G06N 20/00* (2019.01); *G06N 3/08* (2013.01); *G06N 7/005* (2013.01)

(58) Field of Classification Search
CPC .......... G06N 20/00; G06N 20/10; G06N 3/08; G06N 7/005; G06F 16/35
See application file for complete search history.

(56) References Cited

U.S. PATENT DOCUMENTS 6,327,581 B1 * 12/2001 Platt ..................... G06K 9/6256
706/12
6,640,145 B2 * 10/2003 Hoffberg ............ G05B 19/0426
700/17

(Continued)

OTHER PUBLICATIONS

D. W. Henry, "Predictive coding: Explanation and analysis of judicial impact and acceptance compared to established e-commerce methodology," http://www.dwhenry.com/files/Predictive%20Coding.pdf, [Online: Accessed Jun. 23, 2015].

(Continued)

*Primary Examiner* — Kamran Afshar
*Assistant Examiner* — Imad Kassim
(74) *Attorney, Agent, or Firm* — Johnson, Marcou & Isaacs, LLC

(57) ABSTRACT

The present disclosure relates to the electronic document review field and, more particularly, to various apparatuses and methods of implementing batch-mode active learning for technology-assisted review (TAR) of documents (e.g., legal documents).

20 Claims, 23 Drawing Sheets

RECALL (MONEY-FX)

(56) References Cited

U.S. PATENT DOCUMENTS

| | | | | |
|---|---|---|---|---|
| 7,315,826 | B1* | 1/2008 | Guheen | G06Q 10/06 |
| | | | | 705/7.29 |
| 2005/0228783 | A1* | 10/2005 | Shanahan | G06F 16/3347 |
| 2009/0228499 | A1* | 9/2009 | Schmidtler | G06N 20/00 |
| 2010/0010968 | A1* | 1/2010 | Redlich | G06Q 10/00 |
| | | | | 707/E17.014 |
| 2010/0262454 | A1* | 10/2010 | Sommer | G06F 16/355 |
| | | | | 706/20 |

OTHER PUBLICATIONS

S. Tong and D. Koller, "Support vector machine active learning with application to text classification," vol. 2, 2001, pp. 45-66.
S. Tong and E. Chang, "Support vector machine active learning for image retrieval," in Proceedings of the ninth ACM International conference on Multimedia. ACM, 2001, pp. 107-118.
S. Dasgupta, "Coarse sample complexity bounds for active learning," in Advances in Neural Information Processing Systems 18 [Neural Information Processing Systems, NIPS 2005, Dec. 5-8, 2005, Vancouver, British Columbia, Canada], 2005, pp. 235-242.
K. Brinker, "Incorporating diversity in active learning with support vector machines," in ICML, vol. 3, 2003, pp. 59-66.
G. V. Cormack and M. R. Grossman, "Evaluation of machine-learning protocols for technology-assisted review in electronic discovery," in Proceedings of the 37th international ACM SIGIR conference on Research & development in information retrieval. ACM, 2014, pp. 153-162.
G. Salton and C. Buckley, "Improving retrieval performance by relevance feedback," Readings in information retrieval, vol. 24, No. 5, pp. 355-363, 1997.
D. D. Lewis and W. A. Gale, "A sequential algorithm for training text classifiers," in Proceedings of the 17th annual International ACM SIGIR conference on Research and development in information retrieval. Springer-Verlag New York, Inc., 1994, pp. 3-12.
I. Dagan and S. P. Engelson, "Committee-based sampling for training probabilistic classifiers," in Proceedings of the Twelfth International Conference on Machine Learning, 1995, pp. 150-157.
T. Scheffer, C. Decomain, and S. Wrobel, "Active hidden markov models for information extraction," in Advances in Intelligent Data Analysis. Springer, 2001, pp. 309-318.
A. Culotta and A. McCallum, "Reducing labeling effort for structured prediction tasks," in AAAI, 2005, pp. 746-751.
H. S. Seung, M. Opper, and H. Sompolinsky, "Query by committee," in Proceedings of the fifth annual workshop on Computational learning theory. ACM, 1992, pp. 287-294.
R. Nowak, "Noisy generalized binary search," in Advances in neural information processing systems, 2009, pp. 1366-1374.
G. Schohn and D. Cohn, "Less is more: Active learning with support vector machines," in ICML. Citeseer, 2000, pp. 839-846.
M. K. Warmuth, J. Liao, G. Rōatsch, M. Mathieson, S. Putta, and C. Lemmen, "Active learning with support vector machines in the drug discovery process," Journal of Chemical Information and Computer Sciences, vol. 43, No. 2, pp. 667-673, 2003.
S. Dasgupta, "Analysis of a greedy active learning strategy," in Advances in Neural Information Processing Systems 17 [Neural Information Processing Systems, NIPS 2004, Dec. 13-18,2004, Vancouver, British Columbia, Canada], 2004, pp. 337-344.
Y. Chen and A. Krause, "Near-optimal batch mode active learning and adaptive submodular optimization," in Proceedings of the 30th International Conference on Machine Learning, 2013, pp. 160-168.
A. Guillory and J. A. Bilmes, "Active semi-supervised learning using submodular functions," in UAI 2011, Proceedings of the Twenty-Seventh Conference on Uncertainty in Artificial Intelligence, Barcelona, Spain, Jul. 14-17, 2011, 2011, pp. 274-282.
D. Golovin and A. Krause, "Adaptive submodularity: A new approach to active learning and stochastic optimization." in COLT, 2010, pp. 333-345.

A. Asadpour, H. Nazerzadeh, and A. Saberi, "Maximizing Stochastic submodular maximization," in Internet and Network Economics. Springer, 2008, pp. 477-489.
S. Ertekin, J. Huang, L. Bottou, and L Giles, "Learning on the border: active learning in imbalanced data classification," in Proc. of ACM Int. Conf. on Knowledge Management, 2007, pp. 127-136.
S. Ertekin, J. Huang, and C. L. Giles, "Active learning for class imbalance problem," in Proceedings of the 30th annual International ACM SIGIR conference on Research and development in information retrieval. ACM, 2007, pp. 823-824.
J. Zhu and E. H. Hovy, "Active learning for word sense disambiguation with methods for addressing the class imbalance problem." in EMNLP-CoNLL, vol. 7,2007, pp. 783-790.
J. Z. H. Wang and E. Hovy, "Learning a stopping criterion for active learning for word sense disambiguation and text classification," in Third International Joint Conf. on Natural Language Processing, 2008, p. 366.
J. Zhu, H. Wang, and E Hovy, "Multi-criteria-based strategy to stop active learning for data annotation," in Proceedings of the 22nd International Conference on Computational Linguistics—vol. 1. Association for Computational Linguistics, 2008, pp. 1129-1136.
F. Laws and H. Schatze, "Stopping criteria for active learning of named entity recognition," in Proceedings of the 22nd International Conference on Computational Linguistics—vol. 1. Association for Computational Linguistics, 2008, pp. 465-472.
M. Ghayoomi, "Using variance as a stopping criterion for active learning of frame assignment," in Proceedings of the NAACL HLT 2010 Workshop on Active Learning for Natural Language Processing. Association for Computational Linguistics, 2010, pp. 1-9.
M. Bloodgood and K. Vijay-Shanker, "A method for stopping active learning based on stabilizing predictions and the need for user-adjustable stopping," in Proceedings of the Thirteenth Conference on Computational Natural Language Learning. Association for Computational Linguistics, 2009, pp. 39-47.
J. Cohen, "A coefficient of agreement for nominal scales," Educational and psychological measurement, vol. 20, No. 1, pp. 37-46, 1960.
M. Bloodgood and J. Grothendieck, "Analysis of stopping active learning based on stabilizing predictions," arXiv preprint arXiv:1504. 06329, 2015.
H. L. Roitblat, A. Kershaw, and P. Oot, "Document categorization in legal electronic discovery: computer classification vs. manual review," Journal of the American Society for Information Science and Technol-ogy, vol. 61, No. 1, pp. 70-80, 2010.
M. Gabriel, C. Paskach, and D. Sharpe, "The challenge and promise of predictive coding for privilege," in ICAIL 2013 DESI V Workshop, 2013.
M. R. Grossman and G. V. Cormak, "Inconsistent responsiveness determination in document review: Difference of opinion or human error," Pace L. Rev., vol. 32, p. 267, 2012.
M. R. Grossman and G. V. Cormack, "Technology-assisted review in e-discovery can be more effective and more efficient than exhaustive manual review," Rich. JL & Tech., vol. 17, p. 1, 2010.
J. Halskov and H. Takeda, "When to stop reviewing documents in ediscovery cases: The lit i view quality monitor and endpoint detector," in Proc of the Fifth International Conference on Management of Emergent Digital EcoSystems, ser. MEDES '13, 2013, pp. 227-232.
N. Littlestone and M. K. Warmuth, "The weighted majority algorithm," Information and Computation, vol. 108, pp. 212-261, 1994.
Steven C. H. Hoi et al. "Large-Scale Text Categorization by Batch Mode Active Learning" WWW 2006, May 23-26, 2006, Edinburgh, Scotland, pp. 1-10.
Maura R. Grossman et al. "Comments on "The Implications of Rule 26(g) on the Use of Technology-Assisted Review" The Federal Courts Law Review" vol. 7, Issue 1, 2014, pp. 1-29.

* cited by examiner

RECALL (D3)

RECALL (D4)

RECALL (C)

RECALL (ACQ)

RECALL (MONEY-FX)

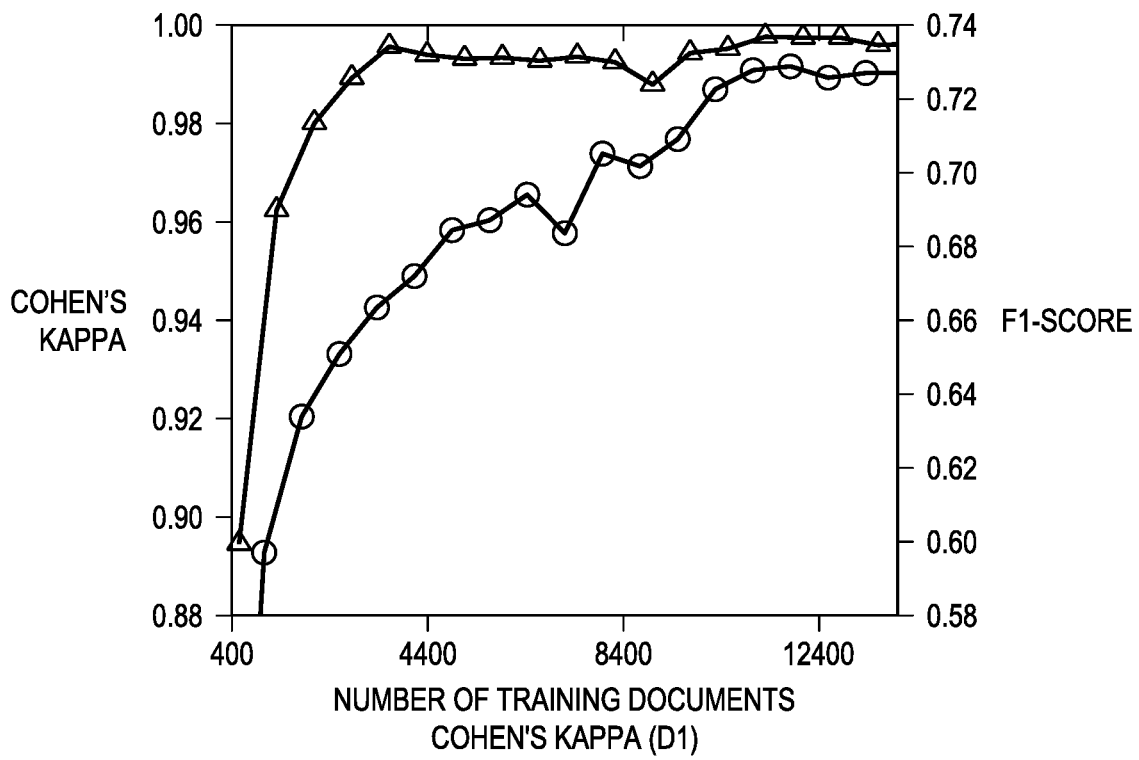
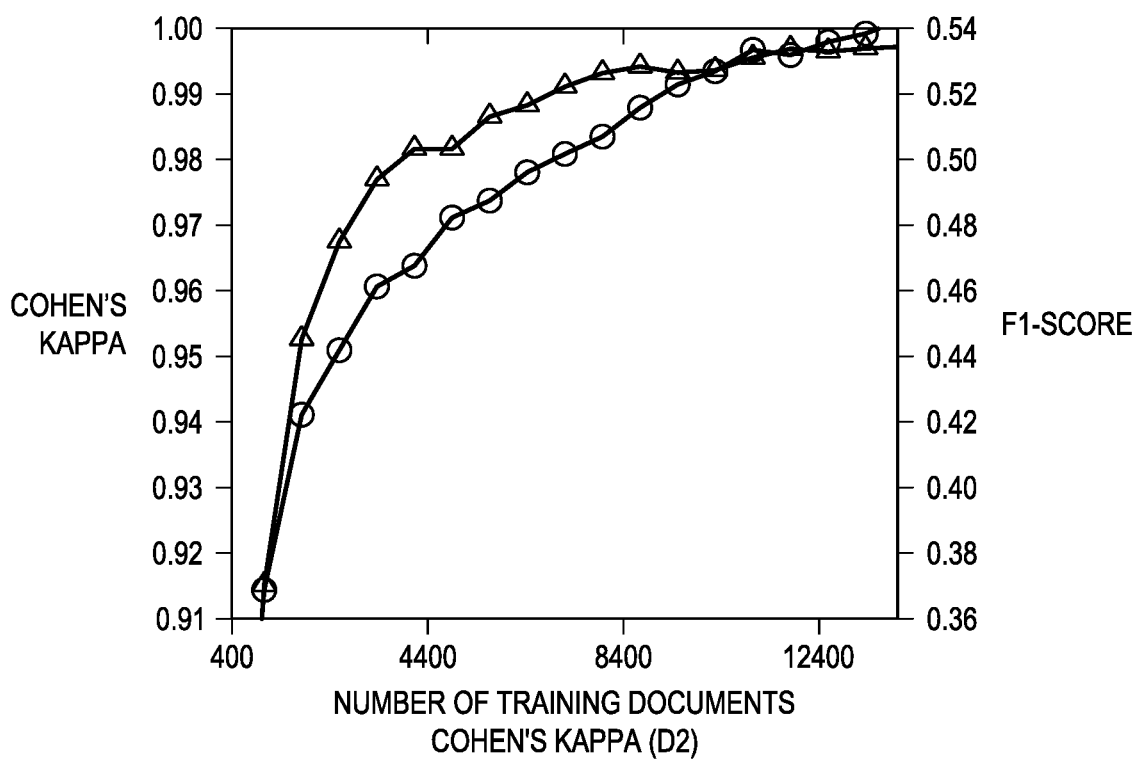

APPARATUS AND METHOD OF IMPLEMENTING BATCH-MODE ACTIVE LEARNING FOR TECHNOLOGY-ASSISTED REVIEW OF DOCUMENTS

CLAIM OF PRIORITY

This application claims the benefit of priority to U.S. Provisional Application No. 62/288,660, filed on Jan. 29, 2016, and to U.S. Provisional Application No. 62/246,719, filed on Oct. 27, 2015, the entire contents of each of these applications are hereby incorporated by reference for all purposes.

RELATED PATENT APPLICATION

This application is related to the co-filed U.S. application Ser. No. 15/260,538, entitled "Apparatus and Method of Implementing Enhanced Batch-Mode Active Learning for Technology-Assisted Review of Documents". The entire contents of this document are hereby incorporated herein by reference for all purposes.

TECHNICAL FIELD

The present disclosure relates to the electronic document review field and, more particularly, to various apparatuses and methods of implementing batch-mode active learning for technology-assisted review (TAR) of documents (e.g., legal documents).

BACKGROUND

The following terms are herewith defined, at least some of which are referred to within the following description of the present disclosure.
BPS Biased Probabilistic Sampler
CAL Continuous Active Learning
DS Diversity Sampler
IR Information Retrieval
LDA Latent Dirichlet Allocation
LSA Latent Semantic Analysis
OCR Optical Character Recognition
ROC Receiver Operating Characteristic
SAL Simple Active Learning
SPL Simple Passive Learning
SVM Support Vector Machines
TAR Technology-Assisted Review
TF-IDF Term Frequency-Inverse Document Frequency In recent years, technology-assisted review (TAR) has become an increasingly important component of the document review process in litigation discovery. This is fueled largely by the dramatic growth in data volumes that may be associated with many matters and investigations. Potential review populations frequently exceed several hundred thousands of documents, and document counts in the millions are not uncommon. Budgetary and/or time constraints often make a once traditional linear review of these populations impractical, if not impossible, which has made "predictive coding" the most discussed TAR approach in recent years. A key challenge in any predictive coding approach is striking the appropriate balance in training the system. The goal is to minimize the time that the subject matter expert(s) spend in training the system, while making sure that the subject matter expert(s) perform enough training to achieve acceptable classification performance over the entire review population. Recent research demonstrates that Support Vector Machines (SVM) perform very well in finding a compact, yet effective, training dataset in an iterative fashion using batch-mode active learning. However, this research is limited. Additionally, these research efforts have not led to a principled approach for determining the stabilization of the active learning process. These needs and other needs are addressed by the present disclosure.

SUMMARY

Various apparatuses and methods for addressing at least the aforementioned needs are described in the independent claims. Advantageous embodiments of the various apparatuses and methods are further described in the dependent claims.

In one aspect, the present disclosure provides an apparatus configured to implement batch-mode active learning for technology-assisted review (TAR) of documents. The apparatus comprises a processor and a memory that stores processor-executable instructions, wherein the processor interfaces with the memory to execute the processor-executable instructions, whereby the apparatus is operable to: (a) obtain an unlabeled set of documents D; (b) obtain a batch size k; (c) construct a first batch of k documents D; (d) obtain labels for the first batch of k documents D, wherein the labeled first batch of k documents D are referred to as training data documents; (e) construct a hyperplane $h_c(x)$ using the labeled first batch of k documents D; (f) perform an iteration of active learning using a support vector machine (SVM), wherein the perform operation comprises: (i) select a new batch of unlabeled instances (documents) $B_c$ using a current version of the hyperplane $h_c(x)$, an unlabeled set of available documents D, and the batch size k; (ii) obtain labels for the new batch of unlabeled instances $B_c$; (iii) add the labeled new batch of instances $B_c$ to a current version of the training data documents referred to as extended training data documents $D_c$; (g) construct an updated hyperplane h(x) using the extended training data documents $D_c$; (h) determine whether a stopping criteria has been met; (i) based on the determination that the stopping criteria has not been met, repeat the perform operation, the third construct operation, and the determine operation; and, (j) based on the determination that the stopping criteria has been met, return the updated hyperplane h(x) (technique 1). In one example, the apparatus can be operable to implement a Diversity Sampler process or a Biased Probabilistic Sampler process to select the new batch of unlabeled instances $B_c$ (technique 2). In another example, the apparatus can be operable to implement a stopping criteria process that is based on a Kappa agreement (equations 1 and 2, or technique 3) or a more general process (technique 3').

In another aspect, the present disclosure provides a method in an apparatus for implementing a batch-mode active learning for technology-assisted review (TAR) of documents. The method comprises the steps of: (a) obtaining an unlabeled set of documents D; (b) obtaining a batch size k; (c) construct a first batch of k documents D; (d) obtaining labels for the first batch of k documents D, wherein the labeled first batch of k documents D are referred to as training data documents; (e) constructing a hyperplane $h_c(x)$ using the labeled first batch of k documents D; (f) performing an iteration of active learning using a support vector machine (SVM), wherein the performing step comprises: (i) selecting a new batch of unlabeled instances (documents) $B_c$ using a current version of the hyperplane $h_c(x)$, an unlabeled set of available documents D, and the batch size k; (ii) obtaining labels for the new batch of unlabeled instances $B_c$;

(iii) adding the labeled new batch of instances $B_c$ to a current version of the training data documents referred to as extended training data documents $D_e$; (g) constructing an updated hyperplane h(x) using the extended training data documents $D_e$; (h) determining whether a stopping criteria has been met; (i) based on the determination that the stopping criteria has not been met, repeating the performing step, the third constructing step, and the determining step; and, (j) based on the determination that the stopping criteria has been met, returning the updated hyperplane h(x) (technique 1). In one example, the method can further comprise implementing a Diversity Sampler process or a Biased Probabilistic Sampler process to select the new batch of unlabeled instances $B_c$ (technique 2). In another example, the method can further comprise implementing a stopping criteria process that is based on a Kappa agreement (equations 1 and 2, or technique 3) or a more general process (technique 3').

In yet another aspect, the present disclosure provides an apparatus configured to implement batch-mode active learning for technology-assisted review (TAR) of documents. The apparatus comprises a processor and a memory that stores processor-executable instructions, wherein the processor interfaces with the memory to execute the processor-executable instructions, whereby the apparatus is operable to: (a) obtain an unlabeled set of documents D; (b) obtain a batch size k; (c) construct a first batch of k documents D; (d) obtain labels for the first batch of k documents D, wherein the labeled first batch of k documents D are referred to as training data documents; (e) construct a classification model, $M_c$, using the labeled first batch of k documents D; (f) perform an iteration of active learning using the classification model $M_c$, wherein the perform operation comprises: (i) select a new batch of unlabeled instances (documents) $B_c$ using a current version of the classification model, $M_c(x)$, an unlabeled set of available documents D, and the batch size k; (ii) obtain labels for the new batch of unlabeled instances $B_c$; (iii) add the labeled new batch of instances $B_c$ to a current version of the training data documents referred to as extended training data documents $D_e$; (g) construct an updated classification model M(x) using the extended training data documents $D_e$; (h) determine whether a stopping criteria has been met; (i) based on the determination that the stopping criteria has not been met, repeat the perform operation, the third construct operation, and the determine operation; and, (j) based on the determination that the stopping criteria has been met, return the updated classification model M(x) (technique 1'). In one example, the apparatus can be operable to implement a Diversity Sampler process or a Biased Probabilistic Sampler process to select the new batch of unlabeled instances $B_c$ (technique 2'). In another example, the apparatus can be operable to implement a general stopping criteria process (technique 3').

In still yet another aspect, the present disclosure provides a method in an apparatus for implementing batch-mode active learning for technology-assisted review (TAR) of documents. The method comprises: (a) obtaining an unlabeled set of documents D; (b) obtaining a batch size k; (c) constructing a first batch of k documents D; (d) obtaining labels for the first batch of k documents D, wherein the labeled first batch of k documents D are referred to as training data documents; (e) constructing a classification model, $M_c$, using the labeled first batch of k documents D; (f) performing an iteration of active learning using the classification model $M_c$, wherein the performing step comprises: (i) selecting a new batch of unlabeled instances (documents) $B_c$ using a current version of the classification model, $M_c(x)$, an unlabeled set of available documents D, and the batch size k; (ii) obtaining labels for the new batch of unlabeled instances $B_c$; (iii) adding the labeled new batch of instances $B_c$ to a current version of the training data documents referred to as extended training data documents $D_e$; (g) constructing an updated classification model M(x) using the extended training data documents $D_e$; (h) determining whether a stopping criteria has been met; (i) based on the determination that the stopping criteria has not been met, repeating the performing step, the third constructing step, and the determine step; and, (j) based on the determination that the stopping criteria has been met, returning the updated classification model M(x). In one example, the method can further comprise implementing a Diversity Sampler process or a Biased Probabilistic Sampler process to select the new batch of unlabeled instances $B_c$ (technique 2'). In another example, the method can further comprise implementing a general stopping criteria process (technique 3').

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings:

FIGS. 5A-5F are graphs illustrating stabilization assessment results for matter D1 (FIG. 5A), matter D2 (FIG. 5B), matter D3 (FIG. 5C), matter D4 (FIG. 5D), matter C (FIG. 5E), and matter ACQ (FIG. 5F) obtained when conducting an experiment in accordance with an embodiment of the present disclosure;

Figure 6:
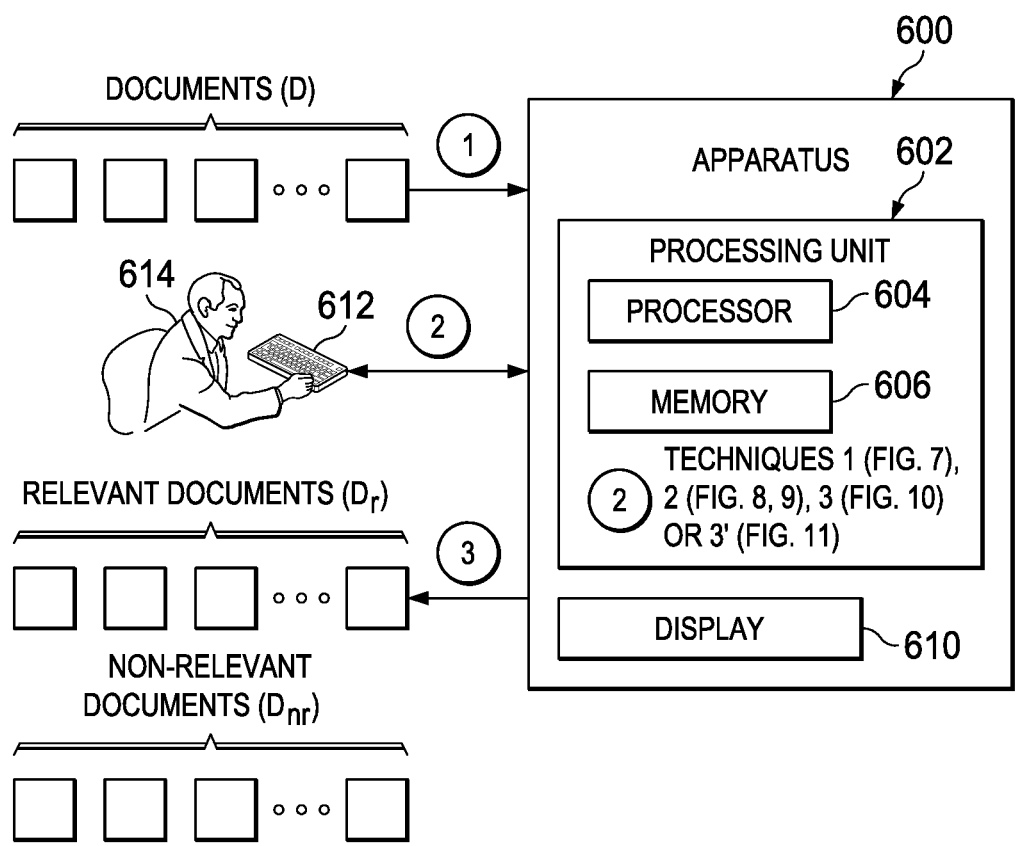
FIG. 6 is a diagram of an exemplary apparatus configured in accordance with an embodiment of the present disclosure.
Figure 9:
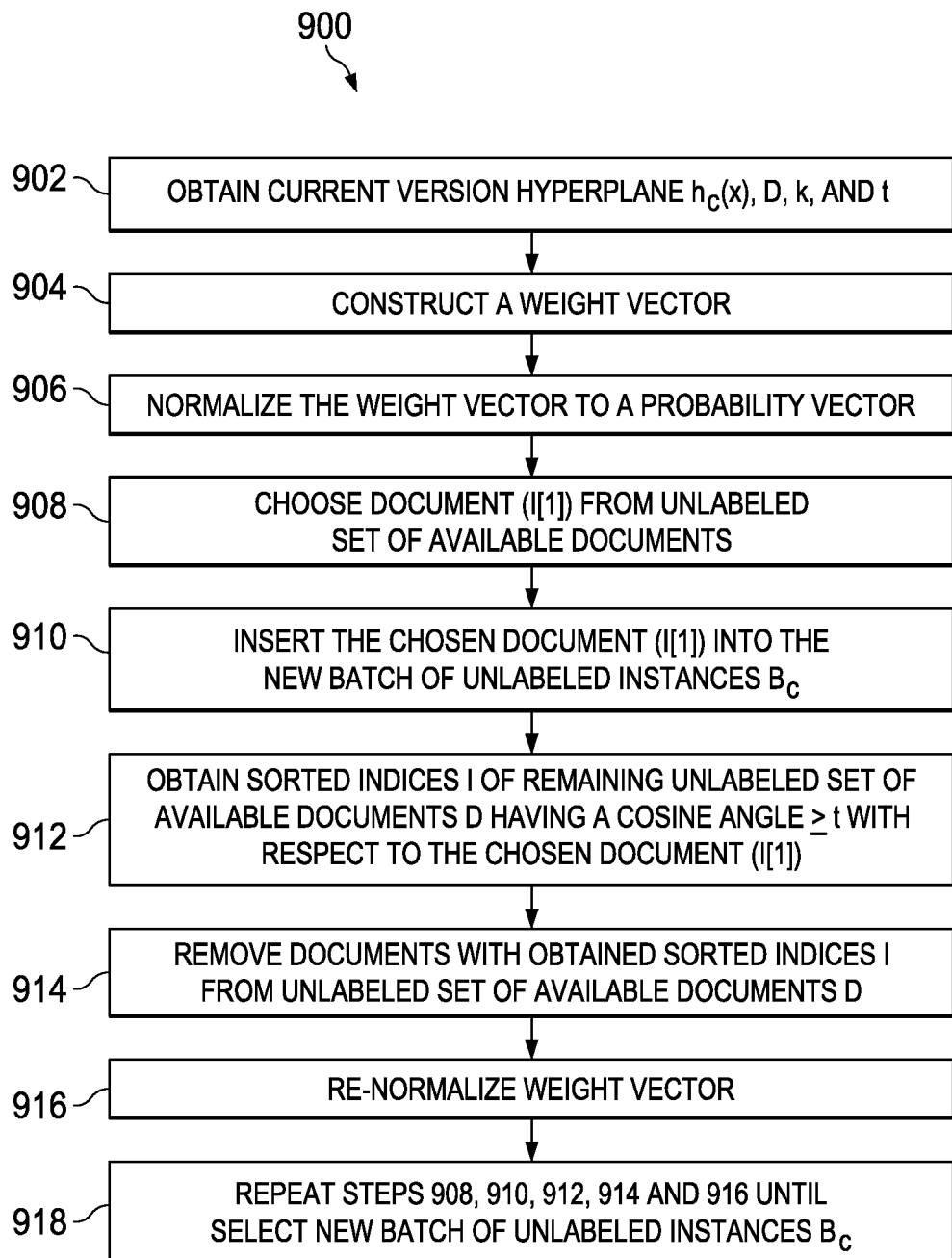
Figure 10:
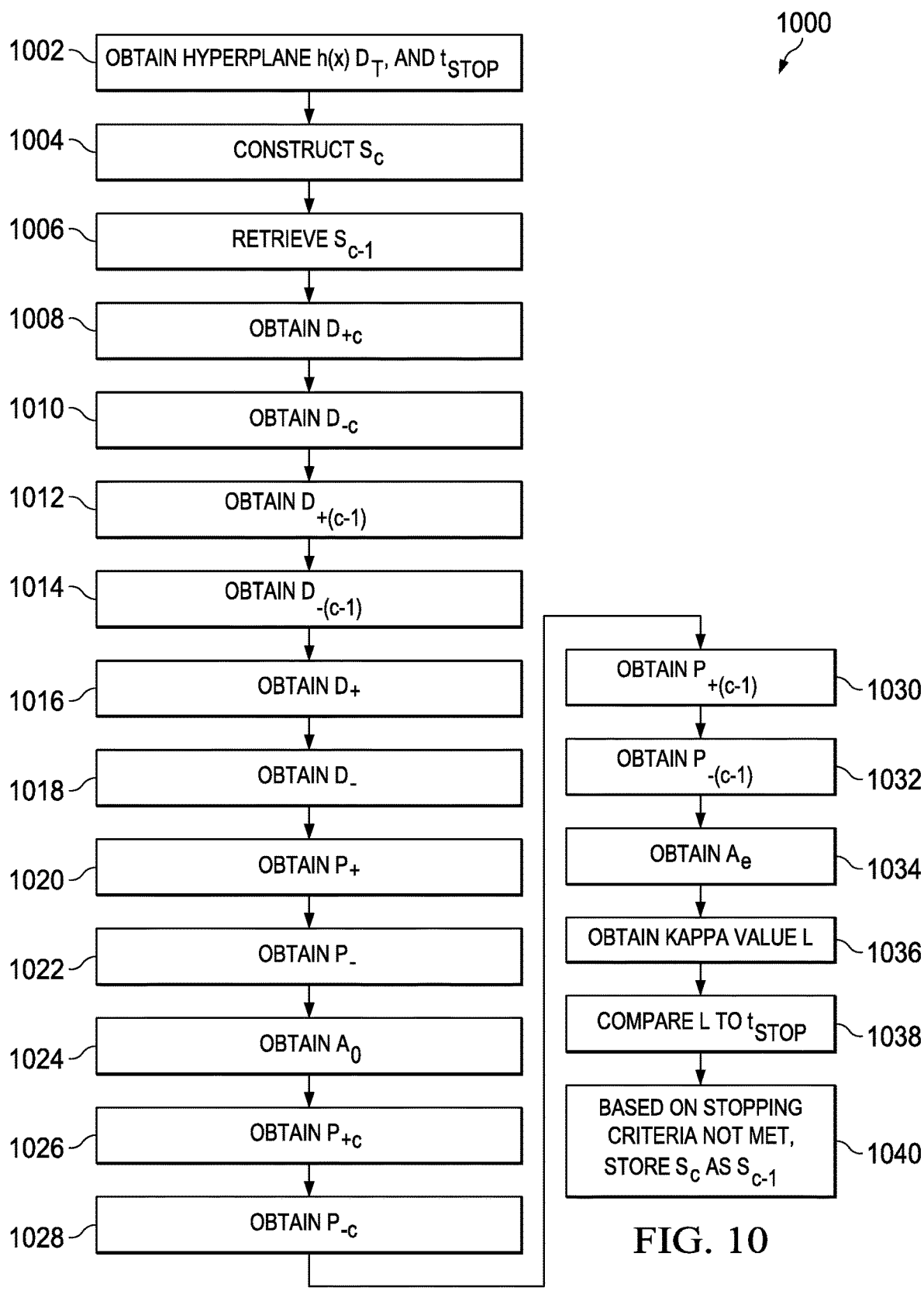
Figure 11:
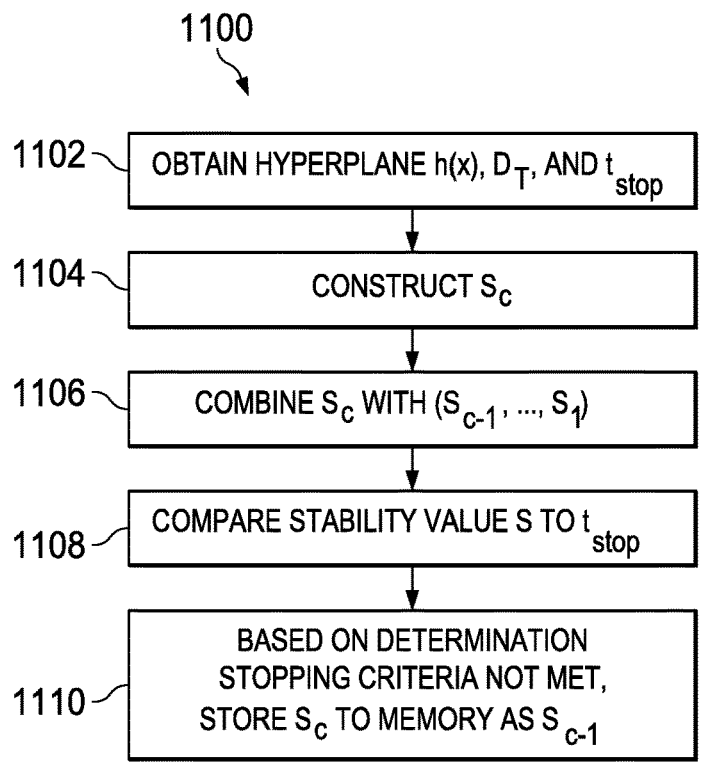
Figure 12:
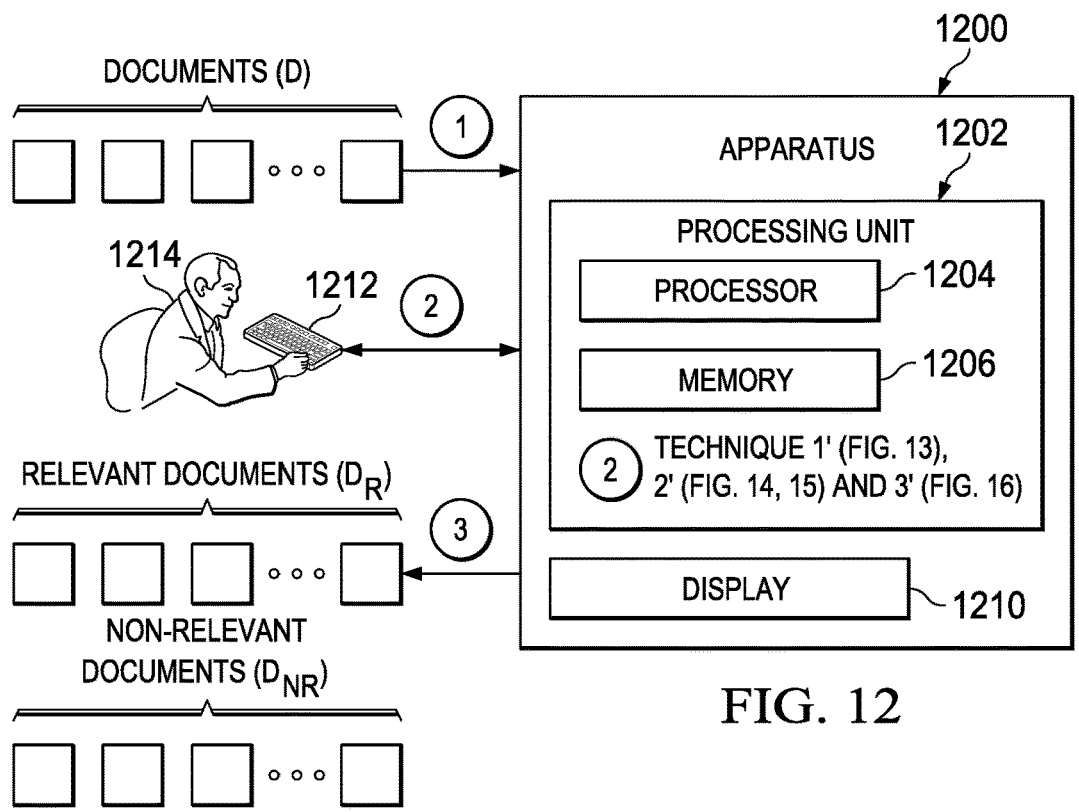
Figure 13:
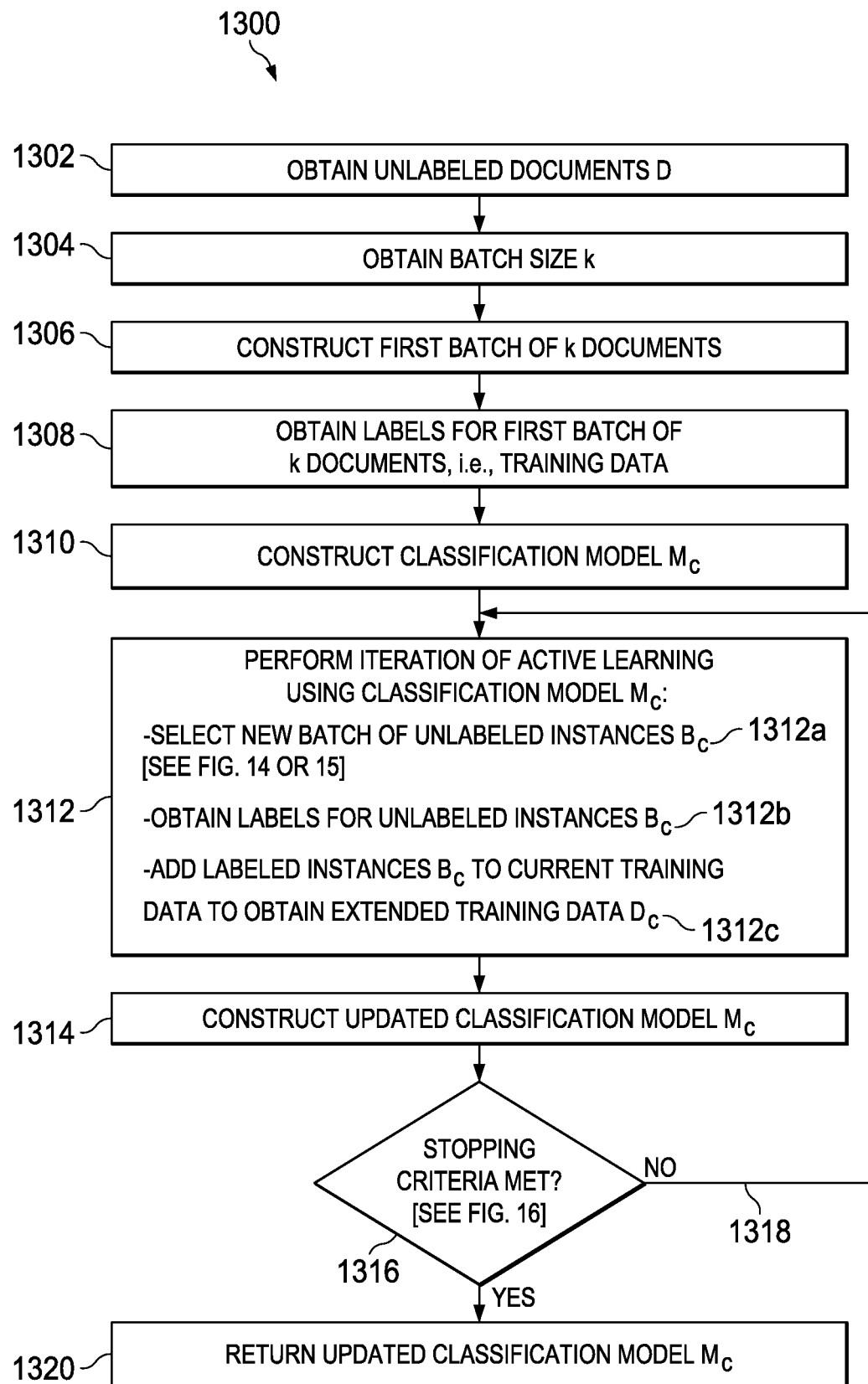
Figure 14:
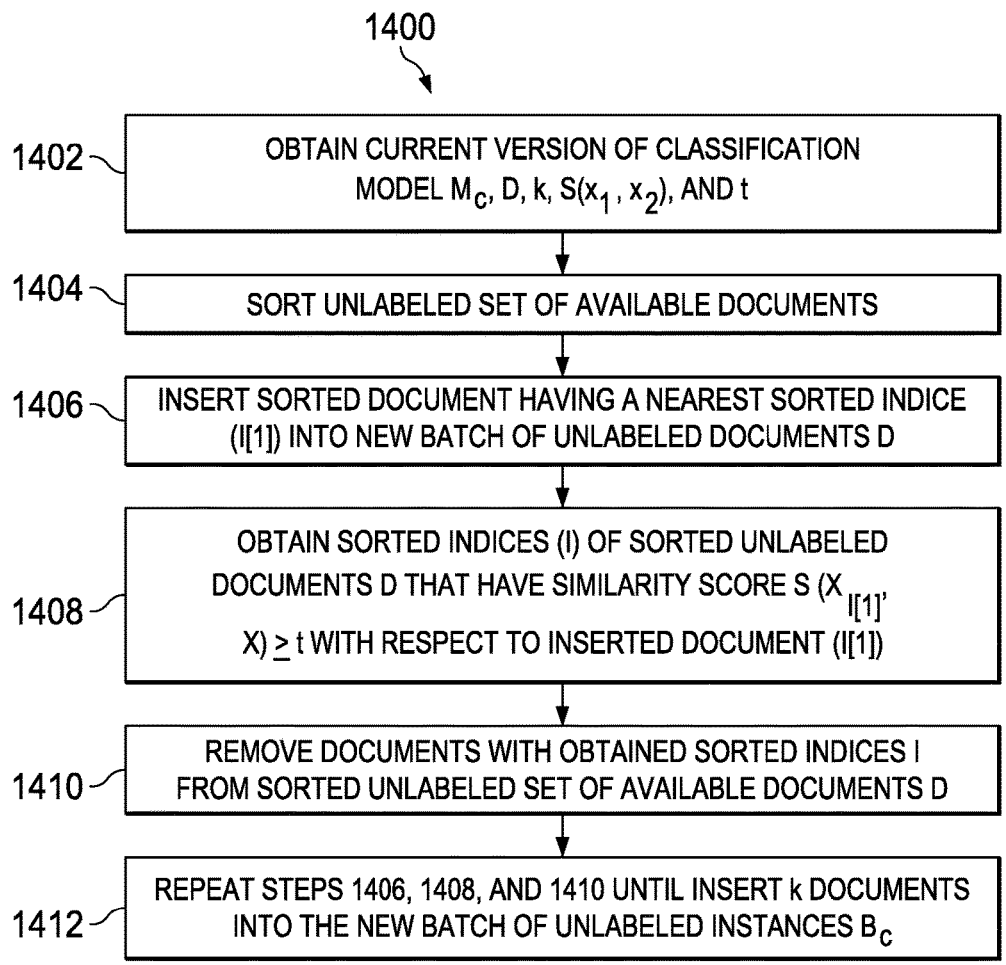
Figure 16:
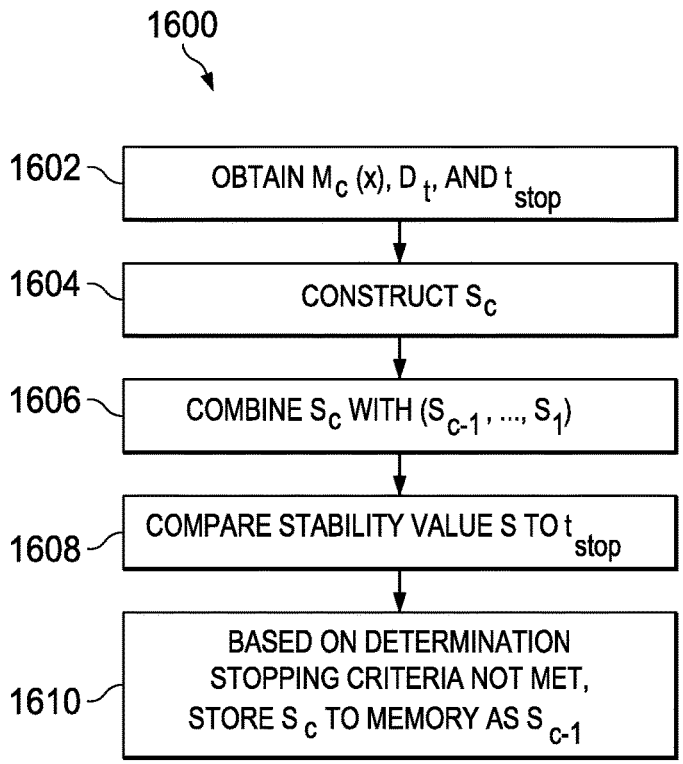
Figure 15:
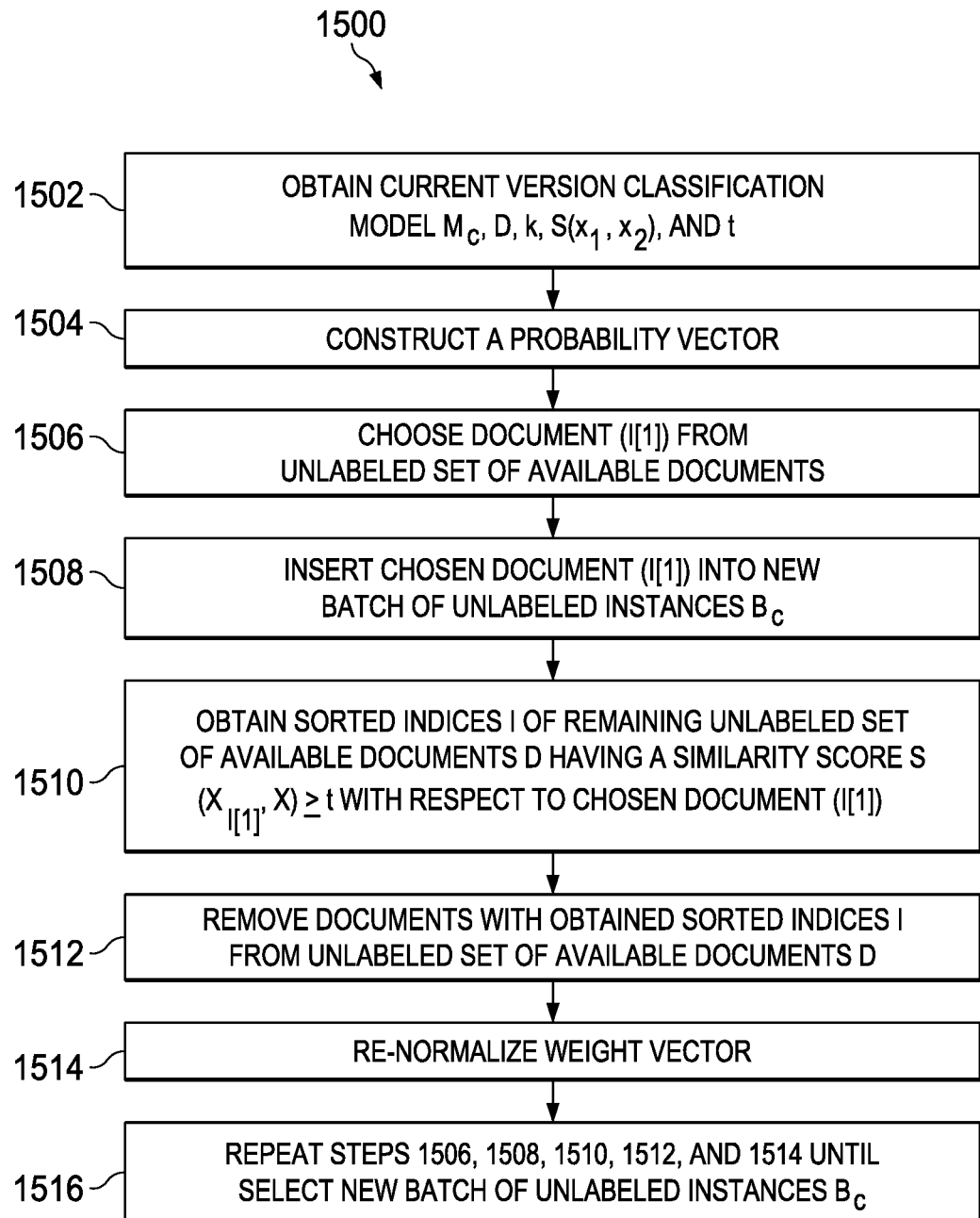

(TABLE #2's Diversity Sampler process—FIG. 7's step 712a) in accordance with an embodiment of the present disclosure;

FIG. 9 is a flowchart of a method performed in the apparatus shown in FIG. 6 to implement technique 2 (TABLE #2's Biased Probabilistic Sampler process—FIG. 7's step 712a) in accordance with an embodiment of the present disclosure;

FIG. 10 is a flowchart of a method performed in the apparatus shown in FIG. 6 to implement technique 3 (TABLE #3—FIG. 7's step 716) in accordance with an embodiment of the present disclosure;

FIG. 11 is a flowchart of a method performed in the apparatus shown in FIG. 6 to implement technique 3' (TABLE #4—FIG. 7's step 716) in accordance with an embodiment of the present disclosure;

FIG. 12 is a diagram of an exemplary apparatus configured in accordance with an embodiment of the present disclosure;

FIG. 13 is a flowchart of a method performed in the apparatus shown in FIG. 12 to implement technique 1' (TABLE #7) in accordance with an embodiment of the present disclosure;

FIG. 14 is a flowchart of a method performed in the apparatus shown in FIG. 12 to implement technique 2' (TABLE #8's DS process—FIG. 13's step 1312a) in accordance with an embodiment of the present disclosure;

FIG. 15 is a flowchart of a method performed in the apparatus shown in FIG. 12 to implement technique 2' (TABLE #8's BPS process—FIG. 13's step 1312a) in accordance with an embodiment of the present disclosure; and, FIG. 16 is a flowchart of a method performed in the apparatus shown in FIG. 6 to implement technique 3' (TABLE #9—FIG. 13's step 1316) in accordance with an embodiment of the present disclosure.

DETAILED DESCRIPTION

To describe the technical features of the present disclosure, a discussion is provided first to describe details about an apparatus and method for implementing a batch-mode active learning for technology-assisted review (TAR) of documents in accordance with an embodiment of the present disclosure (see FIGS. 1-5). Thereafter, a discussion is provided to explain in detail the various operations-steps implemented by the apparatus and method in accordance with embodiments of the present disclosure (see FIGS. 6-11) (note: these particular discussions are based on the teachings of the first U.S. Provisional Application No. 62/288,660). Then, a discussion is provided to describe details about an apparatus and method for implementing a more generalized version of batch-mode active learning for TAR of documents in accordance with an embodiment of the present disclosure. Thereafter, a discussion is provided to explain in detail the various operations-steps implemented by the more generalized apparatus and method in accordance with embodiments of the present disclosure (see FIGS. 12-16) (note: these discussions are based at least in part on the teachings of the second U.S. Provisional Application No. 62/246,719).

First U.S. Provisional Application No. 62/288,660
I. Introduction

The sheer size of electronically stored documents, and the cost, in money and time, of their review in connection with litigation and regulatory proceedings drives the need for technology-assisted review (TAR) and the development of "predictive coding" software. In a traditional linear review, an attorney who is an expert in the subject matter trains a group of contract attorneys or junior associates so that they can churn through the documents for the weeks or months that it may take to complete the review. This process is lengthy and inefficient because a significant portion (generally a majority) of the attorneys' time is spent reviewing non-relevant documents. The objective of predictive coding is to design a machine-learning based system that labels documents as relevant or non-relevant to a specific issue or issues, and hence, minimizes the review-cost and time by maximizing the focus on the relevant documents. The process still requires expert human review, but it significantly reduces the time (and money) required to complete the review process. Initially, predictive coding software and processes were met with reluctance and suspicion around their accuracy, result reproducibility, and defensibility. In recent years, the courts have become more supportive of predictive coding and often advocate for its use in the legal discovery processes. In one specific and frequently referenced case, Global Aerospace, Inc. vs. Landow Aviation, L.P. No, CL 61040 (Vir. Cir. Ct. Apr. 23, 2012) the court agreed with the defendant that a predictive coding methodology was appropriate, even though that methodology was estimated to achieve 75% recall [see reference 1]. For years to come, predictive coding, and TAR in general, will be a mainstay in litigation-driven document review.

By definition, the document review task is akin to a supervised classification task in machine learning where given a huge collection of documents, the primary objective of predictive coding is to use a sub-collection of human-labeled documents to build a classification model to discriminate the remaining documents in the collection as relevant (also known as, "responsive" in the legal domain) or non-relevant (also known as, "non-responsive" in the legal domain). However, another key objective of predictive coding is to maximize the discovered relevant documents as measured by recall while minimizing the human labeling efforts as measured by the number of documents which are labeled by the attorneys. A principled machine learning approach for fulfilling this objective is known as active learning, in which the classification model is updated through an iterative process where the prevailing learning model of an iteration is utilized for selecting an unlabeled training instance to query its label, and then the selected instance becomes part of the training set of the subsequent iterations [see references 2-4]. A more practical variant of active learning is known as batch-mode active learning [see reference 5], which extends the training set by adding a fixed-size batch of training instances instead of only one instance in each iteration. Numerous research articles in the machine-learning domain have shown that, for achieving a given performance, an active learning approach requires a much smaller number of training instances in comparison to its non-active variants, resulting in reduced labeling effort. This is the reason batch-mode active learning is becoming the most popular learning paradigm for the document review task in the litigation discovery domain.

A significant challenge in predictive coding is the selection of a learning technique which works well for highly imbalanced distributions of responsive and non-responsive documents in a document collection. This is important because in real-world document review populations, the number of responsive documents is typically a very small percentage (typically between 1% and 10%) of the total documents in the collection. Recent publications on document review [reference 6] report SVM as a robust learning technique that works well for highly imbalanced legal datasets. It is also one of the best learning techniques for large-scale text categorization. Additionally, SVM provides easily computable metrics which can be used for choosing a new batch of training instances in a batch-mode active learning setup. However, in existing machine learning literature, batch-mode active learning using SVM has not received much attention. Also, large-scale studies of the performance of batch-mode active learning on real-life high-dimensional legal data is not currently available.

Another challenge which applies to active learning-based document review is in identifying whether the learning model has stabilized such that no further training is necessary. This is important from the standpoint of real-world usability of predictive coding. A premature learning model almost certainly requires the inclusion of an overly inflated portion of the document population in order to achieve an acceptable level of recall of relevant documents. On the other hand, excessive training beyond stabilization wastes attorney time during the training phase. So, a model stabilization criterion is utilized for signaling the potential termination of the learning stage. To the best of the inventor's knowledge, none of the existing publications on batch-mode active learning have studied the stabilization behavior of the models on real-world litigation discovery data. Finally, the computation of labeling effort of active learning in litigation-driven predictive coding is different than that of other domains, which makes it challenging to use existing active learning methodologies for predictive coding projects. For instance, in many (but not all) real-world legal document review projects, the attorney review team conducts a "second pass" review, after the calibration and application of the classification model to the entire population. During this additional review, the attorneys examine each of the "predicted responsive" documents, prior to any production of those documents to a receiving party. Again, none of the existing publications on active learning present the model efficiency considering the complex dual phase labeling effort of the users.

In the present disclosure, two novel methods for batch-mode active learning using SVM are disclosed. The novelty of the proposed methods is manifested in the way they choose the new batch of unlabeled instances (documents) for extending the prevailing training dataset. The performance of the proposed methods are compared with the best of the existing methods by implementing them in a commercial system which is deployed in iControl$^{ESI}$®'s e-discovery platform, Recenseo®. For comparison, multiple real-world large case datasets are used, which fall within the category of big data in any reasonable categorization. The experiments over the deployed active learning system use a setup that is identical to the setup implemented by iControl$^{ESI}$®, and successfully utilized by the company's clients. These experiments validate that the active learning methods described herein achieve a higher recall than that of the existing counterparts (note: the experiments are discussed in detail below). The inventors also studied the stabilization behavior of the proposed batch-mode active learning methods on these real-world discovery datasets and recommendations are discussed for choosing the stabilization point of the learning model in a deployed system. In addition, the inventors present the performance of the system considering the two-phase review effort of attorneys. Finally, an in-depth discussion of various design choices is provided that the inventors have made in the deployed system during different stages of the predictive coding process where no such insight on real data is yet available in the existing literature.

The remainder of this disclosure is organized as follows. In Section II, the inventors discuss related works. In Section III, the inventors present the proposed batch-mode active learning methodologies. In Section IV detailed experimental results are presented. Finally, a discussion of various design choices for commercial deployment of predictive coding is given in Section V.

II. Related Works

A. Active Learning

There are two paradigms of active learning, which differ in the concept by which they choose a new instance (document) to label. They are (1) relevance feedback sampling [see reference 7] and (2) uncertainty sampling [see reference 8]. Relevance feedback-based methods use keyword search or random sampling for selecting the initial set of responsive documents, and they build a learning model that is updated iteratively after a fraction of the top-scoring documents in each iteration are labeled as relevant. The process stops after a sufficient number of documents are coded as relevant. Due to the positive feedback in favor of responsiveness, such methods yield high recall, but their learning models more often suffer from a self-fulfilling prophecy and the quality of such methods depends strongly on the initial batch of instances. On the other hand, uncertainty sampling-based methods select the instance (document) for which the prevailing learning model is the most uncertain. Such a method does not suffer from the problem of relevance feedback-based methods because the decision to add an instance to the training sample depends on an instance's feature values rather than its predicted label, which is based on the existing learning model.

Within the uncertainty sampling-based methodologies, a large number of uncertainty metrics have been proposed; examples include entropy [reference 9], smallest-margin [reference 10], least confidence [reference 11], committee disagreement [reference 12], and version space reduction [references 2 and 13]. Different metrics are a good fit for different learning techniques. For instance, the authors in [reference 11] use conditional random field as the learning method and least confidence as the uncertainty metric for active learning, whereas the authors in [references 2 and 3] use SVM as the learning technique with version space reduction as the uncertainty metric. The authors of [reference 3] prove that version space reduction provides the optimal solution for active learning under some optimality criterion. They further show that the distance of an instance from the SVM hyperplane approximates the version space reduction metric, and hence, the instance that is the closest to the hyperplane should be chosen in an active learning iteration. The batch-mode active learning methods that are disclosed herein use SVM as the learning technique, and distance from the hyperplane as the uncertainty metric.

B. Batch-Mode Active Learning

Initial theoretical works on active learning were limited to a batch size of one (one sample at a time) [references 2, 14 and 15]. But, due to practical consideration, it is unreasonable to retrain the classifier at every iteration with only one additional training sample. So, a larger batch size (typically between 20 to 100) is considered in all real-life systems. The majority of the existing works on batch-mode active learning simply apply the single-instance uncertainty metric over the unlabeled instances and choose a batch of k instances with the best metric values. For instance, the authors of [reference 3] propose $SVM_{active}$, in which they construct the batch with the set of instances that are the closest to the hyperplane. Note: that such a method is sub-optimal because it chooses the batch instances by considering the metric value of a single instance independently instead of designing a metric for a group of instances. Brinker [reference 5]

attempts to overcome this limitation by proposing an approach that constructs a batch of new training examples by ensuring that selected samples are nearest to the hyperplane and also maximally diverse (through cosine angle) from all other samples that are selected in the current batch. There are other methods that are based on Generalized Binary Search and submodular optimization [references 13, 16, 17, 18, 19, and 20]. But, these methods are generally costly, and their applicability in the legal domain where the dimension of the feature space is substantially large (several million) have yet to be explored.

C. Active Learning Stopping Criteria

The objective of a stopping criterion is to determine when an active learning based classification model reaches the point of maximum effectiveness [reference 8]. Designing such a criterion is a difficult task. A number of heuristic methods have been proposed for stopping active learning. For example, the active learning process stops: (1) when all of the remaining unlabeled examples are outside of the current model's margin [reference 14]; (2) when the number of support vectors saturates [references 21-22]; (3) when the max confidence, min-error, overall uncertainty, and combination of these three reaches a certain threshold [references 23, 24 and 25]; (4) when the entropy of each selected sample or error on prediction is less than a threshold [reference 26]; or (5) when the variance of the confidence score reaches the global peak [reference 27]. The authors in [reference 28] have shown that most of the stopping methods tend to behave too conservatively (taking a large number of samples) and that stabilization predictions computed via inter-model Kappa agreement [reference 29] are aggressive (stop early) without losing performance in terms of F-measure. Subsequently, the authors of [reference 30] analyze how the F-measure changes if the Kappa agreement between two models exceeds a certain threshold. Based on the task at hand, the inventors believe the Kappa agreement [reference 29] is a method that will stop early without sacrificing performance which seems quite suitable for their purpose as it measures the model stability and gives a reasonable stopping point. The inventors to the best of their knowledge are the first to apply stopping criterion for analyzing active learning models in the legal domain.

D. Predictive Coding in the Legal Domain

A number of studies [references 1, 31, 32, 33, and 34] have been conducted to show the challenges and promises of "predictive coding". A study conducted by [reference 34] shows that TAR methods can be more effective and efficient than traditional e-discovery practice, which typically consists of a keyword or Boolean searching, followed by manual review of the search results. According to [reference 6], the TAR tools referred to as "predictive coding" in the legal marketplace follow one of the three protocols: (1) Simple Active Learning ("SAL"), (2) Simple Passive Learning ("SPL"), and (3) Continuous Active Learning ("CAL"). Note: that SAL includes uncertainty sampling-based active learning methodologies, SPL covers non-active supervised learning methodologies, and CAL includes relevance sampling. The CAL and SAL methodologies are compared in [reference 6] without proposing any novel active learning method. Existing works on the legal domain also discuss the need of stabilization metrics; typically, some statistical evaluation metrics are proposed [reference 35]. However, these are offline metrics that are not integrated within the learning framework.

III. Methods

Given a collection of n documents $D=\{D_i\}_{1 \le i \le n}$, which are potentially related to a legal issue, the objective of a review task is to discover the responsive documents with the least amount of effort from the expert attorneys. In TAR, this task is modeled as a 2-class classification problem where each document $D_i$ is represented as a tuple $(x_i, y_i)$; $x_i$ is a d-dimensional feature vector representation of document $D_i$, and $y_i \in \{+1, -1\}$ is a binary label denoting whether the document $D_i$ is responsive (+1) or non-responsive (−1). For the collection of documents, the feature vectors, $x_i$'s can be built using standard Information Retrieval (IR) methodologies that convert each document to a d-dimensional vector by considering it as a bag of words/phrases and then selecting an appropriate weight (such as TF-IDF) for each word/phrase. On the other hand, $y_i$ is initially unknown for all of the documents but an expert attorney with the knowledge of the legal issue can review the document $D_i$ and assign $y_i$ manually. For a dataset D, the matrix $X_D$ is used to represent all of the feature vectors $x_i$'s; similarly, $y_D$ is used to represent all the labels, $y_i$'s. TAR methods use a supervised classification model to predict the label of each document with the least amount of labeling effort by the attorneys. The following TABLE #1 represents the process in accordance with an embodiment of the present disclosure:

TABLE #1

| Technique 1: Batch Mode Active Learning Technique using SVM | |
|---|---|
| Input | |
| | • D, unlabeled dataset |
| | • k, batch size |
| Output | |
| | • Learned hyperplane, h |
| 1 | $h_c \leftarrow$ ObtainInitialHyperplane (D, k) |
| 2 | while Stopping Criteria not met do |
| 3 | $B_c \leftarrow$ SelectABatch (D, $h_c$, k) |
| 4 | $Y_{B_c} \leftarrow$ QueryLabels ($B_c$) |
| 5 | $D \leftarrow D \setminus B_c$ |
| 6 | $D_c \leftarrow D_c \cup B_c$ |
| 7 | $h_c \leftarrow$ Train ($D_c$) |
| 8 | $h \leftarrow h_c$ |
| 9 | return h |

Figure 1:
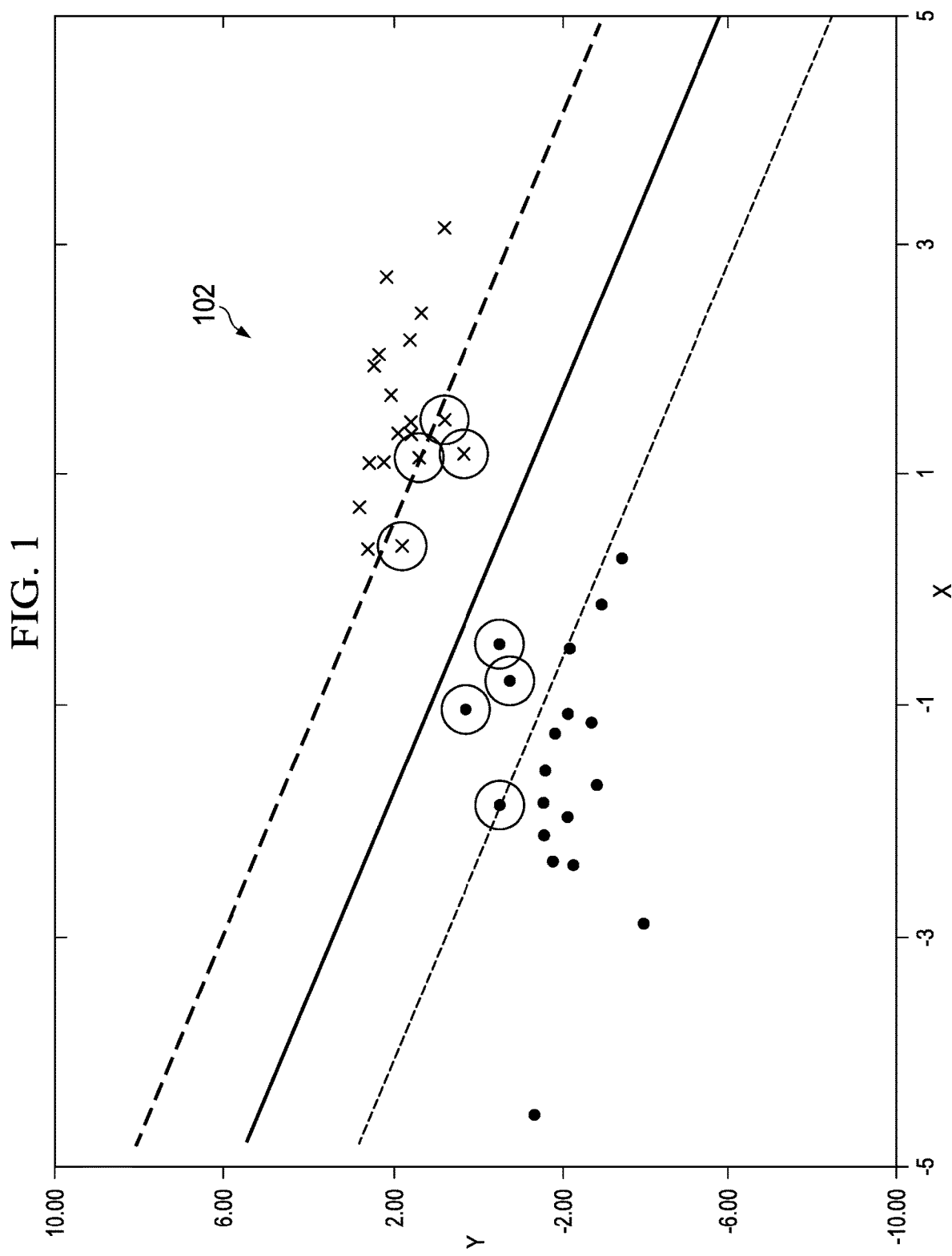
FIG. 1 is a graph illustrating a separating hyperplane and the margins for a linear soft-margin SVM that can be utilized in accordance with an embodiment of the present disclosure.
Figure 2A:
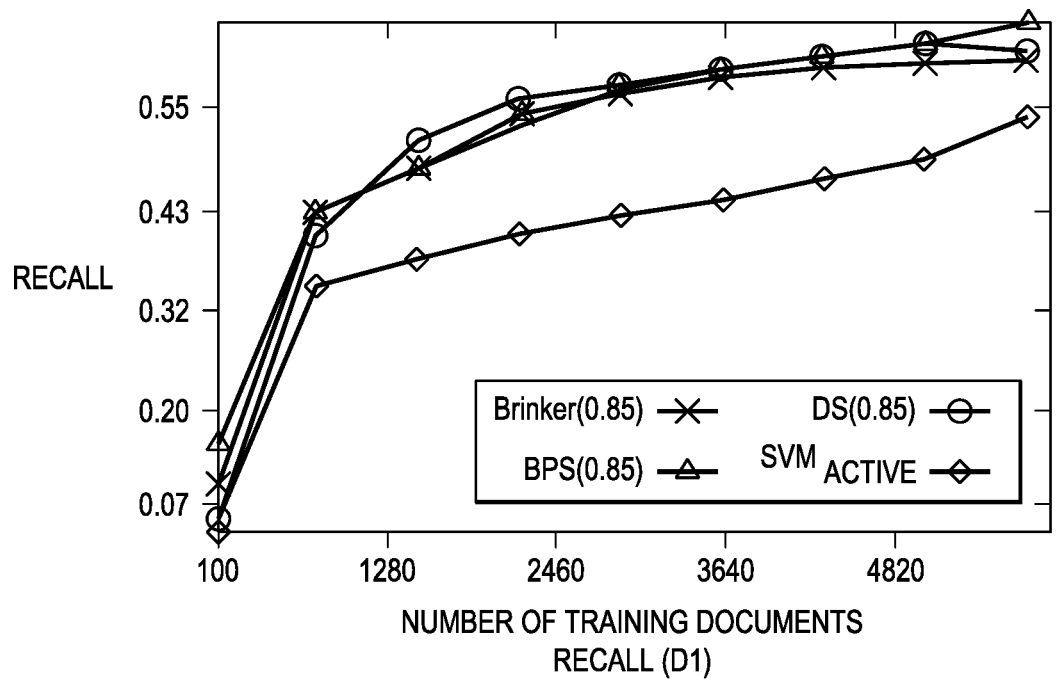
FIGS. 2A-2D are graphs illustrating classification assessment results for matter D1 (FIG. 2A), matter D2 (FIG. 2B), matter D3 (FIG. 2C), and matter D4 (FIG. 2D) obtained when conducting an experiment in accordance with an embodiment of the present disclosure.
Figure 2B:
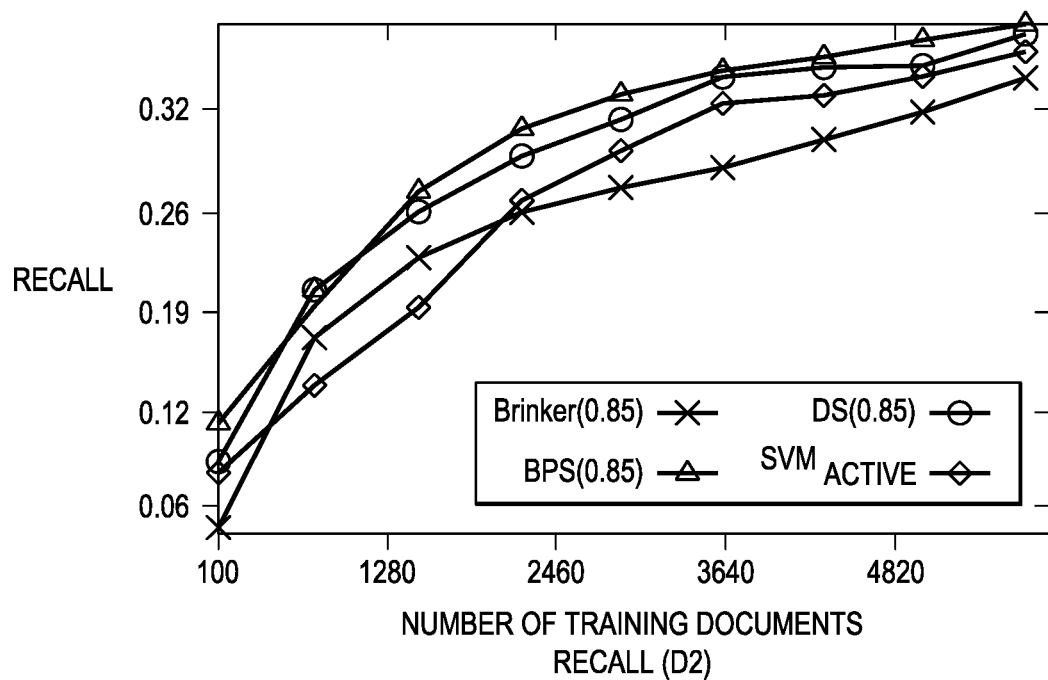
Figure 2C:
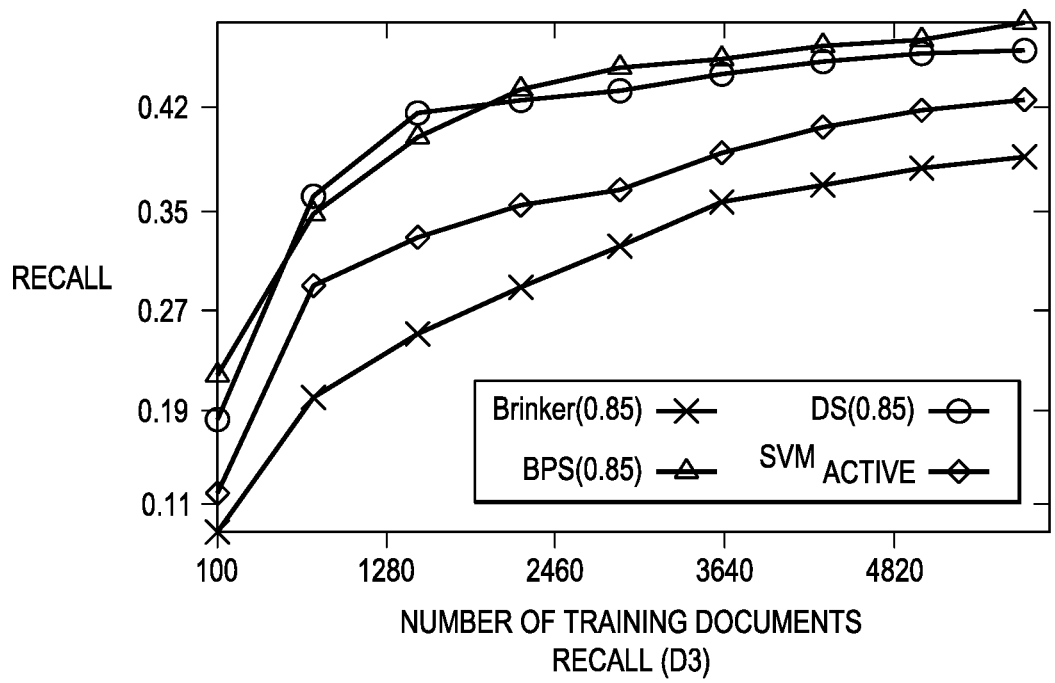
Figure 2D:
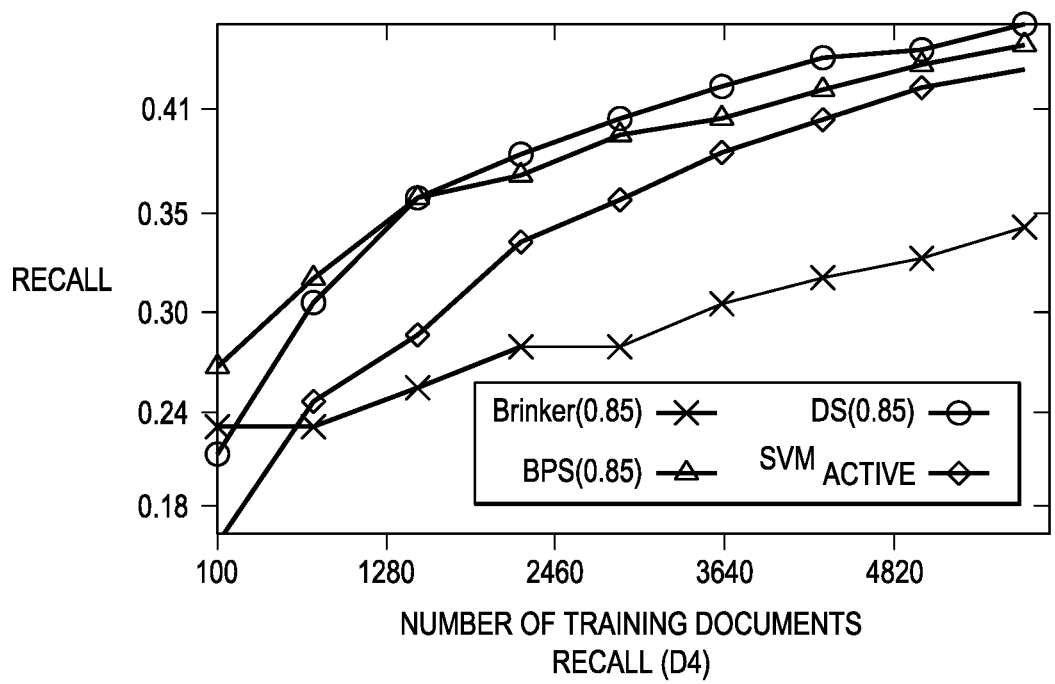
Figure 3A:
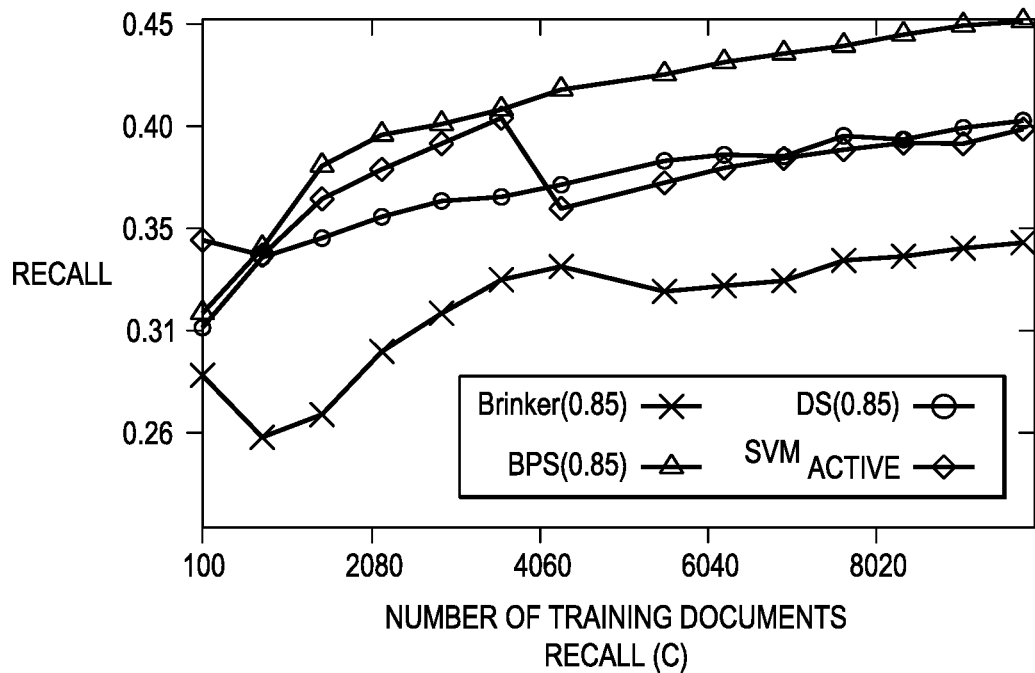
FIGS. 3A-3C are graphs illustrating classification assessment results for matter C (FIG. 3A), matter ACQ (FIG. 3B), and matter MONEX-FX (FIG. 3C) obtained when conducting an experiment in accordance with an embodiment of the present disclosure.
Figure 3B:
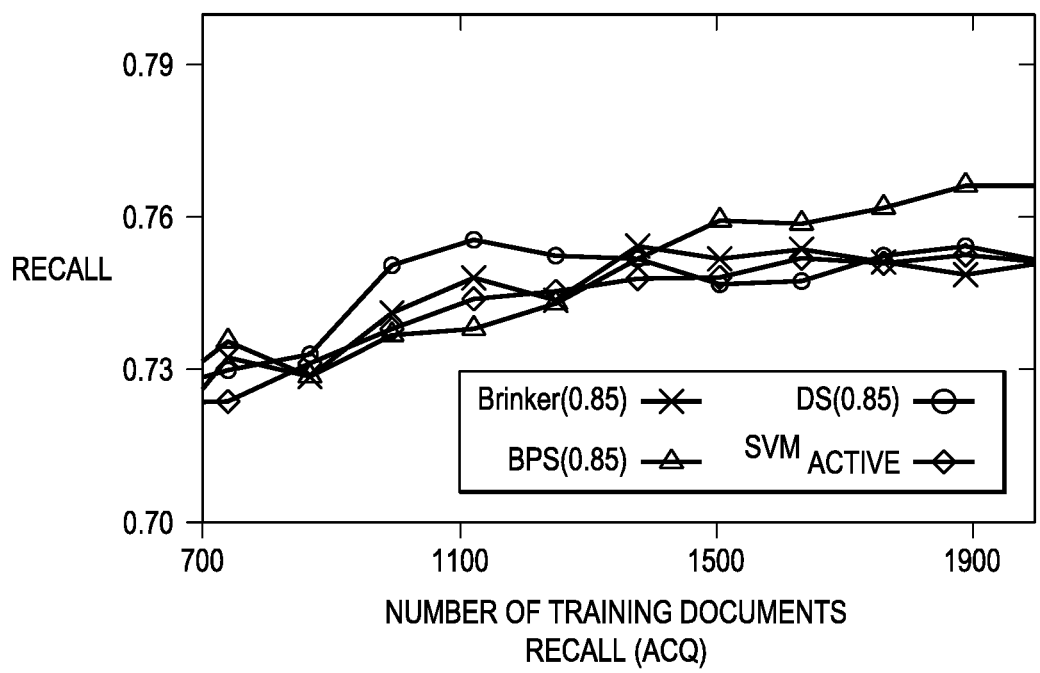
Figure 3C:
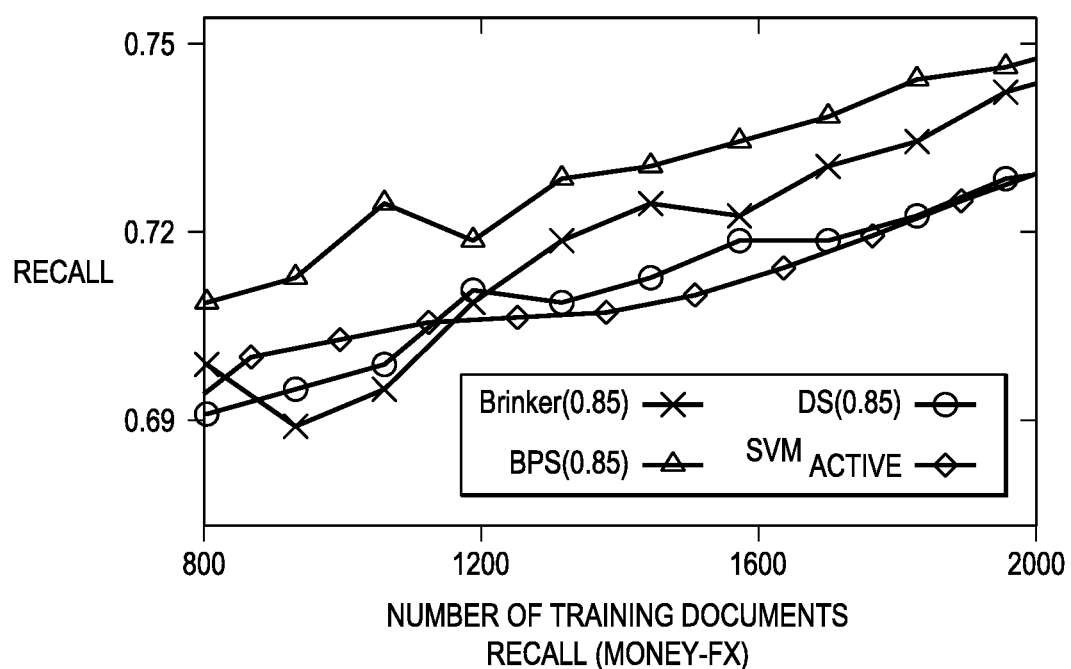
Figure 4A:
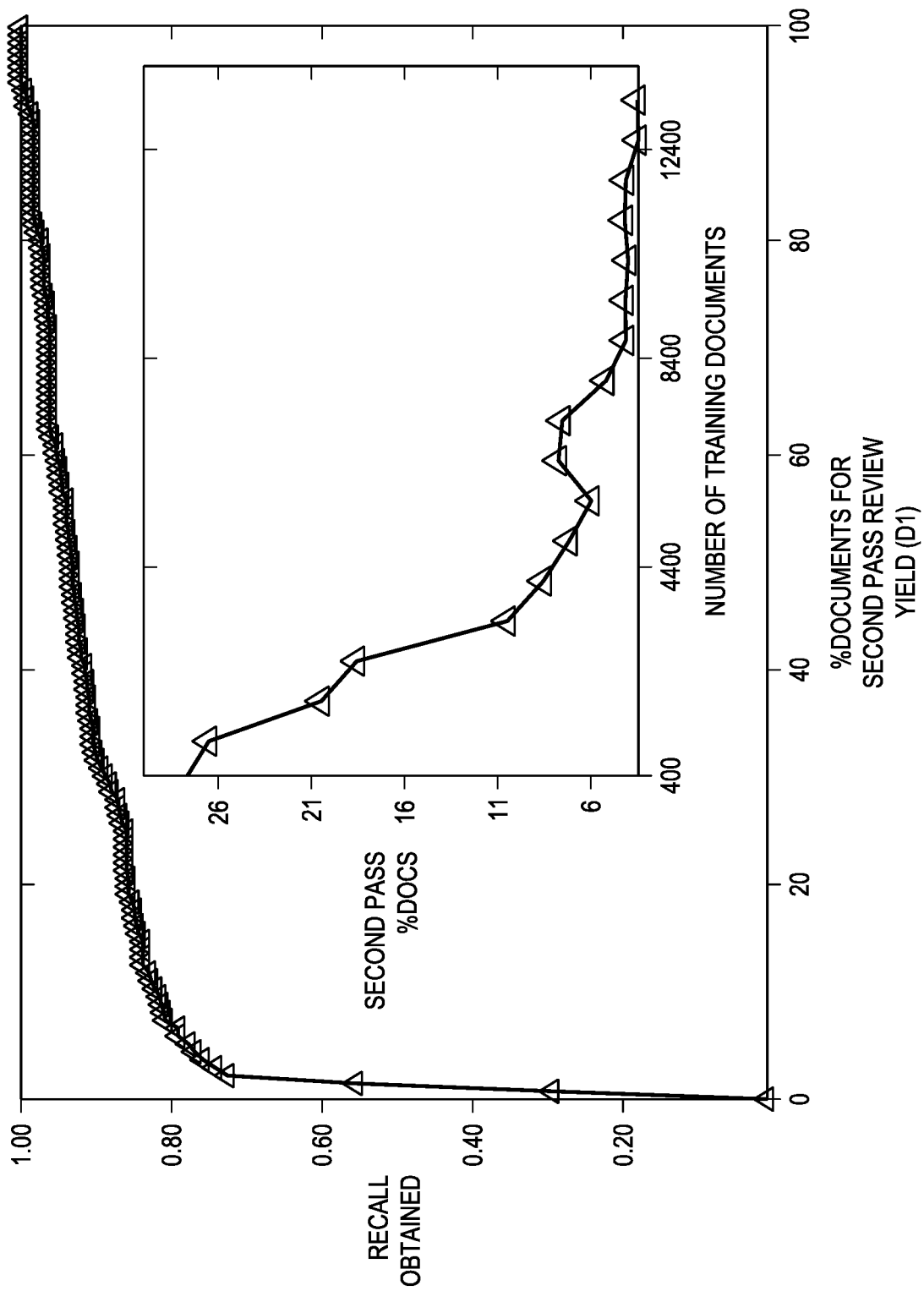
FIGS. 4A-4F are graphs illustrating yield curves for matter D1 (FIG. 4A), matter D2 (FIG. 4B), matter D3 (FIG. 4C), matter D4 (FIG. 4D), matter C (FIG. 4E), and matter ACQ (FIG. 4F) obtained when conducting an experiment in accordance with an embodiment of the present disclosure.
Figure 4B:
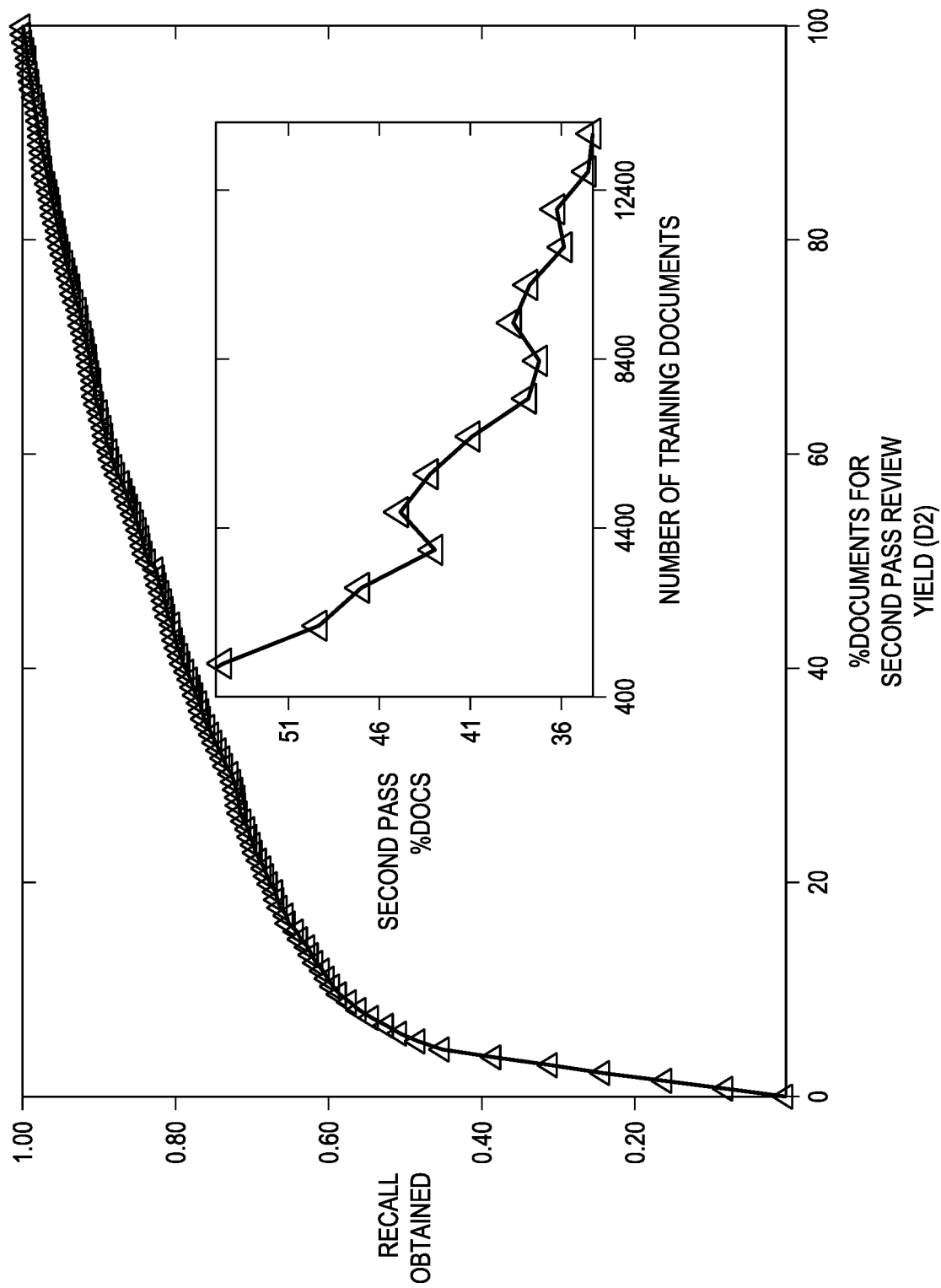
Figure 4C:
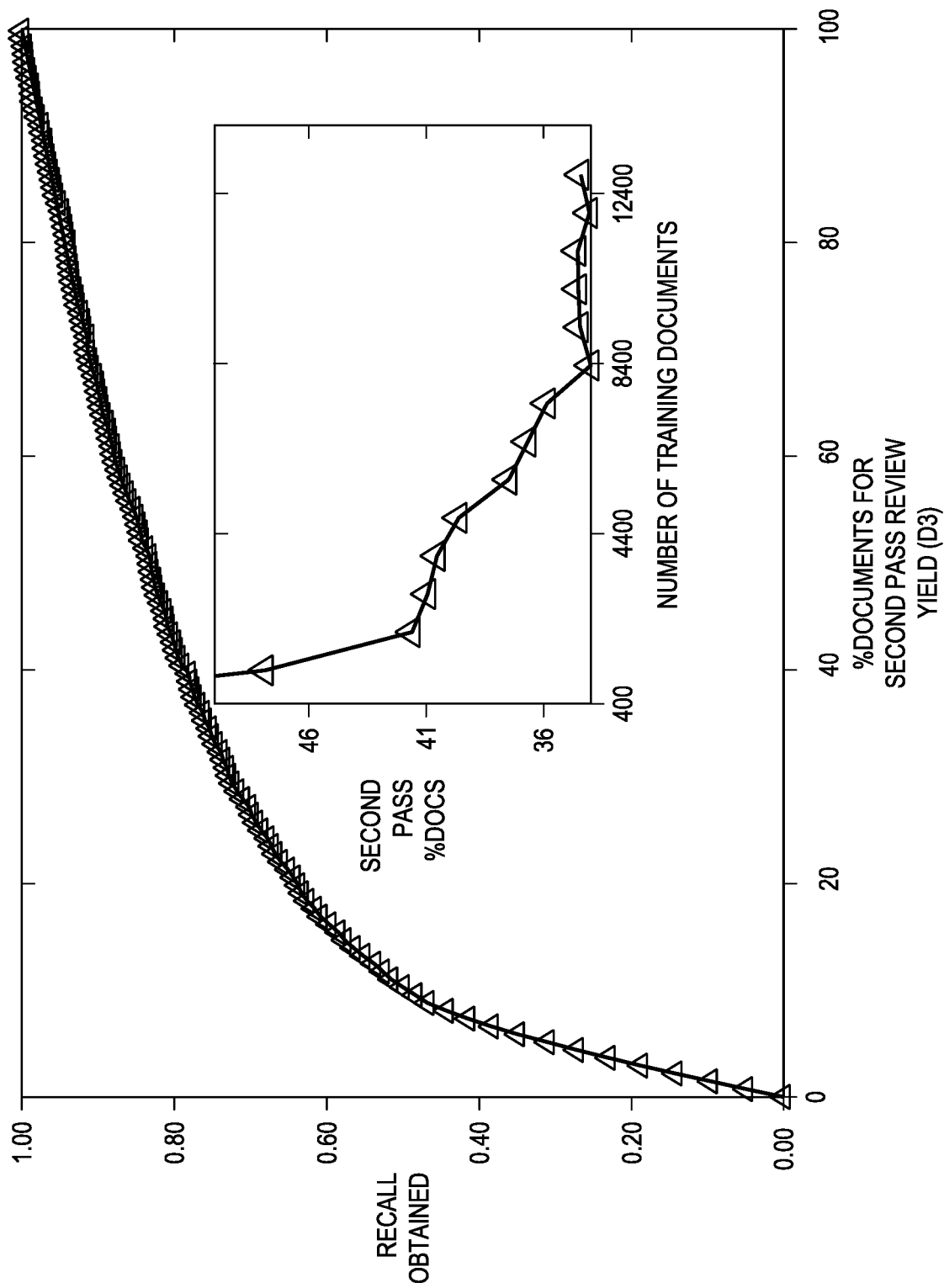
Figure 4D:
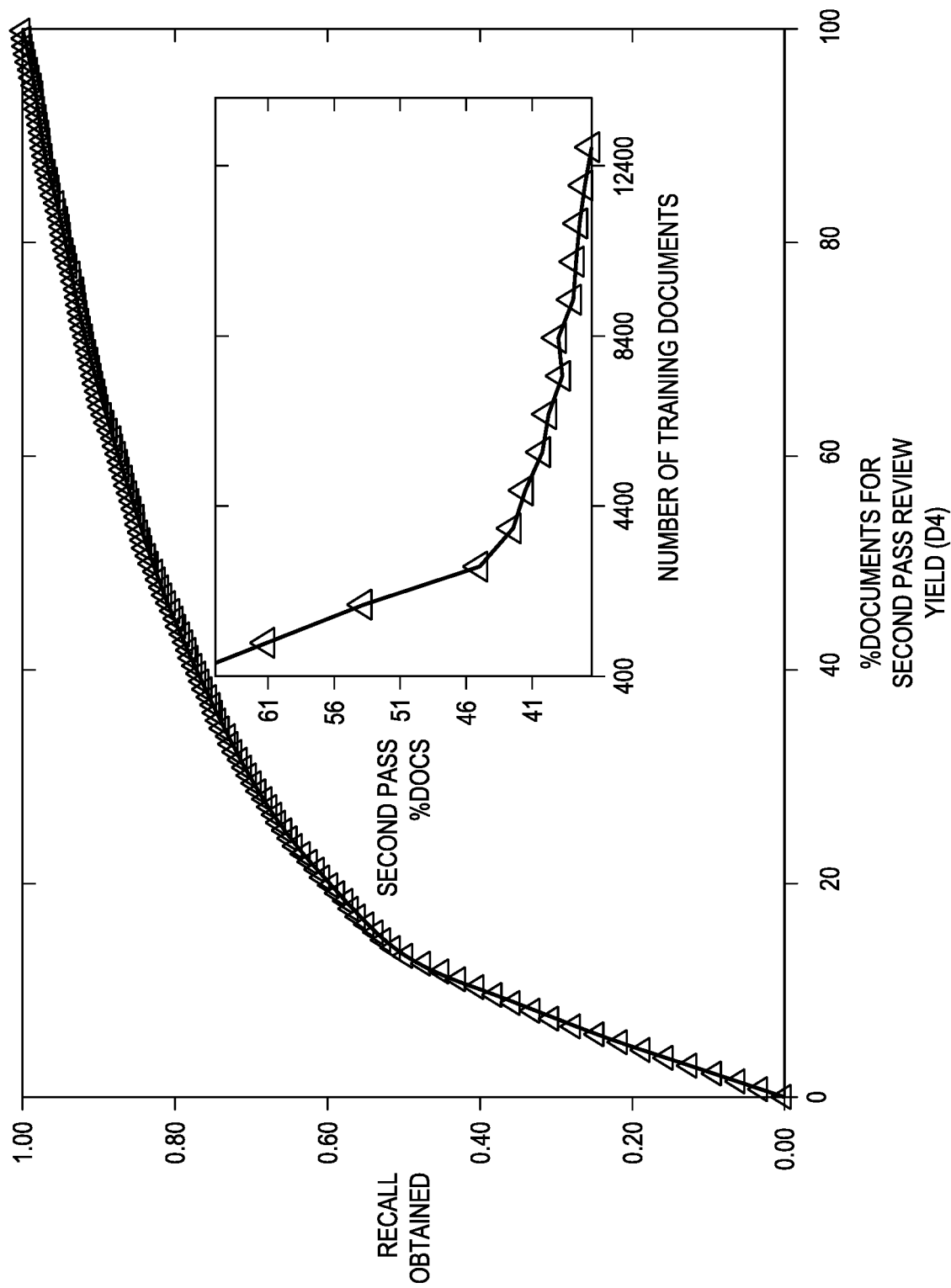
Figure 4E:
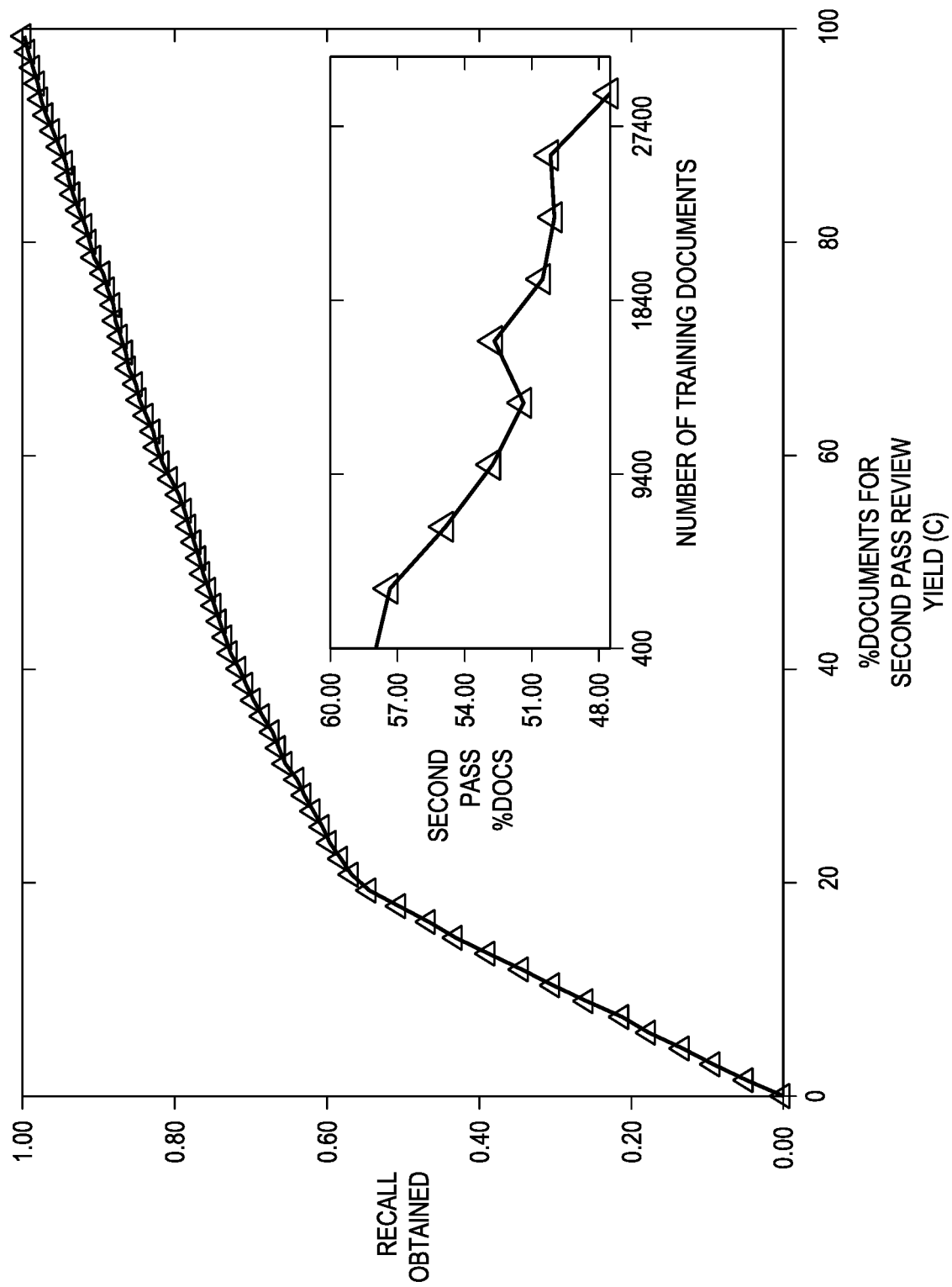
Figure 4F:
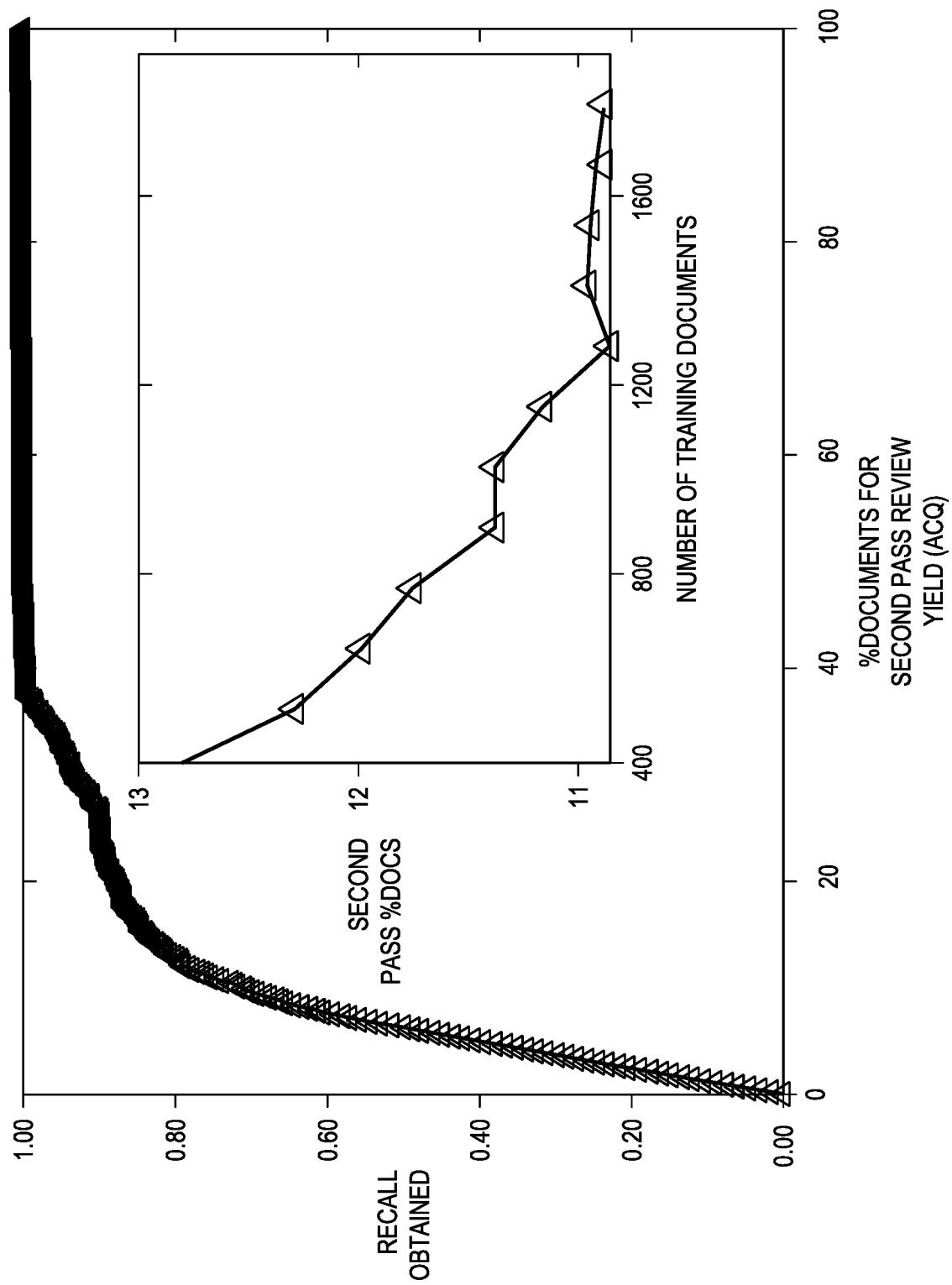
Figure 5C:
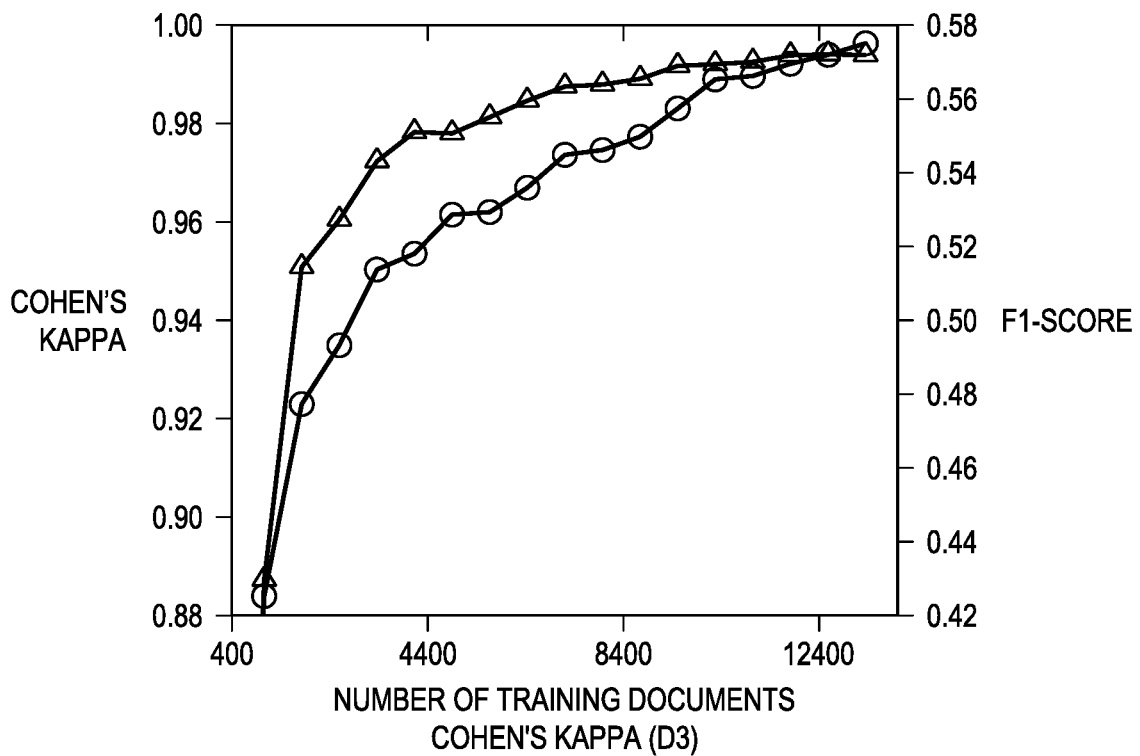
Figure 5D:
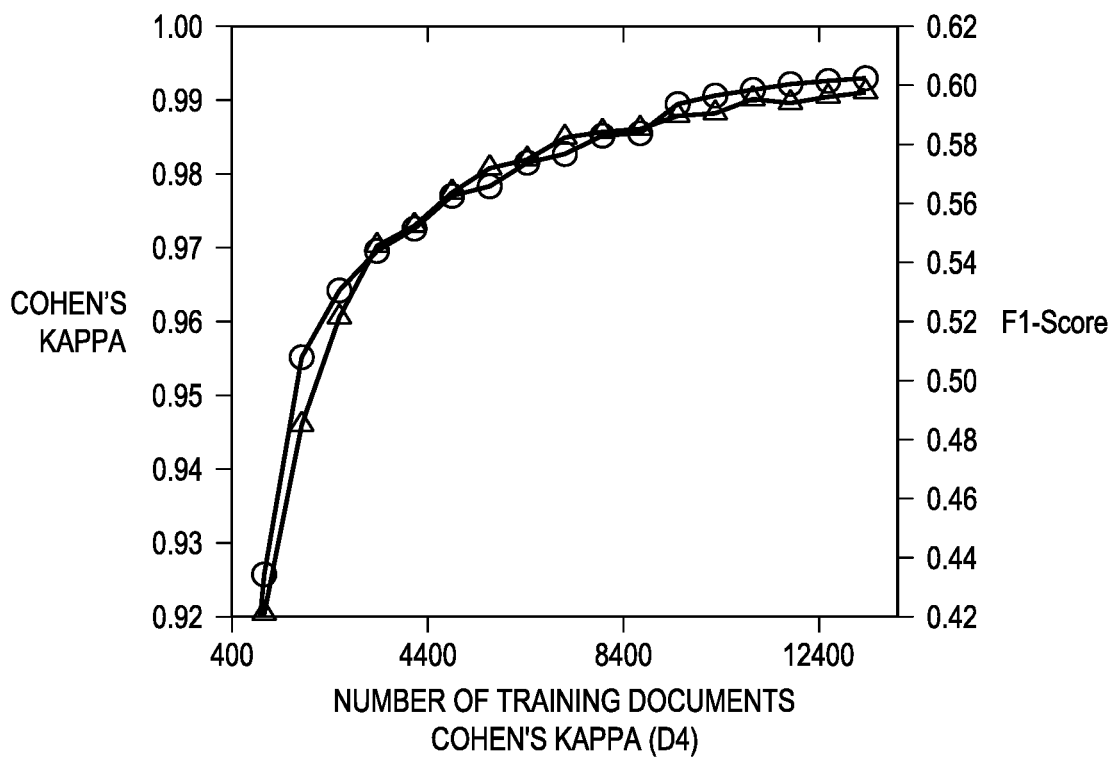
Figure 5E:
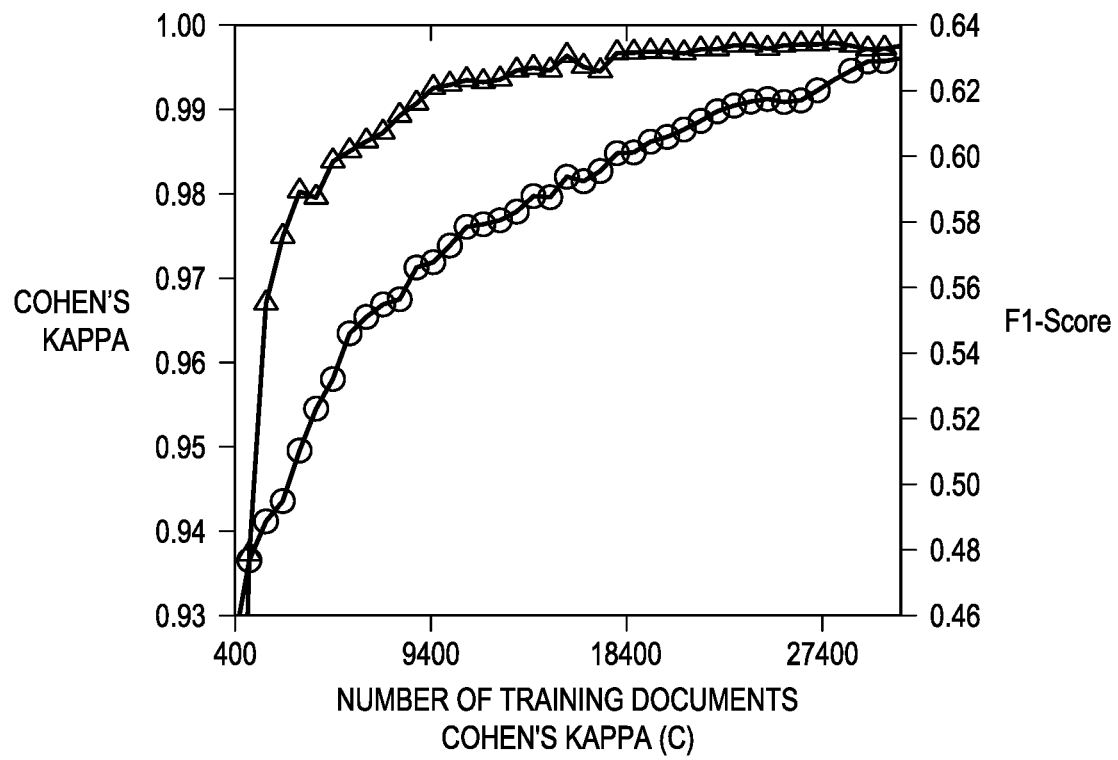
Figure 5F:
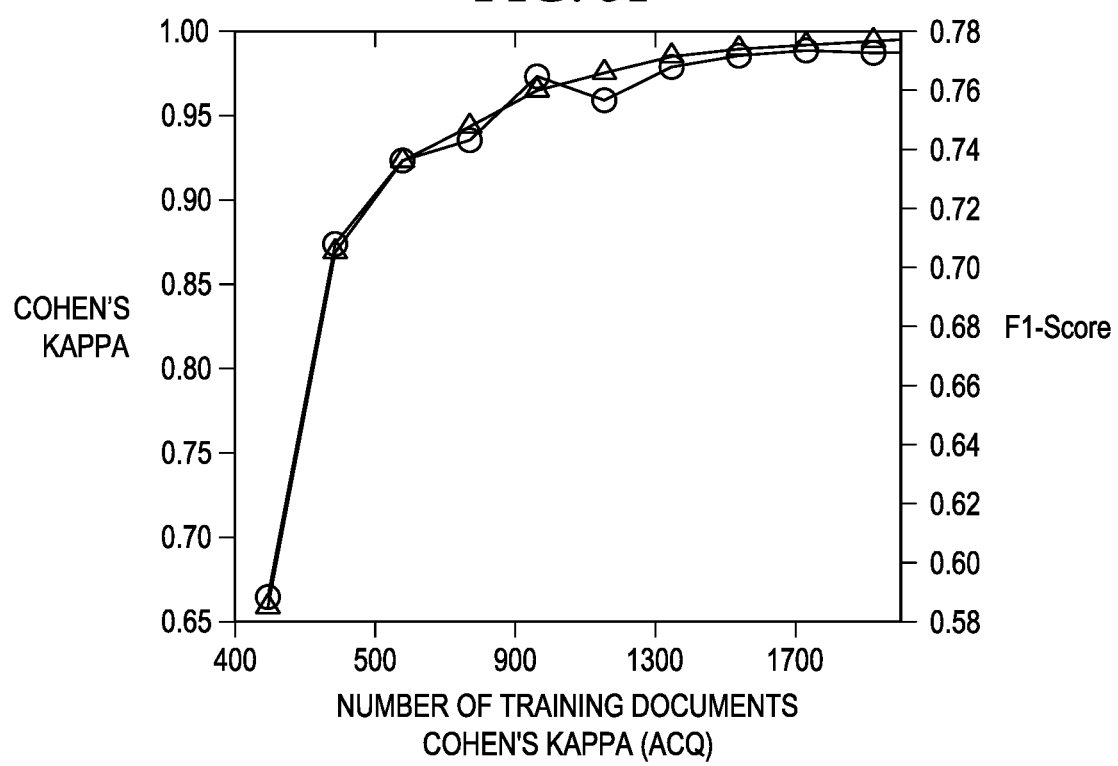

In this work, the soft-margin SVM is used for the classification task. SVM is a supervised classification technique which uses a set of labeled data instances and learns a maximum-margin separating hyperplane $h(X)=w^T x+b=0$ by solving a quadratic optimization problem. w controls the orientation of the hyperplane, T represents a matrix transpose operation, and b is the bias which fixes the offset of the hyperplane in d dimensional space. Separating hyperplanes of SVM are linear, but by using non-linear kernels, SVM can also learn a non-linear hyperplane, if necessary. Hyperplane h(x) splits the original d-dimensional space into two half-spaces such that if a test instance $x_i$ falls on the positive side of the hyperplane (i.e., $h(x_i) \ge 0$), $x_i$ is predicted as +1, and otherwise, it is predicted as −1. In FIG. 1, there is a graph illustrating a separating hyperplane 102 obtained using a linear SVM where the solid line represents the boundary and the dashed lines represent the margin.

For batch-mode active learning using SVM, given an un-labeled document-set D, and a batch size k, uniformly sampled k instances from D are used construct the first batch for which attorneys provide the label. Using this as the training data for SVM, the initial hyperplane $h_c(X)$ is constructed. In every subsequent iteration of active learning, the current hyperplane $h_c(X)$ is used to actively select a new batch of unlabeled instances $B_c$. The instances of this batch become part of the training data once their labels are obtained. Using the extended training data, the current hyperplane is updated. The process continues until a stopping criterion is met. The active learning process is formally described in TABLE #1 (Technique 1). In Line 1, the initial hyperplane $h_c$ is obtained using a randomly selected size-k batch of training instances. The while loop in Lines 2-7 is one iteration of active learning where a new batch of training instances is added and an updated hyperplane is obtained using the extended training dataset.

A. Active Learning Methods

Two novel methods are also described herein, namely a Diversity Sampler (DS) and a Biased Probabilistic Sampler (BPS), for selecting a batch of k documents at each iteration using the prevailing SVM hyperplane, $h_c$. Like the existing SVM-based active learning methods, both DS and BPS use an uncertainty metric, which selects the instances closest to the separating hyperplane of SVM. But unlike existing works, the concept of exploration and exploitation of reinforcement learning are introduced in the disclosed methodologies, which are discussed in the following paragraphs.

In an active learning setup, the existing hyperplane represents the current knowledge regarding the decision boundary between the two classes. However, this hyperplane is obtained by training over the existing training set $D_c$, and hence, it can be substantially different than the optimal hyperplane considering the entire dataset D. Many of the existing active learning methods, such as $SVM_{active}$, select a batch of k instances that are nearest to the current hyperplane $h_c$. Such an action is similar to the concept of full exploitation as the selection of instances are made entirely based on the existing knowledge of the environment. Such methods fail to shift the initial hyperplane towards the ideal hyperplane because every iteration selects instances that are closest to the prevailing hyperplane without any exploration. Thus, they perform poorly if the initial hyperplane is far-off from the ideal hyperplane. Specifically, for TAR datasets that have very small prevalence (the proportion of relevant documents is very small), a uniform random selection at initialization most often returns a hyperplane which is far-off from the optimal hyperplane. So, such methods perform poorly on such datasets.

An alternative to full exploration can be a mix of exploration and exploitation, where instances are not only selected by their distance from the hyperplane, but also by a diversity criterion. Based on the inventor's observations of a large number of real-life TAR datasets, they found that many documents are substantially similar to each other, so it is desirable to enforce diversity among the instances selected in a batch. Both DS and BPS facilitate diversity, but they differ in the way they select an instance. The instance selection of DS is deterministic, whereas the instance selection of BPS is probabilistic. For the DS method, all of the available documents are first sorted in a non-decreasing order of their distance from the current hyperplane $h_c$ and then all of the documents are filtered (not selected to be in the current batch) which are similar to the last instance selected in the current batch. For BPS, a probability vector is constructed and used to select a document in inverse proportion to its distance from the current hyperplane. Using probabilistic selection, BPS uses an idea that is similar to the concept of the randomized weighted majority (RWM) technique [reference 36] used for no-regret online learning. Considering the documents in increasing order of their distance from the hyperplane ensures exploitation, and filtering similar documents thus enables the selection of documents which otherwise would not have been selected, ensuring exploration.

TABLE #2

Technique 2: Select A Batch

| | |
|---|---|
| Input | |
| | • $h_c$, current hyperplane |
| | • D, available instances |
| | • k, batch size |
| | • t, similarity threshold |
| Output | |
| | • A batch of k documents to be included in training |
| 1 | if Strategy is DS then |
| 2 | $\quad B_c \leftarrow$ EmptySet( ) |
| 4 | $\quad$ while Size ($B_c$) < k do |
| 5 | $\quad\quad$ Insert($B_c$, I[1]) |
| 6 | $\quad\quad$ S $\leftarrow$ GetSimilar(I[1], I, D, t, similarity = cosine) |
| 7 | $\quad\quad$ I $\leftarrow$ Remove(I, S) |
| 8 | else if Strategy is BPS then |
| 9 | $\quad$ w $\leftarrow$ 1.0/(Distance($h_c$, D)$^2$ |
| 10 | $\quad$ w $\leftarrow$ Normalize(w) |
| 11 | $\quad$ I $\leftarrow$ List(D) |
| 12 | $\quad$ while Size ($B_c$) < k do |
| 13 | $\quad\quad$ c $\leftarrow$ Choose(I, prob = w, num = 1) |
| 14 | $\quad\quad$ Insert($B_c$, c) |
| 15 | $\quad\quad$ S $\leftarrow$ GetSimilar(c, I, D, t, similarity = cosine) |
| 16 | $\quad\quad$ I $\leftarrow$ Remove(I, S) |
| 17 | $\quad\quad$ w $\leftarrow$ Normalize(w[I]) |
| 18 | return $B_c$ |

In TABLE #2 (Technique 2), both of the batch selection methods (namely DS and BPS) are introduced and outlined (note: these batch selection methods relate to Technique 1's Line 3). In addition, to the current hyperplane $h_c$ and available dataset D, both of these batch selection methods also have a user-defined parameter $t \in [0, 1]$, which denotes a cosine similarity threshold. Lines 2-7 describe the DS method and Lines 9-17 describe the BPS method. For DS, in Line 2, the documents are first sorted in increasing order based on their absolute distance from the prevailing hyperplane $h_c$ to get the sorted indices of the available documents, D in I. In Line 5, the nearest one document is chosen deterministically and inserted it into the current batch set, $B_c$. Then the indices of the documents are obtained that have cosine angle ≥t with the currently selected document, I[1] (including I[1]). All of the obtained indices are then removed from the I and Lines 5, 6, and 7 are repeated until $B_c$=k. For the probabilistic sampler (BPS), distance from the hyperplane is calculated over the unlabeled documents. For some documents, the distance value can be 0 (falling over the hyperplane). In those cases, a minimum absolute distance is set as the distance of those documents from the hyperplane. This is done as in Line 9, where there is an inverse operation. In Line 10, the weight vector is normalized to convert it into probability vector. In Line 13, one document, c, is chose using the weight, w, calculated in Line 10. Then, the same operations are performed as in Lines 5, 6 and 7. Finally, the weight, w is re-normalized as some of the documents have been removed from index list, I in Line 16.

Note: the proposed DS method is somewhat similar to Brinker's method [reference 5], but the latter has a trade-off parameter that determines the importance between the distance from hyperplane and the diversification of the instances. Such a parameter is hard to choose. Also, the proposed DS method is less restrictive than Brinker's method as the former only enforces an instance to be selected if it is non-similar to the previously selected instance. On the other hand, Brinker's method requires the instance to be non-similar to all of the previously selected instances in the current batch. Experimental results are discussed below which validate that both DS and BPS perform better than Brinker's method on real-life legal datasets.

Computational Complexity

In this section, the computational complexity of the proposed DS and BPS methods as described in TABLE #2 (Technique 2) are analyzed. For DS, sorting in Line 3 takes $O(|D|\log|D|)$ time after the $O(|D|)$ distance calculation operation. For a small batch size, k (in our case, k=64), the insert operation takes a constant time, $O(1)$. Line 6 takes $O(k \cdot |I|)$ time. In this process, elements (documents) are not actually removed from I. Instead, a flag is unset (i.e., indicate not available for choosing) for each of those documents, and when implementing Line 4, a pointer is kept to the first document where the flag is set i.e., indicate (available for choosing). Also, when there are similar documents in Line 6, those documents are in the order of I. So, in Line 7, $|S|$ flags are unset which takes $O(|S|)$ time. Hence, the computational complexity of DS is $O(|D|\log|D|)$ as $O(k \cdot |I|)$ is much less than $O(|D|\log|D|)$. For the probabilistic sampler, the initial distance computation and normalization takes $O(|D|)$ operations. The main cost incurs from k "choose" operations which take $O(k \cdot |I| \cdot \log|I|)$ time.

B. Stopping Condition

The primary motivation for having a stopping condition is to stop training as early as possible (training is costly). However, there is a desire to confirm that the final hyperplane h is stable (i.e., the prediction model will not change considerably if more training documents are added). For tracking stability, the method described herein (e.g., Technique 1) can use Cohen's Kappa agreement [reference 29], which is a metric used in computational linguistics for measuring inter-coder agreement. Let's say that, after the batch update operation in Line 8 of Technique 1, the hyperplane is h and before the update, it was h'. The Kappa agreement measures how much these two hyperplanes h and h' agree on their prediction of labels on a carefully chosen test set. If h and h' agree on "a" instances out of "n" instances, the fraction a/n represents the observed agreement, $A_o$. However, the observed agreement needs to be scaled with respect to the chance agreement, $A_e$, which measures the agreement that is expected between hyperplanes h and h' purely by chance. For calculating $A_e$, Cohen's Kappa computes the likelihood by which the hyperplanes h and h' agree with each other even if they are independent. Mathematically, this is represented as follows:

$$A_e = P(+1|h)P(+1|h') + P(-1|h)P(-1|h') \quad (1)$$

where P (+1|h) is the probability that hyperplane h labels an instance as being +1, which is estimated based on the proportion of observed instances that h labels as +1. Similarly, the proportion of observed instances that hyperplane h labels as −1 provides P (−1|h). The same pair of expressions can also be obtained for hyperplane h' and can be used in the above equation (1) to measure $A_e$. Once, $A_o$ and $A_e$ have been calculated then Cohen's Kappa, κ is computed as follows:

$$K = \frac{A_0 - A_e}{1 - A_e} \quad (2)$$

The value $A_o - A_e$ quantifies the agreement between hyperplanes h and h' that is found beyond chance which is normalized by the maximum possible quantity for this value $(1-A_e)$. Even though the ratio in the range [0.8, 1.0] is considered good, a much stronger guarantee is wanted for a legal dataset. For all datasets, the training is stopped when κ reaches ≥0.991 for several consecutive iterations.

In view of the foregoing, the technique 1 (TABLE #1) can implement the Kappa Stopping criteria discussed above with respect to equations 1 and 2. The Kappa Stopping criteria can be characterized as shown in TABLE #3 (note: this is also referred to herein as technique 3).

TABLE #3

Technique 3: Kappa Stopping Criteria

Input
    ($h_{c-1}$, $h_C$) SVM classification hyperplanes
    $D_T$, all instances, including training ($D_C$ + D)
    $t_{stop}$, threshold at which to stop
Output
    True or False
1.    $S_{c-1} \leftarrow$ PredictLabel($h_{c-1}$, $D_T$)
2.    $S_c \leftarrow$ PredictLabel($h_c$, $D_T$)
3.    $$A_o \leftarrow \frac{|Sp_c \cup Sp_{c-1}| + |Sn_c \cup Sn_{c-1}|}{|S_c \cup S_{c-1}|}$$

where $Sp_c$ is the set of instances with positive label at iteration c, and $Sn_c$ is the set of instances with negative label at iteration c 4.    $$A_e \leftarrow \left(\frac{|Sp_c|}{|S_c|} \times \frac{|Sp_{c-1}|}{|S_{c-1}|}\right) + \left(\frac{|Sn_c|}{|S_c|} \times \frac{|Sn_{c-1}|}{|S_{c-1}|}\right)$$
5.    return $t_{stop} \leq A_o - A_e/1 - A_e$ Note:
technique 3 is also described in detail below with respect to FIG. 10.

It should also be appreciated that technique 1 (TABLE #1) can implement other types of stopping criteria in addition to the Kappa Stopping criteria discussed above with respect to equations 1 and 2 and TABLE #3. For example, technique 1 (TABLE #1) can implement the alternative stopping criteria discussed in detail below with respect to TABLE #4 (note: this is also referred to herein as technique 3').

TABLE #4

General Technique 3': Generic Stopping Criteria

Input
- ($h_1$, $h_2$, ..., $h_C$) SVM classification hyperplanes
- $D_T$, all instances, including training ($D_C$ + D)
- $t_{stop}$, threshold at which to stop Output
- True or False 1.    ($S_{T1}$, $S_{T2}$, ... $S_{Tc}$) ← ( Score($h_1$, $D_T$), Score($h_2$, $D_T$), ..., Score($h_c$, $D_T$) )
2.    s ← Aggregate($S_{T1}$, $S_{T2}$, ..., $S_{Tc}$)
3.    return $t_{stop} \leq s$ Note:
Technique 3' is also described in detail below with respect to FIGS. 11 and 16.

IV. Experiments

The proposed DS and BPS methods have been implemented in a commercial system which is deployed in iControl$^{ESI}$®'s e-discovery platform, Recenseo®. Under the same platform, two of the existing methods, SVM$_{active}$ [reference 3] and Brinker [reference 5] have been implemented. For SVM, LibLinear was used which is an open-source linear SVM implementation which is well-known for its good performance with large-scale text classification. A set of experiments were performed for evaluating the performance of the proposed methods, DS and BPS, on a number of legal system datasets and publicly available datasets. Experimental results also include a comparison between the proposed DS and BPS methods with the known SVM$_{active}$ and Brinker's methods. The proposed DS and BPS methods have only one user-defined parameter and that is a similarity threshold value t (see TABLE #2). The experiments on a large number of datasets show that a reasonable value for similarity is between 0.50 and 0.95, and within this range, the performance of the model differs only marginally. For all of our experiments, this t value was fixed to be 0.85. Brinker's method also has a parameter which is the relative importance between hyperplane distance and diversity. In the experiment, Brinker's parameter was set to 0.85 as well. All of the experiments were run on a computer with a quad-core Intel XEON E5-2665, 2.4 Ghz processor running CentOS 6.6 operating system. For the largest dataset that was used, the time to run each iteration of batch-mode active learning was about 1 minute for $SVM_{active}$, and approximately 5 minutes for the remaining three methods.

A. Datasets

In these experiments seven matters were used. For each of these matters, the statistics of the corresponding dataset are presented in TABLE #5. For each matter, the dataset is partitioned into Train and Test, and the active learning is performed over the Train partition, and the Test partition is only used for evaluation.

The first two matters, ACQ and MONEY-FX, are from the publicly available Reuters Dataset (http://archive.ics.uci.edu/ml/machine-learning-databases/reuter21578-mld/reuters21578.tar.gz). This dataset has a total of 21,578 documents. Matters D1-D4 correspond to documents that a review team examined for responsiveness in two distinct product liability lawsuits. The team consisted of approximately 50 attorneys, and they conducted the review in a traditional linear fashion over the course of several months, in 2013 and 2014. The reviewers designated each document as responsive to lawsuit 1 only (D1), lawsuit 2 only (D2), lawsuit 3 only (D3) and lawsuit 1, 2, and 3 (D4). There are 788,875 documents in D1-D4, after filtering out files without extractable text. Matter C comes from another dataset of 366,999 documents which was reviewed by 30 attorneys for a particular lawsuit. This dataset has a higher prevalence (25.98%) than the other datasets because a keyword search was run on the documents which filtered out a larger number of non-responsive documents (initially, the prevalence was around 3%). From TABLE #5, it is evident that the collection is rich in terms of prevalences in that there is a collection with low (1.20), medium (6.20, 11.24) and high prevalence (25.98) scores. Finally, the prevalence score for test documents reveals that they are a true representative of the training documents.

B. Performance Metrics

The experiments used recall for measuring a technique's performance because this is used in real-life TAR tasks in the legal domain. Note: recall is computed over the held-back test dataset using the final model, which is learned using active learning. If on a test dataset, $R_p$ is the number of documents that are marked as responsive by a prediction method and $R_t$ is the number of true responsive documents, recall is defined as $R_p/R_t$. However, recall does not provide any indication of the attorneys' effort for labeling the train dataset. To determine this, a different approach is used, which is discussed below.

In active learning-based training in the legal domain, there are two phases of review by the attorneys. The first phase goes along with the active learning process, in which the attorneys provide feedback on the batches of documents that are selected by the active selection strategy. However, when the model stabilizes and the final model is obtained, the "Second Pass" review of the remaining part of the training data (which has not been used for training the model) begins. Let's call this set of instances $D_r$. To minimize reviewers' efforts, the goal of the second pass is to choose a small subset of documents from $D_r$, of which the majority will be responsive. For this, the documents in $D_r$ are ranked based on their likelihood to be responsive. When using linear SVM, this ranking can easily be done by finding the signed distance of a document from the separating hyperplane returned by the final model. The more positive the distance, the more likely it is that the document is responsive. So, the documents in $D_r$ are sorted in the non-increasing order of their signed distance, and a fraction of documents from the beginning of this sorted list are considered for the second pass review. The yield curve shows the relationship between recall and the minimum fraction of documents that must be reviewed to achieve that recall value. The steeper the yield curve, the better the model, and the fewer number of documents are needed for the second pass review. Also note that, in real-life TAR, yield curve is used to determine the required bias of the classifier for obtaining a desired recall metric (aka model calibration). A yield curve is also used to show the reviewers' efforts using the proposed DS and BPS methods.

C. Performance Comparison of DS and BPS with the Existing Methods

For each of the matters in this experiment, four distinct linear SVM models where trained using the following four

TABLE #5

Dataset Statistics

| Matter | Total no. of features | Train Documents | | | Test Documents | | |
|---|---|---|---|---|---|---|---|
| | | Total | Positive | Prevalence (%) | Total | Positive | Prevalence (%) |
| ACQ | ~41K | 14,668 | 1650 | 11.24 | 6,910 | 798 | 11.54 |
| MONEY-FX | ~41K | 14,668 | 539 | 3.67 | 6,910 | 262 | 3.70 |
| C | ~2.6 millions | 358,903 | 93,256 | 25.98 | 8,096 | 2,094 | 25.88 |
| D1 | ~6.7 millions | 772,491 | 14,726 | 1.20 | 16,384 | 364 | 2.22 |
| D2 | ~6.7 millions | 772,491 | 48,355 | 6.20 | 16,384 | 1,142 | 6.97 |
| D3 | ~6.7 millions | 772,491 | 95,857 | 12.40 | 16,384 | 2,199 | 13.42 |
| D4 | ~6.7 millions | 772,491 | 158,938 | 20.75 | 16,384 | 3,284 | 20.04 | active learning methods: DS, BPS, SVM$_{active}$, and Brinker. The performance of these four methods were compared by tracking the recall of their trained model over test data across all training stage iterations until the model stabilized. In FIGS. 2A, 2B, 2C and 2D, and FIGS. 3A, 3B, and 3C, there are illustrated seven plots, one for each of the matters. In each plot, the number of training instances are shown along the x-axis of the plot, and the recall value is shown along the y-axis. Within each plot there are four curves, one for each of the active learning methods. The method for which the recall value is the highest for a given number of training instances is considered to be the best.

As can be observed from these plots, for all of the methods and all of the datasets, as the training data was increased, the recall of the model improved, which is expected. For most datasets, the BPS method has a higher recall than the remaining three methods at all stages of training. One exception was the ACQ dataset (FIG. 3B) for which the DS method is the best during the initial part of the training but as the model stabilizes, the BPS method comes back to the best position and retains that position by a good margin from the remaining methods. Another exception is the D4 dataset, for which both the BPS and DS methods have the best performance with a marginally higher recall for the DS method. Overall, the DS method is the second best method, and its performance is almost the same as the BPS method for the D2, D3, and D4 datasets. Both the proposed DS and BPS methods have a higher slope in their curves at the beginning part of the training. This proves their ability on selecting good instances early when the prevailing hyperplane may not be close to the ideal one. Except for the D1 dataset, the Brinker's method generally performed the worst for all the proprietary datasets. For some datasets (D3, D4, and C), the performance of the Brinker's method was worse than either of the proposed DS and BPS methods by a good margin across the entire training period. The performance of SVM$_{active}$ is somewhat between the Brinker method and the proposed DS and BPS methods. In summary, the plots in these figures clearly demonstrate that the new active learning methods disclosed herein are substantially superior to the existing methods.

D. Yield Curve Results on the BPS Method

The yield curves for both of the new DS and BPS methods across all the datasets have been studied. But, due to space limitations, FIGS. 4A, 4B, 4C, 4D, 4E and 4F show the yield curves only for the BPS method for six datasets. The trend is similar for the remaining dataset and also for the DS method. Note: the yield curve is built from the ranking of unused training data obtained from the stabilized model, and by using the yield curve one can determine the percentage of documents that is required for the second pass review for achieving a specific recall value for a particular dataset. For all of the experiments, $\kappa=0.991$ was used for deciding the stabilization of the model. For all of the yield curves shown in FIGS. 4A, 4B, 4C, 4D, 4E and 4F, there is shown along the x-axis the percentage of remaining training documents as are considered from the rank order built by the final model; and along the y-axis there is shown the corresponding recall obtained. Similar to a Receiver Operating Characteristic (ROC) curve, the steeper the curve, the better the performance. Also, when considering all of the documents, the recall value becomes 1.0. So, what is interesting is to see the percentage of documents that the attorneys need to review for achieving an acceptable recall in real life (usually 0.75). As can be seen, for the least prevalent dataset (D1), the second pass review only needs to consider 3.38% of the documents for achieving 0.75 recall, which is a 96.62% savings in terms of attorney effort. For datasets that have high prevalence, these values are naturally larger; for instance, for dataset D2-D4, 0.75 recall is reached by reviewing roughly one-third of the documents, resulting in a 67% savings.

In the inset of each of the plots in FIGS. 4A, 4B, 4C, 4D, 4E and 4F, there is shown another curve which illustrates how the number of training documents improves the learning model, which in turn decreases the percentage of documents that are needed for achieving 75% recall in second pass review. The downward trend in the inset plots confirms that as the learning progresses and the Kappa value stabilizes, the percentage of documents for second pass review decreases for all the datasets.

In the following TABLE #6, there is summarized the percentage of documents that are needed to achieve 75% recall for the second pass review. There is also shown the percentage of documents that are used for training the model when it is stabilized. These are the documents for which attorneys provide labels. For matter D1, only 5% of the documents need to be reviewed (95% savings), but for matter C, this value is around 55% (45% savings). The reason for the higher value in matter C is due to the high prevalence of matter C (which is 26%). Note: that attorneys performing TAR tasks are expected to review all of the relevant documents, so for matter C, they are required to review 26% of the documents, but using our model, the attorneys only need to review 55% of the documents to yield a 0.473 precision, which is considered excellent in the TAR domain.

TABLE #6

Statistics to Review to Achieve 75% Recall

| Matter | % Docs to review to achieve 75% Recall | % Docs used for training |
|---|---|---|
| ACQ | 10.89 | 12.66 |
| MONEY-FX | 4.51 | 14.84 |
| C | 46.30 | 8.62 |
| D1 | 3.38 | 1.76 |
| D2 | 33.40 | 1.80 |
| D3 | 33.40 | 1.71 |
| D4 | 36.76 | 1.73 |

E. Stabilization Behavior Study on BPS

In this experiment, the Cohen Kappa ($\kappa$) was shown to be an excellent metric for determining the stabilization point of an active learning method. Again, the results for the BPS dataset only are shown, as the results for the DS method are almost identical. In FIGS. 5A, 5B, 5C, 5D, 5E and 5F, each plot shows two curves; one shows the relationship between the Kappa value (indicated by triangle) and the number of training documents, and the other shows the relationship between the F1-score (harmonic mean of precision and recall—indicated by circle) of the model and the number of training documents. For all of the datasets, both the Kappa value and the F1-score of the model increase as the number of training samples were increased. However, as can be seen in FIGS. 5A, 5B, 5C, 5D, 5E and 5F, when the Kappa value converges (the curve becomes horizontal), the F1-score also becomes horizontal indicating the model's stabilization. In all the previous experiments, the recall metric was used, but for tracking stabilization experiment the F1-score was used because the recall metric in isolation cannot indicate model stabilization. This is due to the fact that a training model can always improve its recall by sacrificing the precision, and this can be done simply by biasing the hyperplane. The F1-score considers both precision and recall together and hence, it is a neutral metric that can be used for the model stabilization purposes. For the entire study, a Kappa value of 0.991 was used for deciding model stabilization.

V. Discussion and Lesson Learned

A. Choice of Learning Technique.

As mentioned previously, existing research has shown SVM to be one of the best methods for text classification. In addition to SVM, the inventors have experimented with a number of other techniques including Naive Bayes, Nearest Neighbor, Logistic Regression, Perceptron, and various ensemble approaches on real-life datasets. In all cases, SVM performed better than, or at least as good as, every other method attempted. SVM's also easily lend themselves to active learning approaches, and are computationally efficient even for very large numbers of features and examples.

B. Feature Selection and Representation.

In most real-life legal datasets, the document collection contains several issues that impact the performance of any classification technique. There are exact duplicate documents, near duplicate documents, Optical Character Recognition or Scanned (OCRed) documents with significant amounts of noisy text, spreadsheets with significant numerical data, binary files, etc. . . . Without any preprocessing, these files cause computation times and storage volumes that exceed acceptable levels. It has been found it is necessary to clean the data before the learning task to achieve the best performance. First, document types are removed that contain little or no usable text from the predictive coding collection, and these documents are resolved those through other means. Second, several techniques can be implemented for identifying and removing noisy tokens from the collection. This includes identifying OCR errors and other noisy tokens through a variety of heuristics, filtering stop words, and filtering words that are uncommon in the collection.

Another significant challenge with real-life legal datasets that is unaddressed in the existing literature is that document collections are rarely fixed. Over the course of litigation, new documents can be added to the collection and other documents removed. However, existing literature assumes that the document collection is fixed before the learning task begins, and stays fixed throughout. This has major implications on the selected feature representation. Specifically, any term weighting scheme with a global weighting component (e.g., Term Frequency-Inverse Document Frequency (TF-IDF)) could result in feature vectors changing over the course of the learning task with unstudied effects on the active learning process. In addition, iControl$^{ESI}$® has performed experiments with TF-IDF, Latent Semantic Analysis (LSA), Latent Dirichlet Allocation (LDA), and Log-Entropy feature weighting schemes and found them to perform no better than the standard bag-of-words model. One other potential feature selection scheme is the hashing trick, which would be suitable since it has no global component, but it was also found to perform worse than the bag-of-words model.

VI. Conclusion

In this disclosure, two active learning-based DS and BPS methods for "predictive coding" in the legal domain have been discussed. Experimental results have shown that both of the proposed DS and BPS methods achieve better recall than the existing methods that are used in TAR processes. Further, experimental results have also show the stabilization behavior of the disclosed methods. Finally, practical recommendations for the various design choices have been discussed.

Basic Functionalities-Configurations of an Apparatus Implementing Techniques 1, 2, and 3/3' (TABLES #1-4)

Referring to FIG. 6, there is a diagram of an exemplary apparatus 600 configured in accordance with an embodiment of the present disclosure. As shown, the apparatus 600 includes a processing unit 602 (e.g., processor 604, memory 606), and an operator interface 608 (e.g., display 610, keyboard 612). The apparatus 600 may include other well known components but for clarity those well known components are not described herein while the components 602, 604, 606, 608, 610, and 612 which are relevant to the invention are described in detail herein. Basically, the apparatus 600 is configured as described above to: (1) receive a set of unlabeled documents D (e.g., legal documents), (2) perform techniques 1 and 2 (the DS process or BPS process), and then one of technique 3 or 3' while interacting with an expert 614 as needed to construct a classification model (i.e., hyperplane $h_c$), and (3) use the classification model (i.e., hyperplane $h_c$) to analyze and discriminate the documents D so they are classified as either relevant documents $D_r$ (e.g., related to particular legal issue(s)) or non-relevant documents $D_{nr}$ (e.g., not related to particular legal issue(s)). In doing this, the apparatus's processor 606 can execute process-executable instructions stored in the memory 608 to enable the operations associated with the aforementioned technique 1 (see FIG. 7—TABLE #1), technique 2 (see FIGS. 8-9—TABLE #2), and technique 3 (see FIG. 10—TABLE #3) or technique 3' (see FIG. 11—TABLE #4).

Figure 7:
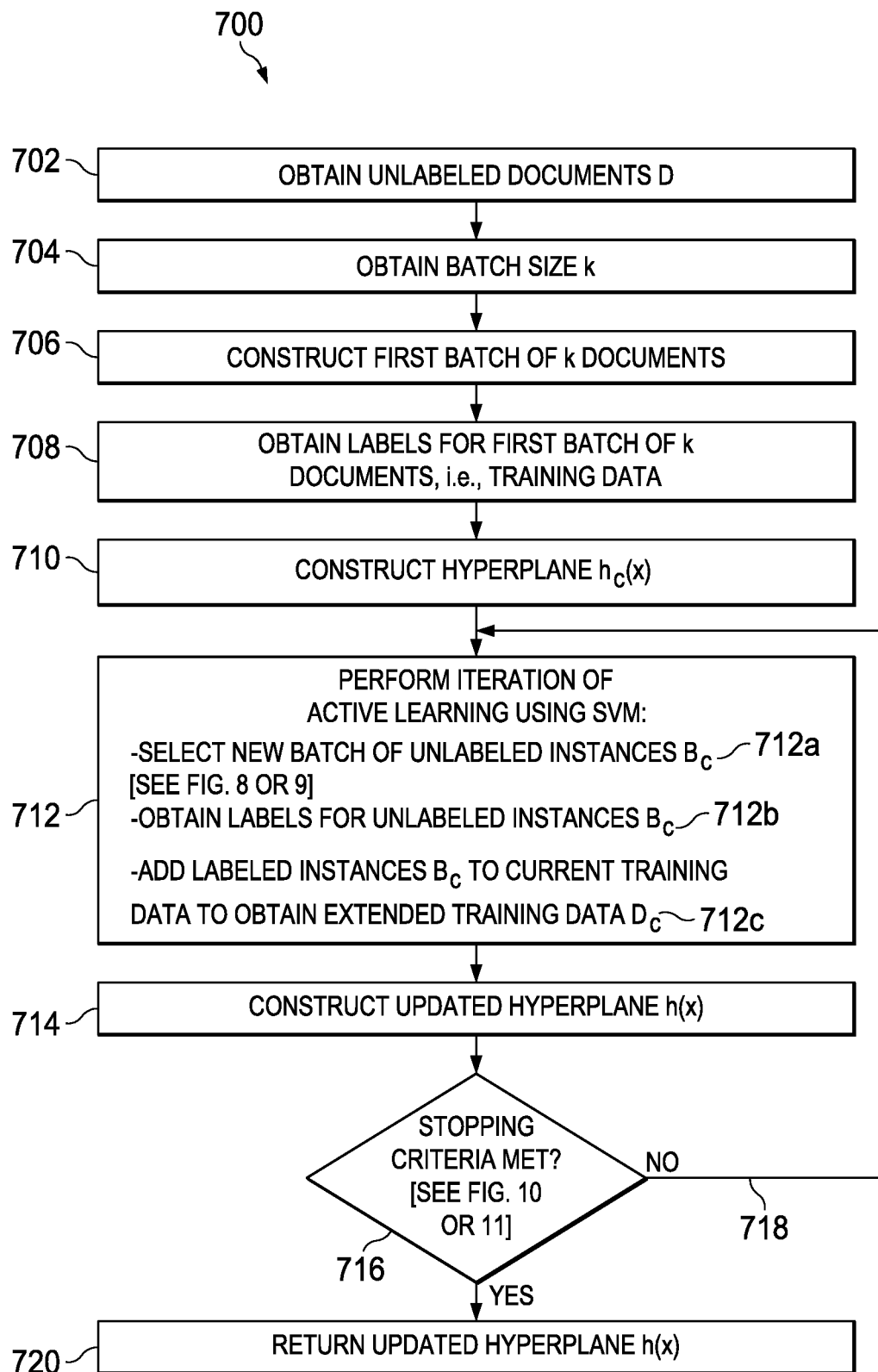
FIG. 7 is a flowchart of a method performed in the apparatus shown in FIG. 6 to implement technique 1 (TABLE #1) in accordance with an embodiment of the present disclosure.

Referring to FIG. 7, there is a flowchart of a method 700 performed in the apparatus 600 to implement technique 1 (TABLE #1) in accordance with an embodiment of the present disclosure. At step 702, the apparatus 600 is operable to obtain an unlabeled set of documents D. At step 704, the apparatus 600 is operable to obtain (e.g., from the expert 614) a batch size k. At step 706, the apparatus 600 is operable to construct a first batch of k documents D. At step 708, the apparatus 600 is operable to obtain (e.g., from the expert 614) labels for the first batch of k documents D, wherein the labeled first batch of k documents D are referred to as training data documents. At step 710, the apparatus 600 is operable to construct a hyperplane $h_c(x)$ using the labeled first batch of k documents D. At step 712, the apparatus 600 is operable to perform an iteration of active learning using a support vector machine (SVM). In one example, the perform step 712 can comprise: (i) select a new batch of unlabeled instances (documents) $B_c$ using a current version of the hyperplane $h_c(x)$, an unlabeled set of available documents D, and the batch size k (step 712a) (see FIGS. 8 and 9 for detailed discussion of exemplary ways to perform the select step 712a); (ii) obtain (e.g., from expert 614) labels for the new batch of unlabeled instances $B_c$ (step 712b); and (iii) add the labeled new batch of instances $B_c$ to a current version of the training data documents referred to as extended training data documents $D_c$ (step 712c). At step 714, the apparatus 600 is operable to construct an updated hyperplane h(x) using the extended training data documents $D_c$. At step 716, the apparatus 600 is operable to determine whether a stopping criteria has been met (see FIGS. 10 and 11 for detailed discussion of exemplary ways to perform the determine step 716). At step 718, the apparatus 600 is operable based on the determination of step 716 that the stopping criteria has not been met to repeat the perform step 712, the third construct step 714, and the determine step 716. At step 720, the apparatus 600 is operable based on the determination of step 716 that the stopping criteria has been met to return the updated hyperplane h(x).

Figure 8:
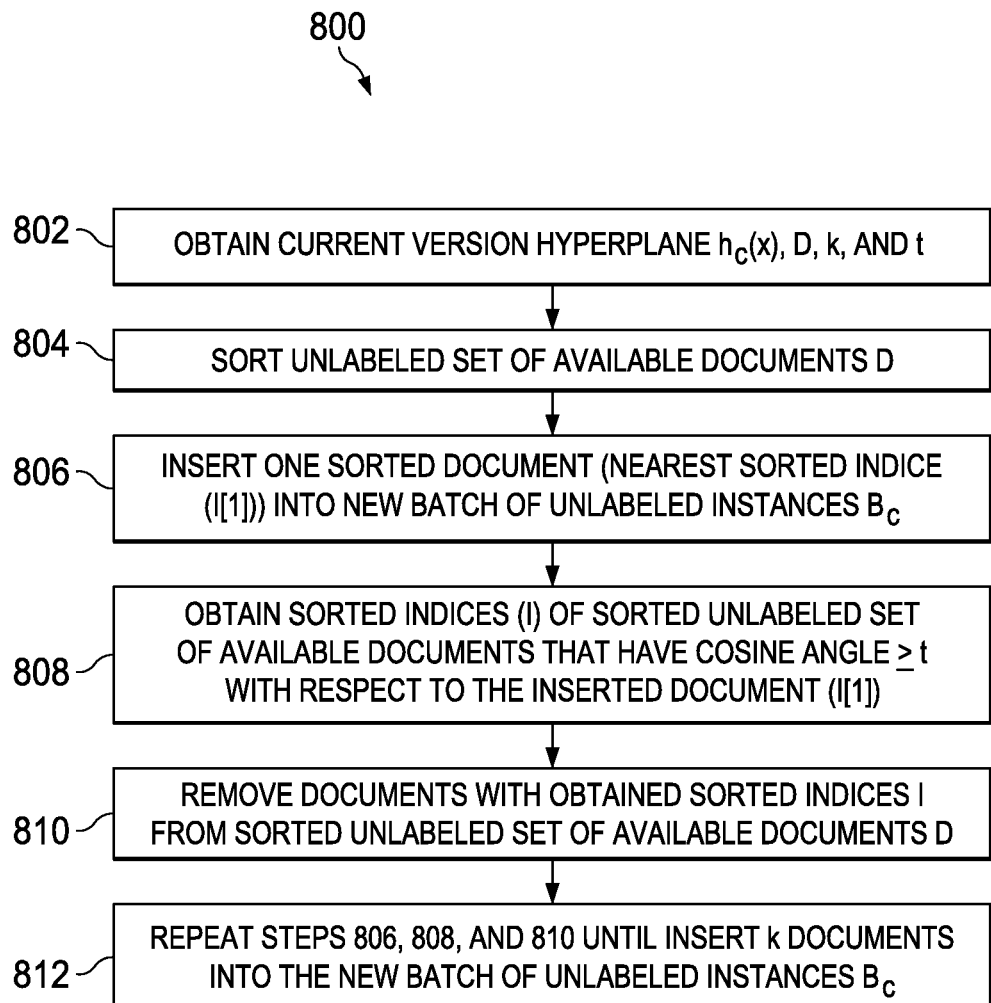
FIG. 8 is a flowchart of a method performed in the apparatus shown in FIG. 6 to implement technique 2

Referring to FIG. 8, there is a flowchart of a method 800 performed in the apparatus 600 to implement technique 2 (TABLE #2's DS process—FIG. 7's step 712a) in accordance with an embodiment of the present disclosure. At step 802, the apparatus 600 is operable to obtain the current version of the hyperplane $h_c(x)$, the unlabeled set of available documents D, the batch size k, and a cosine similarity threshold t. At step 804, the apparatus 600 is operable to sort the unlabeled set of available documents D in increasing order based on each of the documents absolute distance from the current version of the hyperplane $h_c(x)$ to obtain sorted indices I of the unlabeled set of available documents D. At step 806, the apparatus 600 is operable to insert the sorted document having a nearest sorted index I[1] of the sorted unlabeled set of available documents D into the new batch of unlabeled instances $B_c$. At step 808, the apparatus 600 is operable to obtain sorted indices I of the sorted unlabeled set of available documents D that have a cosine angle ≥t with respect to the inserted document I[1]. At step 810, the apparatus 600 is operable to remove the documents with the obtained sorted indices I from the sorted unlabeled set of available documents D. At step 812, the apparatus 600 is operable to repeat the insert step 806, the second obtain step 808, and the remove step 810 until insert k documents into the new batch of unlabeled instances $B_c$.

Referring to FIG. 9, there is a flowchart of a method 900 performed in the apparatus 600 to implement technique 2 (TABLE #2's BPS process—FIG. 7's step 712a) in accordance with an embodiment of the present disclosure. At step 902, the apparatus 600 is operable to obtain the current version of the hyperplane $h_c(x)$, the unlabeled set of available documents D, the batch size k, and a cosine similarity threshold t. At step 904, the apparatus 600 is operable to construct a weight vector w based on an inverse step of a distance from the current version of the hyperplane $h_c(x)$ for each document from the unlabeled set of available documents D. At step 906, the apparatus 600 is operable to normalize the weight vector w to convert the weight vector w into a probability vector. At step 908, the apparatus 600 is operable to choose a document I[1] from the unlabeled set of available documents D using the weight w of the probability vector. At step 910, the apparatus 600 is operable to insert the chosen document I[1] into the new batch of unlabeled instances $B_c$. At step 912, the apparatus 600 is operable to obtain sorted indices I of the remaining unlabeled set of available documents D that have a cosine angle ≥t with respect to the chosen document I[1]. At step 914, the apparatus 600 is operable to remove the documents with the obtained sorted indices I from the sorted unlabeled set of available documents D. At step 916, the apparatus 600 is operable to re-normalize the weight vector as documents have been removed from the sorted unlabeled set of available documents D. At step 918, the apparatus 600 is operable to repeat the choose step 908, the insert step 910, the second obtain step 912, the remove step 914, and the re-normalize step 916 until select the new batch of unlabeled instances $B_c$.

Referring to FIG. 10, there is a flowchart of a method 1000 performed in the apparatus 600 to implement technique 3 (TABLE #3—FIG. 7's step 716) in accordance with an embodiment of the present disclosure. At step 1002, the apparatus 600 is operable to obtain the current version of the hyperplane h(x), the unlabeled set of available documents D and the extended training data documents $D_c$ referred to as the total set of documents $D_T$, and a stopping threshold $t_{stop}$. At step 1004, the apparatus 600 is operable to construct a score vector $S_c$ using the current hyperplane h(x) and the total set of documents $D_T$. At step 1006, the apparatus 600 is operable to retrieve a previous score vector $S_{c-1}$. At step 1008, the apparatus 600 is operable to obtain a set of documents $D_{+c}$ from the documents $D_T$ that have a positive score in $S_c$. At step 1010, the apparatus 600 is operable to obtain a set of documents $D_{-c}$ from the documents $D_T$ that have a negative score in $S_c$. At step 1012, the apparatus 600 is operable to obtain a set of documents $D_{+(c-1)}$ from the documents $D_T$ that have a positive score in $S_{c-1}$. At step 1014, the apparatus 600 is operable to obtain a set of documents $D_{-(c-1)}$ from the documents $D_T$ that have a negative score in $S_{c-1}$. At step 1016, the apparatus 600 is operable to obtain a set of documents in common, $D_+$, between $D_{+c}$ and $D_{+(c-1)}$. At step 1018, the apparatus 600 is operable to obtain a set of documents in common, $D_-$, between $D_{-c}$ and $D_{-(c-1)}$. At step 1020, the apparatus 600 is operable to obtain a probability, $P_+$, of a document having positive score in both score vectors $S_c$ and $S_{c-1}$ by counting a number of documents, $N_+$, in $D_+$ divided by the total number of documents, N, in D. At step 1022, the apparatus 600 is operable to obtain a probability, $P_-$, of a document having negative score in both score vectors $S_c$ and $S_{c-1}$, by counting a number of documents, $N_-$, in $D_-$ divided by the total number of documents, N, in D. At step 1024, the apparatus 600 is operable to obtain a value $A_o$ as $P_++P_-$. At step 1026, the apparatus 600 is operable to obtain a probability, $P_{+c}$, by counting a number of documents, $N_{+c}$, in $D_{+c}$ divided by the number of documents, N, in D. At step 1028, the apparatus 600 is operable to obtain a probability, $P_{-c}$, by counting a number of documents, $N_{-c}$, in $D_{-c}$ divided by the number of documents, N, in D. At step 1030, the apparatus 600 is operable to obtain a probability, $P_{+(c-1)}$, by counting a number of documents, $N_{+(c-1)}$, in $D_{+(c-1)}$ divided by the number of documents, N, in D. At step 1032, the apparatus 600 is operable to obtain a probability, $P_{-(c-1)}$, by counting a number of documents, $N_{-(c-1)}$, in $D_{-(c-1)}$ divided by the number of documents, N, in D. At step 1034, the apparatus 600 is operable to obtain a value $A_e$ as a probability of obtaining a positive document, $P_{+c}*P_{+(c-1)}$, plus a probability of obtaining a negative document, $P_{-c}*P_{-(c-1)}$. At step 1036, the apparatus 600 is operable to obtain a Kappa value L as $A_o-A_e$ divided by $(1-A_o)$. At step 1038, the apparatus 600 is operable to compare the Kappa value L to the stopping threshold $t_{stop}$ to determine whether $t_{stop} \leq A_o-A_e/1-A_e$ which indicates that the stopping criteria has been met. At step 1040, the apparatus 600 is operable to based on the determination that the stopping criteria has not been met, store the score vector $S_c$ to memory as a previous score vector $S_{c-1}$.

Referring to FIG. 11, there is a flowchart of a method 1100 performed in the apparatus 600 to implement technique 3' (TABLE #4's Accumulated History of Scores process—FIG. 7's step 716) in accordance with an embodiment of the present disclosure. At step 1102, the apparatus 600 is operable to obtain the current version of the hyperplane h(x), the unlabeled set of available documents D and the extended training data documents $D_c$ referred to as the total set of documents $D_T$, an accumulation function $A(S_c, S_{c-1}, \ldots, S_1)$, and a stopping threshold $t_{stop}$. At step 1104, the apparatus 600 is operable to construct a score vector $S_c$ using the current hyperplane h(x) and the unlabeled set of documents D. At step 1106, the apparatus 600 is operable to combine a current score vector $S_c$ with previous score vectors $(S_{c-1}, \ldots, S_1)$ using the accumulation function $A(S_c, S_{c-1}, \ldots, S_1)$ to obtain a stability value(s). At step 1108, the apparatus 600 is operable to compare the stability value s to the stopping threshold $t_{stop}$ to determine whether $t_{stop} \leq S$ which indicates that the stopping criteria has been met. At step 1110, the apparatus 600 is operable to based on the determination that the stopping criteria has not been met, store the current score vector $S_c$ to memory as a previous score vector $S_{c-1}$.

Second U.S. Provisional Application No. 62/246,719
Overview

A method is described such that when employing a machine learning process to predict the label or labels for documents in a collection, and a method, such as active learning, for selecting a document or documents to be labelled to improve the classifier in further iterations, similar documents to those selected are removed from further consideration for selection.

Similar documents are determined by calculating a similarity score between two document profiles that measures some quality of sameness. Example similarity scoring methods could include MD5 hashing for determining exact duplicate documents, Locality Sensitive Hashing for determining near duplicate documents. Another example frequently employed in eDiscovery would be document profiles represented by Latent Semantic Indexing, and using cosine similarity which would produce a score representing conceptual similarity. Finally, another method could be document profiles as term-frequency vectors and using cosine similarity.

In addition, a method is described such that at each iteration of the learning process a stability score is calculated to determine when to stop. The proposed method compares the scores or probabilities from the current iterations classifier for the entire document collection to the scores or probabilities from a previous iteration. In contrast to typically employed methods, such as F1, recall or precision, it does not depend on a subset of labelled documents to compute a stability score. Also, the proposed method is able to account for documents added or removed from a collection in the course of the learning process whereas traditional methods require adjustments to the previously labelled subset of documents so that it remains representative of the full collection.

For each document in the collection, its score or probability from the current iteration is compared to its score or probability from a previous iteration, resulting in a set of comparisons, one for each document in the collection. These comparisons are then accumulated into a final stabilization score that may be further adjusted by various methods, e.g. taking of moving average.

Description

One challenge with large, unstructured document collections, such as those produced in large civil litigation matters is that there are often duplicate, near duplicate, and otherwise very similar documents. A document draft may be emailed between several parties who each make a minor modification, with each draft being collected in litigation. Or, to take a classic example, one document may be discussing exploding Pintos, while another discusses combusting automobiles, and yet another discusses fiery cars. While using different language, they are still describing the same thing and are therefore similar.

In typical linear review, often methods are employed to identify duplicate, near duplicate and similar documents such that an attorney reviewing one document may review all similar documents resulting in an increase in efficiency and understanding. Typical methods for duplicate and near duplicate detection include hashing such as MD5 or locality sensitive hashing. Latent semantic indexing is often employed to detect conceptually similar documents, i.e., documents about the same thing but not necessarily using the same words. Other common methods include various forms of nearest neighbor searching.

A machine learning process is a series of steps by which a subset of documents are labelled, a classifier is trained using the labelled documents, a set of scores is generated for the unlabelled documents, and further documents are selected for labelling until an objective stopping criteria is met. Once the stopping criteria is met, the set of scores can be used to select a ranking of the unlabelled documents for further review, or to automatically select a label for each unlabelled document in the collection As an example, assume there is a set of documents and for each document a profile may be composed of its features (words, characters, phrases), metadata, and any other information specific to an individual document.

A subset of the documents are gathered through either judgmental sampling, e.g. keyword searches or other forms of manual gathering, or randomly that are considered the "seed set". These documents are presented to a user who labels each document as belonging, or not belonging, to a class or classes, e.g. relevant documents.

The document profile for each document in the seed set is used to train a machine learning classifier. A classifier composes a method for taking a subset of document profiles along with their labels, called the training set, and produces a mathematical model that can be used to predict the labels for other document profiles. The predictions are in the form of a numerical score or probability that represents the classifiers estimate of how a human would label the document. The specification of classifier model can include commonly used machine learning classifiers such as: support vectors machines, decision forests, nearest neighbors, logisitic regression, etc.

In active learning, the documents to be added to the training set are determined by taking an existing classifier and producing scores or probabilities on the set, or a subset, of the unlabelled documents. The scores or probabilities are used to select a document or subset of documents that are likely to improve the existing classifier once labelled. The proposed method specifies how to select the set, or subset, of unlabelled documents from which scores are generated.

Different methods can be used to select documents based on the scores from a classifier. In relevance feedback, a document or documents with the highest score or probability for an interested class are selected for labelling. In uncertainty sampling, a document or documents with the lowest probability or score for every class are selected for labelling. In probabilistic uncertainty sampling, first a probability distribution is generated using the scores or probabilities from the classifier such that documents with the lowest score or probability for every class are given the highest probability of being selected.

Using the proposed method, when a document is selected for labelling using a method, e.g. uncertainty sampling, a set of similarity scores are further calculated for the selected document and the remaining collection of unlabelled documents. The similarity score is separate from the score generated by the classifier, and could possibly be calculated using a different document profile than that used by the classifier. A similarity score is calculated between two documents and provides a measure of some quality of sameness. For example, the similarity score could be calculated as the number of words in common between the two documents.

Once the similarity score is calculated between the selected document and the remaining unlabelled documents, all documents that have a similarity score above a certain threshold are removed from consideration for further selection by the active learning method.

This process of calculating a classification model using the previously labelled documents, generating scores for the set, or a subset, of the unlabelled documents, and selecting a document for manual labelling while removing similar unlabelled documents for selection continues until a stopping criteria is satisfied.

Further, a method is described herein such that at each iteration of the learning process a stability score is calculated to determine when to stop further iterations of selecting documents for labelling. Typically, a score such as F1, recall or precision is calculated using the current classifier and some subset of previously labelled documents. This score is then compared to the F1, recall or precision score at previous classifier iterations for the same subset of previously labelled documents. When the difference between the current iteration and previous iterations falls below a certain threshold, the system is said to have stabilized and further iterations are unnecessary. To be valid, these methods need the subset of labelled documents to be representative of the entire collection of documents, i.e. a statistical sample. If the collection of documents changes during the course of the classification process, the subset of labelled documents will no longer be representative, necessitating another subset of labelled documents to be obtained at additional cost.

At each iteration of a learning process, the current classifier is used to generate a score for every document profile in the entire collection. The score for each document profile is compared to the score from a previous iteration or iterations of the learning process. The comparison could take the form of a simple difference between the scores in the current iteration and the immediately prior iteration. In another method, it could be calculated such that the comparison is given a positive value when the current score and prior score correspond to the same predicted label, and a negative, or no value, when the current score and prior score correspond to different predicted labels.

The comparisons for each individual document profile are then accumulated to calculate a single numeric value called the stability score. This accumulation could take the form of a simple sum. In another method called kappa agreement, the number of matching predicted labels between each iteration is counted and adjusted for the number of matching labels that would be expected to match purely by chance. The stability score could be further adjusted by taking its moving average over the current iteration and a number of previous iterations.

At each iteration the stability score is checked to see whether it meets or exceeds a certain specified threshold. Once the threshold has been met or exceeded, the system signals to the user that it has stabilized and further iterations of the learning process are unnecessary. For example, using kappa agreement, if the stability score indicates that 99% of the predicted labels match, it indicates that the predicted label at each iteration is only changing for 1 out of every 100 documents.

The aforementioned discussion describes details about a more generalized version of batch-mode active learning for TAR of documents in accordance with an embodiment of the present disclosure. More specifically, the aforementioned discussion describes details associated with a more generalized technique 1 (see TABLE #7), a more generalized technique 2 (see TABLE #8—DS process or BPS process), and a more generalized technique 3' (see TABLE #9).

TABLE #7

Generalized Technique 1': Batch Mode Active Learning Technique

Input
- D, unlabeled dataset
- k, batch size

Output
- Classification Model, M

1    $M_c \leftarrow$ ObtainInitialModel (D, k)
2    while Stopping Criteria not met do
3      $B_c \leftarrow$ SelectABatch (D, $M_c$, k)
4      $Y_{Bc} \leftarrow$ QueryLabels ($B_c$)
5      $D \leftarrow D \setminus B_c$
6      $D_c \leftarrow D_c \cup B_c$
7      $M_c \leftarrow$ Train ($D_c$)
8    $M \leftarrow M_c$
9    return M

TABLE #8

Generalized Technique 2: Select A Batch

Input
- $M_c$, current classification model
- D, available instances
- k, batch size
- GetSimilar( ) - function that computes similarity between a instance and remaining instances
- ProbabilityScore( ) - used to compute the probability for each document D using the current model $M_C$ Output
- A batch of k documents to be included in training 1. if Strategy is DS then
   a. $B_c \leftarrow$ EmptySet( )
   b. while Size ($B_c$) < k do
      i.    Insert($B_c$, I[1])
      ii.    $S \leftarrow$ GetSimilar(I[1], I, D)
      iii.    $I \leftarrow$ Remove(I, S)
2. else if Strategy is BPS then
   a. $w \leftarrow$ ProbabilityScore($M_c$, D)
   b. $I \leftarrow$ List(D)
   c. while Size ($B_c$) < k do
      i.    $c \leftarrow$ Choose(I, prob = w, num = 1)
      ii.    Insert($B_c$, c)
      iii.    $S \leftarrow$ GetSimilar(c, I, D)
      iv.    $I \leftarrow$ Remove(I, S)
      v.    $w \leftarrow$ Normalize(w[I])
3. return $B_c$

TABLE #9

Generalized Technique 3': Generic Stopping Criteria

Input
- ($M_1, M_2, ..., M_C$) classification models
- $D_T$, all instances, including training ($D_C + D$)
- $t_{stop}$, threshold at which to stop Output
- True or False 4. ($S_{T1}, S_{T2}, ... S_{Tc}$) $\leftarrow$ ( Score($M_1, D_T$), Score($M_2, D_T$), ..., Score($M_c, D_T$) )
5. $s \leftarrow$ Aggregate($S_{T1}, S_{T2}, ..., S_{Tc}$)
6. return $t_{stop} \leq s$ The techniques 1', 2' and 3' are discussed in more detail below with respect to FIGS. 12-16.

Basic Functionalities-Configurations of an Apparatus Implementing Techniques 1', 2', and 3' (TABLES #7-9)

Referring to FIG. 12, there is a diagram of an exemplary apparatus 1200 configured in accordance with an embodiment of the present disclosure. As shown, the apparatus 1200 includes a processing unit 1202 (e.g., processor 1204, memory 1206), and an operator interface 1208 (e.g., display 1210, keyboard 1212). The apparatus 1200 may include other well known components but for clarity those well known components are not described herein while the components 1202, 1204, 1206, 1208, 1210, and 1212 which are relevant to the invention are described in detail herein. Basically, the apparatus 1200 is configured to: (1) receive a set of unlabeled documents D (e.g., legal documents), (2) perform generalized techniques 1' and 2' (the DS process or BPS process), and then technique 3' while interacting with an expert 1214 as needed to construct a classification model (i.e., $M_c$), and (3) use the classification model (i.e., $M_c$) to analyze and discriminate documents D so they are classified as either relevant documents $D_r$ (e.g., related to particular legal issue(s)) or non-relevant documents $D_{nr}$ (e.g., not related to particular legal issue(s)). In doing this, the apparatus's processor 1206 can execute process-executable instructions stored in the memory 1208 to enable the operations associated with the aforementioned technique 1' (see FIG. 13—TABLE #7), technique 2' (see FIGS. 14-15—TABLE #8), and technique 3' (see FIG. 16—TABLE #9).

Referring to FIG. 13, there is a flowchart of a method 1300 performed in the apparatus 1200 to implement technique 1' (TABLE #7) in accordance with an embodiment of the present disclosure. At step 1302, the apparatus 1200 is operable to obtain an unlabeled set of documents D. At step 1304, the apparatus 1200 is operable to obtain (e.g., from the expert 1214) a batch size k. At step 1306, the apparatus 1200 is operable to construct a first batch of k documents D. At step 1308, the apparatus 1200 is operable to obtain (e.g., from the expert 1214) labels for the first batch of k documents D, wherein the labeled first batch of k documents D are referred to as training data documents. At step 1310, the apparatus 1200 is operable to construct a classification model $M_c$ using the labeled first batch of k documents D. For instance, the classification model $M_c$ can be any type of classification model such as, for example, a support vector machine (SVM) model, a logistic regression model, a nearest neighbors model, decision forest model, neural network model, Bayesian model, or ensemble model At step 1312, the apparatus 1200 is operable to perform an iteration of active learning using the classification model $M_c$. In one example, the perform step 1312 can comprise: (i) select a new batch of unlabeled instances $B_c$ using a current version of the classification model $M_c$, an unlabeled set of available documents D, and the batch size k (step 1312a) (see FIGS. 14 and 15 for detailed discussion of exemplary ways to perform the select step 1312a); (ii) obtain (e.g., from expert 614) labels for the new batch of unlabeled instances $B_c$ (step 1312b); and (iii) add the labeled new batch of instances $B_c$ to a current version of the training data documents referred to as extended training data documents $D_c$ (step 1312c). At step 1314, the apparatus 1200 is operable to construct an updated classification model $M_c$ using the extended training data documents $D_c$. At step 1316, the apparatus 1200 is operable to determine whether a stopping criteria has been met (see FIG. 16 for detailed discussion of an exemplary ways to perform the determine step 1316). At step 1318, the apparatus 1200 is operable based on the determination of step 1316 that the stopping criteria has not been met to repeat the perform step 1312, the third construct step 1314, and the determine step 1316. At step 1320, the apparatus 1300 is operable based on the determination of step 1316 that the stopping criteria has been met to return the updated classification model $M_c$.

Referring to FIG. 14, there is a flowchart of a method 1400 performed in the apparatus 1200 to implement technique 2' (TABLE #8's DS process—FIG. 13's step 1312a) in accordance with an embodiment of the present disclosure. At step 1402, the apparatus 1200 is operable to obtain the current version of the classification model $M_c(x)$, the unlabeled set of available documents D, the batch size k, a similarity function $S(x_1, x_2)$, and a similarity threshold t. At step 1404, the apparatus 1200 is operable to sort the unlabeled set of available documents D using a sorting function to obtain sorted indices I of the unlabeled set of available documents D. The sorting function can be any type of sorting function such as, for example, (i) a distance from a hyperplane based on smallest to greatest when the classification model $M_c(x)$ is a SVM classification model; (ii) a distance from a hyperplane based on greatest to smallest when the classification model $M_c(x)$ is a SVM classification model; (iii) a random sorting function: (iv) an entropy function; (v) a least confidence function; and (VI) a committee disagreement function. At step 1406, the apparatus 1200 is operable to insert the sorted document having a nearest sorted index I[1] of the sorted unlabeled set of available documents D into the new batch of unlabeled instances $B_c$. At step 1408, the apparatus 1200 is operable to obtain sorted indices I of the sorted unlabeled set of available documents D that have a similarity score $S(X_{I[1]}, X) \geq t$ with respect to the inserted document I[1]. At step 1410, the apparatus 1200 is operable to remove the documents with the obtained sorted indices I from the sorted unlabeled set of available documents D. At step 1412, the apparatus 1200 is operable to repeat the insert step 1406, the second obtain step 1408, and the remove step 1410 until insert k documents into the new batch of unlabeled instances $B_c$.

Referring to FIG. 15, there is a flowchart of a method 1500 performed in the apparatus 1200 to implement technique 2' (TABLE #8's BPS process—FIG. 13's step 1312a) in accordance with an embodiment of the present disclosure. At step 1502, the apparatus 1200 is operable to obtain the current version of the classification model $M_c(x)$, the unlabeled set of available documents D, the batch size k, a similarity function $S(x_1, x_2)$, a similarity threshold t, and a probability distribution function P(x). The probability distribution function P(x) assigns a selection probably to each document in D. The sum of the probabilities for each document in D must equal 1. For example, a specific probability function P(x) can be a normalized, inverse distance for SVM At step 1504, the apparatus 1200 is operable to construct a probability vector w based on an probability distribution function P(x) for each document from the unlabeled set of available documents D. At step 1506, the apparatus 1200 is operable to choose a document I[1] from the unlabeled set of available documents D using the weight w of the probability vector. At step 1508, the apparatus 1200 is operable to insert the chosen document I[1] into the new batch of unlabeled instances $B_c$. At step 1510, the apparatus 1200 is operable to obtain sorted indices I of the sorted unlabeled set of available documents D that have a similarity score $S(X_{I[1]}, X) \geq t$ with respect to the inserted document I[1]. At step 1512, the apparatus 1200 is operable to remove the documents with the obtained sorted indices I from the unlabeled set of available documents D. At step 1514, the apparatus 1200 is operable to re-normalize the weight vector as documents have been removed from the sorted unlabeled set of available document D. At step 1516, the apparatus 1200 is operable to repeat the choose step 1506, the insert step 1508, the second obtain step 1510, the remove step 1512, and the re-normalize step 1514 until select the new batch of unlabeled instances $B_c$.

Referring to FIG. 16 is a flowchart of a method performed in the apparatus shown in FIG. 6 to implement technique 3' (TABLE #9—FIG. 13's step 1316) in accordance with an embodiment of the present disclosure. In this embodiment, the apparatus 1200 determines whether the stopping criteria has been met by implementing the method 1600 (e.g., Accumulated History of Scores process 1600). At step 1602, the apparatus 1200 is operable to obtain the current version of the classification model $M_c(x)$, the unlabeled set of available documents D and the extended training data documents $D_c$ referred to as the total set of documents $D_T$, an accumulation function $A(S_c, S_{c-1}, \ldots, S_1)$, and a stopping threshold $t_{stop}$. At step 1604, the apparatus 1200 is operable to construct a score vector $S_c$ using the current classification model $M_c(x)$ and the unlabeled set of documents D. At step 1606, the apparatus 1200 is operable to combine a current score vector $S_c$ with previous score vectors $(S_{c-1}, \ldots, S_1)$ using the accumulation function $A(S_c, S_{c-1}, \ldots, S_1)$ to obtain a stability value(s). At step 1608, the apparatus 1200 is operable to compare the stability value s to the stopping threshold $t_{stop}$ to determine whether $t_{stop} \leq S$ which indicates that the stopping criteria has been met. At step 1610, the apparatus 1200 is operable to based on the determination that the stopping criteria has not been met, store the current score vector $S_c$ to memory as a previous score vector $S_{c-1}$.

It should be appreciated that different embodiments of the present disclosure may be implemented using different combinations of software, firmware, and/or hardware. Thus, the techniques described herein and shown in the figures can be implemented using code and data stored and executed on one or more electronic devices (e.g., computer). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "an opening" includes examples having two or more such "openings" unless the context clearly indicates otherwise.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method comprising A+B+C include embodiments where a method consists of A+B+C, and embodiments where a method consists essentially of A+B+C.

Although multiple embodiments of the present disclosure have been illustrated in the accompanying Drawings and described in the foregoing Detailed Description, it should be understood that the disclosure is not limited to the disclosed embodiments, but is capable of numerous rearrangements, modifications and substitutions without departing from the disclosure as set forth and defined by the following claims.

REFERENCES

[1] D. W. Henry, "Predictive coding: Explanation and analysis of judicial impact and acceptance compared to established e-commerce methodology," http://www.dwhenry.com/files/Predictive%20Coding.pdf, [Online: Accessed 23 Jun. 2015].

[2] S. Tong and D. Koller, "Support vector machine active learning with application to text classification," vol. 2, 2001, pp. 45-66.

[3] S. Tong and E. Chang, "Support vector machine active learning for image retrieval," in Proceedings of the ninth ACM international conference on Multimedia. ACM, 2001, pp. 107-118.

[4] S. Dasgupta, "Coarse sample complexity bounds for active learning," in Advances in Neural Information Processing Systems 18 [Neural Information Processing Systems, NIPS 2005, Dec. 5-8, 2005, Vancouver, British Columbia, Canada], 2005, pp. 235-242.

[5] K. Brinker, "Incorporating diversity in active learning with support vector machines," in ICML, vol. 3, 2003, pp. 59-66.

[6] G. V. Cormack and M. R. Grossman, "Evaluation of machine-learning protocols for technology-assisted review in electronic discovery," in Proceedings of the 37th international ACM SIGIR conference on Research & development in information retrieval. ACM, 2014, pp. 153-162.

[7] G. Salton and C. Buckley, "Improving retrieval performance by relevance feedback," Readings in information retrieval, vol. 24, no. 5, pp. 355-363, 1997.

[8] D. D. Lewis and W. A. Gale, "A sequential algorithm for training text classifiers," in Proceedings of the 17th annual international ACM SIGIR conference on Research and development in information retrieval. Springer-Verlag New York, Inc., 1994, pp. 3-12.

[9] I. Dagan and S. P. Engelson, "Committee-based sampling for training probabilistic classifiers," in Proceedings of the Twelfth International Conference on Machine Learning, 1995, pp. 150-157.

[10] T. Scheffer, C. Decomain, and S. Wrobel, "Active hidden markov models for information extraction," in Advances in Intelligent Data Analysis. Springer, 2001, pp. 309-318.

[11] A. Culotta and A. McCallum, "Reducing labeling effort for structured prediction tasks," in AAAI, 2005, pp. 746-751.

[12] H. S. Seung, M. Opper, and H. Sompolinsky, "Query by committee," in Proceedings of the fifth annual workshop on Computational learning theory. ACM, 1992, pp. 287-294.

[13] R. Nowak, "Noisy generalized binary search," in Advances in neural information processing systems, 2009, pp. 1366-1374.

[14] G. Schohn and D. Cohn, "Less is more: Active learning with support vector machines," in ICML. Citeseer, 2000, pp. 839-846.

[15] M. K. Warmuth, J. Liao, G. R̈atsch, M. Mathieson, S. Putta, and C. Lemmen, "Active learning with support vector machines in the drug discovery process," Journal of Chemical Information and Computer Sciences, vol. 43, no. 2, pp. 667-673, 2003.

[16] S. Dasgupta, "Analysis of a greedy active learning strategy," in Advances in Neural Information Processing Systems 17 [Neural Information Processing Systems, NIPS 2004, Dec. 13-18, 2004, Vancouver, British Columbia, Canada], 2004, pp. 337-344.

[17] Y. Chen and A. Krause, "Near-optimal batch mode active learning and adaptive submodular optimization," in Proceedings of the 30th International Conference on Machine Learning, 2013, pp. 160-168.

[18] A. Guillory and J. A. Bilmes, "Active semi-supervised learning using submodular functions," in UAI 2011, Proceedings of the Twenty-Seventh Conference on Uncertainty in Artificial Intelligence, Barcelona, Spain, Jul. 14-17, 2011, 2011, pp. 274-282.

[19] D. Golovin and A. Krause, "Adaptive submodularity: A new approach to active learning and stochastic optimization." in COLT, 2010, pp. 333-345.

[20] A. Asadpour, H. Nazerzadeh, and A. Saberi, "Stochastic submodular maximization," in Internet and Network Economics. Springer, 2008, pp. 477-489.

[21] S. Ertekin, J. Huang, L. Bottou, and L. Giles, "Learning on the border: active learning in imbalanced data classification," in Proc. of ACM Int. Conf. on Knowledge Management, 2007, pp. 127-136.

[22] S. Ertekin, J. Huang, and C. L. Giles, "Active learning for class imbalance problem," in Proceedings of the 30th annual international ACM SIGIR conference on Research and development in information retrieval. ACM, 2007, pp. 823-824.

[23] J. Zhu and E. H. Hovy, "Active learning for word sense disambiguation with methods for addressing the class imbalance problem." in EMNLP-CoNLL, vol. 7, 2007, pp. 783-790.

[24] J. Z. H. Wang and E. Hovy, "Learning a stopping criterion for active learning for word sense disambiguation and text classification," in Third International Joint Conf. on Natural Language Processing, 2008, p. 366.

[25] J. Zhu, H. Wang, and E. Hovy, "Multi-criteria-based strategy to stop active learning for data annotation," in Proceedings of the 22nd International Conference on Computational Linguistics-Volume 1. Association for Computational Linguistics, 2008, pp. 1129-1136.

[26] F. Laws and H. Schatze, "Stopping criteria for active learning of named entity recognition," in Proceedings of the 22nd International Conference on Computational Linguistics-Volume 1. Association for Computational Linguistics, 2008, pp. 465-472.

[27] M. Ghayoomi, "Using variance as a stopping criterion for active learning of frame assignment," in Proceedings of the NAACL HLT 2010 Workshop on Active Learning for Natural Language Processing. Association for Computational Linguistics, 2010, pp. 1-9.

[28] M. Bloodgood and K. Vijay-Shanker, "A method for stopping active learning based on stabilizing predictions and the need for user-adjustable stopping," in Proceedings of the Thirteenth Conference on Computational Natural Language Learning. Association for Computational Linguistics, 2009, pp. 39-47.

[29] J. Cohen, "A coefficient of agreement for nominal scales," Educational and psychological measurement, vol. 20, no. 1, pp. 37-46, 1960.

[30] M. Bloodgood and J. Grothendieck, "Analysis of stopping active learning based on stabilizing predictions," arXiv preprint arXiv:1504.06329, 2015.

[31] H. L. Roitblat, A. Kershaw, and P. Oot, "Document categorization in legal electronic discovery: computer classification vs. manual review," Journal of the American Society for Information Science and Technol-ogy, vol. 61, no. 1, pp. 70-80, 2010.

[32] M. Gabriel, C. Paskach, and D. Sharpe, "The challenge and promise of predictive coding for privilege," in ICAIL 2013 DESI V Workshop, 2013.

[33] M. R. Grossman and G. V. Cormak, "Inconsistent responsiveness determination in document review: Difference of opinion or human error," Pace L. Rev., vol. 32, p. 267, 2012.

[34] M. R. Grossman and G. V. Cormack, "Technology-assisted review in e-discovery can be more effective and more efficient than exhaustive manual review," Rich. JL & Tech., vol. 17, p. 1, 2010.

[35] J. Halskov and H. Takeda, "When to stop reviewing documents in ediscovery cases: The lit i view quality monitor and endpoint detector," in Proc of the Fifth International Conference on Management of Emergent Digital EcoSystems, ser. MEDES '13, 2013, pp. 227-232.

[36] N. Littlestone and M. K. Warmuth, "The weighted majority algorithm," Information and Computation, vol. 108, pp. 212-261, 1994.

The contents of reference nos. 1-36 are hereby incorporated herein by reference for all purposes.

The invention claimed is:

1. An apparatus configured to implement batch-mode active learning for technology-assisted review (TAR) of documents, the apparatus comprising:
    a processor; and,
    a memory that stores processor-executable instructions, wherein the processor interfaces with the memory to execute the processor-executable instructions, whereby the apparatus is operable to:
        obtain an unlabeled set of documents D;
        obtain a batch size k;
        construct a first batch of k documents D;

obtain labels for the first batch of k documents D, wherein the labeled first batch of k documents D are referred to as training data documents;

construct a hyperplane $h_c(x)$ using the labeled first batch of k documents D;

perform an iteration of active learning using a support vector machine (SVM) to:
  (i) select a new batch of unlabeled instances $B_c$ using a current version of the hyperplane $h_c(x)$, an unlabeled set of available documents D, and the batch size k, wherein, to implement a Diversity Sampler process to select the new batch of unlabeled instances $B_c$, the apparatus is further operable to:
    obtain the current version of the hyperplane $h_c(x)$, the unlabeled set of available documents D, the batch size k, and a cosine similarity threshold t,
    sort the unlabeled set of available documents D in increasing order based on each of the documents absolute distance from the current version of the hyperplane $h_c(x)$ to obtain sorted indices I of the unlabeled set of available documents D,
    insert the sorted document having a nearest sorted index I[1] of the sorted unlabeled set of available documents D into the new batch of unlabeled instances $B_c$,
    obtain sorted indices I of the sorted unlabeled set of available documents D that have a cosine angle ≥t with respect to the inserted document I[1],
    remove the documents with the obtained sorted indices I from the sorted unlabeled set of available documents D, and
    repeat the insert operation, the second obtain operation, and the remove operation until insert k documents into the new batch of unlabeled instances $B_c$;
  (ii) obtain labels for the new batch of unlabeled instances $B_c$;
  (iii) add the labeled new batch of instances $B_c$ to a current version of the training data documents referred to as extended training data documents $D_c$;

construct an updated hyperplane h(x) using the extended training data documents $D_c$;

determine whether a stopping criteria has been met;

based on the determination that the stopping criteria has not been met, repeat the perform operation, the third construct operation, and the determine operation; and, based on the determination that the stopping criteria has been met, return the updated hyperplane h(x).

2. The apparatus of claim 1, wherein the apparatus is further operable to determine whether the stopping criteria has been met by implementing a Kappa agreement which is a measure of how much the current version of the hyperplane $h_c(x)$ and the updated hyperplane h(x) agree on respective prediction of labels of a chosen set of the documents D.

3. The apparatus of claim 1, wherein the apparatus is further operable to determine whether the stopping criteria has been met by implementing an Accumulated History of Scores process to:
  obtain the current version of the hyperplane h(x), the unlabeled set of available documents D and the extended training data documents $D_c$ referred to as the total set of documents $D_T$, an accumulation function $A(S_c, S_{c-1}, \ldots, S_1)$, and a stopping threshold $t_{stop}$;
  construct a score vector $S_c$ using the current hyperplane h(x) and the unlabeled set of documents D;
  combine a current score vector $S_c$ with previous score vectors $(S_{c-1}, \ldots, S_1)$ using the accumulation function $A(S_c, S_{c-1}, \ldots, S_1)$ to obtain a stability value(s);
  compare the stability value s to the stopping threshold tstop to determine whether $t_{stop} \le S$ which indicates that the stopping criteria has been met; and
  based on the determination that the stopping criteria has not been met, store the current score vector Sc to memory as a previous score vector $S_{c-1}$.

4. The apparatus of claim 1, wherein the apparatus is further operable to determine whether the stopping criteria has been met by implementing a Cohen's Kappa process to:
  obtain the current version of the hyperplane h(x), the unlabeled set of available documents D and the extended training data documents Dc referred to as the total set of documents $D_T$, and a stopping threshold $t_{stop}$;
  construct a score vector Sc using the current hyperplane h(x) and the total set of documents $D_T$;
  retrieve a previous score vector $S_{c-1}$;
  obtain a set of documents $D_{+c}$ from the documents $D_T$ that have a positive score in $S_c$;
  obtain a set of documents $D_{-c}$ from the documents $D_T$ that have a negative score in $S_c$
  obtain a set of documents $D_{+(c-1)}$ from the documents $D_T$ that have a positive score in $S_{c-1}$;
  obtain a set of documents $D_{-(c-1)}$ from the documents $D_T$ that have a negative score in $S_{c-1}$;
  obtain a set of documents in common, $D_+$, between $D_{+c}$ and $D_{+(c-1)}$;
  obtain a set of documents in common, $D_-$, between $D_{-c}$ and $D_{-(c-1)}$;
  obtain a probability, $P_+$, of a document having positive score in both score vectors Sc and $S_{c-1}$ by counting a number of documents, $N_+$, in $D_+$ divided by the total number of documents, N, in D;
  obtain a probability, $P_-$, of a document having negative score in both score vectors Sc and $S_{c-1}$, by counting a number of documents, $N_-$, in $D_-$ divided by the total number of documents, N, in D;
  obtain a value Ao as $P_+ + P_-$;
  obtain a probability, $P_{+c}$, by counting a number of documents, $N_{+c}$, in $D_{+c}$ divided by the number of documents, N, in D;
  obtain a probability, $P_{-c}$, by counting a number of documents, $N_{-c}$, in $D_{-c}$ divided by the number of documents, N, in D;
  obtain a probability, $P_{+(c-1)}$, by counting a number of documents, $N_{+(c-1)}$, in $D_{+(c-1)}$ divided by the number of documents, N, in D;
  obtain a probability, P−(c−1), by counting a number of documents, $N_{-(c-1)}$, in $D_{-(c-1)}$ divided by the number of documents, N, in D;
  obtain a value Ae as a probability of obtaining a positive document, $P_{+c} * P_{+(c-1)}$, plus a probability of obtaining a negative document, $P_{-c} * P_{-(c-1)}$;
  obtain a Kappa value L as $A_o - A_e$ divided by $(1 - A_o)$;
  compare the Kappa value L to the stopping threshold tstop to determine whether $t_{stop} \le A_o - A_e / 1 - A_e$ which indicates that the stopping criteria has been met; and,
  based on the determination that the stopping criteria has not been met, store the score vector Sc to memory as a previous score vector $S_{c-1}$.

5. The apparatus of claim 1, wherein the apparatus is further operable to:
  discriminate, using the updated hyperplane h(x), remaining documents from the unlabeled set of available documents D where each of the remaining documents are classified as relevant or non-relevant.

6. A method in an apparatus for implementing batch-mode active learning for technology-assisted review (TAR) of documents, the method comprising:
  obtaining an unlabeled set of documents D;
  obtaining a batch size k;
  constructing a first batch of k documents D;
  obtaining labels for the first batch of k documents D, wherein the labeled first batch of k documents D are referred to as training data documents;
  constructing a hyperplane $h_c(x)$ using the labeled first batch of k documents D;
  performing an iteration of active learning using a support vector machine (SVM), wherein the performed iteration comprises:
    (i) selecting a new batch of unlabeled instances $B_c$ using a current version of the hyperplane $h_c(x)$, an unlabeled set of available documents D, and the batch size k, wherein the apparatus is further operable to implement a Diversity Sampler process or a Biased Probabilistic Sampler process to select the new batch of unlabeled instances $B_c$;
    (ii) obtaining labels for the new batch of unlabeled instances $B_c$;
    (iii) adding the labeled new batch of instances $B_c$ to a current version of the training data documents referred to as extended training data documents $D_c$;
  constructing an updated hyperplane h(x) using the extended training data documents Dc;
  determining whether a stopping criteria has been met by implementing an Accumulated History of Scores process comprising:
    obtaining the current version of the hyperplane h(x), the unlabeled set of available documents D and the extended training data documents $D_c$ referred to as the total set of documents $D_T$, an accumulation function $A(S_c, S_{c-1}, \ldots, S_1)$, and a stopping threshold $t_{stop}$;
    constructing a score vector $S_c$ using the current hyperplane h(x) and the total set of documents $D_T$;
    combining a current score vector $S_c$ with previous score vectors $(S_{c-1}, \ldots, S_1)$ using the accumulation function $A(S_c, S_{c-1}, \ldots, S_1)$ to obtain a stability value(s),
    comparing the stability value s to the stopping threshold $t_{stop}$ to determine whether $t_{stop} \leq S$ which indicates that the stopping criteria has been met, and
    based on the determination that the stopping criteria has not been met, storing the current score vector $S_c$ to memory as a previous score vector $S_{c-1}$;
  based on the determination that the stopping criteria has not been met, repeating the performing step, the third constructing step, and the determining step; and,
  based on the determination that the stopping criteria has been met, returning the updated hyperplane h(x).

7. The method of claim 6, wherein the Diversity Sampler process comprises:
  obtaining the current version of the hyperplane $h_c(x)$, the unlabeled set of available documents D, the batch size k, and a cosine similarity threshold t;
  sorting the unlabeled set of available documents D in increasing order based on each of the documents absolute distance from the current version of the hyperplane $h_c(x)$ to obtain sorted indices I of the unlabeled set of available documents D;
  inserting the sorted document having a nearest sorted index I[1] of the sorted unlabeled set of available documents D into the new batch of unlabeled instances $B_c$;
  obtaining sorted indices I of the sorted unlabeled set of available documents D that have a cosine angle ≥t with respect to the inserted document I[1];
  removing the documents with the obtained sorted indices I from the sorted unlabeled set of available documents D; and
  repeating the insert operation, the second obtain operation, and the remove operation until insert k documents into the new batch of unlabeled instances $B_c$.

8. The method of claim 6, wherein the Biased Probabilistic Sampler process comprises:
  obtaining the current version of the hyperplane $h_c(x)$, the unlabeled set of available documents D, the batch size k, and a cosine similarity threshold t;
  constructing a weight vector w based on an inverse operation of a distance from the current version of the hyperplane $h_c(x)$ for each document from the unlabeled set of available documents D;
  normalizing the weight vector w to convert the weight vector w into a probability vector;
  choosing a document I[1] from the unlabeled set of available documents D using the weight w of the probability vector;
  inserting the chosen document I[1] into the new batch of unlabeled instances $B_c$;
  obtaining sorted indices I of the remaining unlabeled set of available documents D that have a cosine angle ≥t with respect to the chosen document I[1];
  removing the documents with the obtained sorted indices I from the unlabeled set of available documents D;
  re-normalizing the weight vector as documents have been removed from the sorted unlabeled set of available documents D; and,
  repeating the choosing step, the inserting step, the second obtaining step, the removing step, and the re-normalizing step until select the new batch of unlabeled instances $B_c$.

9. The method of claim 6, wherein the step of determining whether the stopping criteria has been met further comprises implementing a Kappa agreement which is a measure of how much the current version of the hyperplane $h_c(x)$ and the updated hyperplane h(x) agree on respective prediction of labels of a chosen set of the documents D.

10. The method of claim 6, further comprising:
  discriminating, using the updated hyperplane h(x), remaining documents from the unlabeled set of available documents D where each of the remaining documents are classified as relevant or non-relevant.

11. An apparatus configured to implement batch-mode active learning for technology-assisted review (TAR) of documents, the apparatus comprising:
  a processor; and,
  a memory that stores processor-executable instructions, wherein the processor interfaces with the memory to execute the processor-executable instructions, whereby the apparatus is operable to:
    obtain an unlabeled set of documents D;
    obtain a batch size k;
    construct a first batch of k documents D;

obtain labels for the first batch of k documents D, wherein the labeled first batch of k documents D are referred to as training data documents;

construct a hyperplane $h_c(x)$ using the labeled first batch of k documents D;

perform an iteration of active learning using a support vector machine (SVM) to:
(i) select a new batch of unlabeled instances Bc using a current version of the hyperplane $h_c(x)$, an unlabeled set of available documents D, and the batch size k, wherein, to implement a Biased Probabilistic Sampler process to select the new batch of unlabeled instances $B_c$, the apparatus is further operable to:

obtain the current version of the hyperplane $h_c(x)$, the unlabeled set of available documents D, the batch size k, and a cosine similarity threshold t, construct a weight vector w based on an inverse operation of a distance from the current version of the hyperplane $h_c(x)$ for each document from the unlabeled set of available documents D, normalize the weight vector w to convert the weight vector w into a probability vector, choose a document I[1] from the unlabeled set of available documents D using the weight w of the probability vector, insert the chosen document I[1] into the new batch of unlabeled instances $B_c$, obtain sorted indices I of the remaining unlabeled set of available documents D that have a cosine angle $\geq t$ with respect to the chosen document I[1], remove the documents with the obtained sorted indices I from the unlabeled set of available documents D, re-normalize the weight vector as documents have been removed from the sorted unlabeled set of available documents D, and repeat the choose operation, the insert operation, the second obtain operation, the remove operation, and the re-normalize operation until select the new batch of unlabeled instances $B_c$;

(ii) obtain labels for the new batch of unlabeled instances $B_c$;

(iii) add the labeled new batch of instances $B_c$ to a current version of the training data documents referred to as extended training data documents $D_c$;

construct an updated hyperplane h(x) using the extended training data documents $D_c$;

determine whether a stopping criteria has been met;

based on the determination that the stopping criteria has not been met, repeat the perform operation, the third construct operation, and the determine operation; and, based on the determination that the stopping criteria has been met, return the updated hyperplane h(x).

12. The apparatus of claim 11, wherein the apparatus is further operable to determine whether the stopping criteria has been met by implementing a Kappa agreement which is a measure of how much the current version of the hyperplane $h_c(x)$ and the updated hyperplane h(x) agree on respective prediction of labels of a chosen set of the documents D.

13. The apparatus of claim 11, wherein the apparatus is further operable to determine whether the stopping criteria has been met by implementing an Accumulated History of Scores process to:

obtain the current version of the hyperplane h(x), the unlabeled set of available documents D and the extended training data documents $D_c$ referred to as the total set of documents $D_T$, an accumulation function $A(S_c, S_{c-1}, \ldots, S_1)$, and a stopping threshold $t_{stop}$;

construct a score vector $S_c$ using the current hyperplane h(x) and the unlabeled set of documents D;

combine a current score vector $S_c$ with previous score vectors $(S_{c-1}, \ldots, S_1)$ using the accumulation function $A(S_c, S_{c-1}, \ldots, S_1)$ to obtain a stability value(s);

compare the stability value s to the stopping threshold tstop to determine whether $t_{stop} \leq S$ which indicates that the stopping criteria has been met; and based on the determination that the stopping criteria has not been met, store the current score vector Sc to memory as a previous score vector $S_{c-1}$.

14. The apparatus of claim 11, wherein the apparatus is further operable to determine whether the stopping criteria has been met by implementing a Cohen's Kappa process to:

obtain the current version of the hyperplane h(x), the unlabeled set of available documents D and the extended training data documents Dc referred to as the total set of documents $D_T$, and a stopping threshold $t_{stop}$;

construct a score vector Sc using the current hyperplane h(x) and the total set of documents $D_T$;

retrieve a previous score vector $S_{c-1}$;

obtain a set of documents $D_{+c}$ from the documents $D_T$ that have a positive score in $S_c$;

obtain a set of documents $D_{-c}$ from the documents $D_T$ that have a negative score in $S_c$ obtain a set of documents $D_{+(c-1)}$ from the documents $D_T$ that have a positive score in $S_{c-1}$;

obtain a set of documents $D_{-(c-1)}$ from the documents $D_T$ that have a negative score in $S_{c-1}$;

obtain a set of documents in common, $D_+$, between $D_{+c}$ and $D_{+(c-1)}$;

obtain a set of documents in common, $D_-$, between $D_{-c}$ and $D_{-(c-1)}$;

obtain a probability, $P_+$, of a document having positive score in both score vectors Sc and $S_{c-1}$ by counting a number of documents, $N_+$, in $D_+$ divided by the total number of documents, N, in D;

obtain a probability, $P_-$, of a document having negative score in both score vectors Sc and $S_{c-1}$, by counting a number of documents, $N_-$, in $D_-$ divided by the total number of documents, N, in D;

obtain a value Ao as $P_+ + P_-$;

obtain a probability, $P_{+c}$, by counting a number of documents, $N_{+c}$, in $D_{+c}$ divided by the number of documents, N, in D;

obtain a probability, $P_{-c}$, by counting a number of documents, $N_{-c}$, in $D_{-c}$ divided by the number of documents, N, in D;

obtain a probability, $P_{+(c-1)}$, by counting a number of documents, $N_{+(c-1)}$, in $D_{+(c-1)}$ divided by the number of documents, N, in D;

obtain a probability, P−(c−1), by counting a number of documents, $N_{31\ (c-1)}$, in $D_{-(c-1)}$ divided by the number of documents, N, in D;

obtain a value Ae as a probability of obtaining a positive document, $P_{+c}*P_{+(c-1)}$, plus a probability of obtaining a negative document, $P_{-c}*P_{-(c-1)}$;

obtain a Kappa value L as $A_o-A_e$ divided by $(1-A_o)$;

compare the Kappa value L to the stopping threshold tstop to determine whether $t_{stop} \leq A_o-A_e/1-A_e$ which indicates that the stopping criteria has been met; and, based on the determination that the stopping criteria has not been met, store the score vector Sc to memory as a previous score vector $S_{c-1}$.

15. The apparatus of claim 11, wherein the apparatus is further operable to:

discriminate, using the updated hyperplane h(x), remaining documents from the unlabeled set of available documents D where each of the remaining documents are classified as relevant or non-relevant.

16. A method in an apparatus for implementing batch-mode active learning for technology-assisted review (TAR) of documents, the method comprising:

obtaining an unlabeled set of documents D;

obtaining a batch size k;

constructing a first batch of k documents D;

obtaining labels for the first batch of k documents D, wherein the labeled first batch of k documents D are referred to as training data documents;

constructing a hyperplane $h_c(x)$ using the labeled first batch of k documents D;

performing an iteration of active learning using a support vector machine (SVM), wherein the performed iteration comprises:

(i) selecting a new batch of unlabeled instances $B_c$ using a current version of the hyperplane $h_c(x)$, an unlabeled set of available documents D, and the batch size k, wherein the apparatus is further operable to implement a Diversity Sampler process or a Biased Probabilistic Sampler process to select the new batch of unlabeled instances $B_c$;

(ii) obtaining labels for the new batch of unlabeled instances $B_c$;

(iii) adding the labeled new batch of instances $B_c$ to a current version of the training data documents referred to as extended training data documents $D_c$;

constructing an updated hyperplane h(x) using the extended training data documents Dc;

determining whether a stopping criteria has been met by implementing a Cohen's Kappa process comprising:

obtaining the current version of the hyperplane h(x), the unlabeled set of available documents D and the extended training data documents $D_c$ referred to as the total set of documents $D_T$, and a stopping threshold $t_{stop}$, constructing a score vector $S_c$ using the current hyperplane h(x) and the total set of documents $D_T$, retrieving a previous score vector $S_{c-1}$, obtaining a set of documents $D_{+c}$ from the documents $D_T$ that have a positive score in $S_c$, obtaining a set of documents $D_{-c}$ from the documents $D_T$ that have a negative score in $S_c$ obtaining a set of documents $D_{+(c-1)}$ from the documents $D_T$ that have a positive score in $S_{c-1}$, obtaining a set of documents $D_{-(c-1)}$ from the documents $D_T$ that have a negative score in $S_{c-1}$, obtaining a set of documents in common, $D_+$, between $D_{+c}$ and $D_{+(c-1)}$, obtaining a set of documents in common, $D_-$, between $D_{-c}$ and $D_{-(c-1)}$, obtaining a probability, $P_+$, of a document having positive score in both score vectors $S_c$ and $S_{c-1}$ by counting a number of documents, $N_+$, in $D_+$ divided by the total number of documents, N, in D, obtaining a probability, P-, of a document having negative score in both score vectors $S_c$ and $S_{c-1}$, by counting a number of documents, $N_-$, in $D_-$ divided by the total number of documents, N, in D, obtaining a value $A_o$ as $P_+ + P_-$, obtaining a probability, $P_{+c}$, by counting a number of documents, $N_{+c}$, in $D_{+c}$ divided by the number of documents, N, in D, obtaining a probability, $P_{-c}$, by counting a number of documents, $N_{-c}$, in $D_{-c}$ divided by the number of documents, N, in D, obtaining a probability, $P_{+(c-1)}$, by counting a number of documents, $N_{+(c-1)}$, in $D_{+(c-1)}$ divided by the number of documents, N, in D, obtaining a probability, $P_{-(c-1)}$, by counting a number of documents, $N_{-(c-1)}$, in $D_{-(c-1)}$ divided by the number of documents, N, in D, obtaining a value $A_e$ as a probability of obtaining a positive document, $P_{+c} * P_{+(c-1)}$, plus a probability of obtaining a negative document, $P_{-c}*P_{-(c-1)}$, obtaining a Kappa value L as $A_o-A_e$ divided by $(1-A_o)$, comparing the Kappa value L to the stopping threshold tstop to determine whether $t_{stop} \leq A_o-A_e/1-A_e$ which indicates that the stopping criteria has been met, and based on the determination that the stopping criteria has not been met, storing the score vector Sc to memory as a previous score vector $S_{c-1}$;

based on the determination that the stopping criteria has not been met, repeating the performing step, the third constructing step, and the determining step; and based on the determination that the stopping criteria has been met, returning the updated hyperplane h(x).

17. The method of claim 16, wherein the Diversity Sampler process comprises:

obtaining the current version of the hyperplane $h_c(x)$, the unlabeled set of available documents D, the batch size k, and a cosine similarity threshold t;

sorting the unlabeled set of available documents D in increasing order based on each of the documents absolute distance from the current version of the hyperplane $h_c(x)$ to obtain sorted indices I of the unlabeled set of available documents D;

inserting the sorted document having a nearest sorted index I[1] of the sorted unlabeled set of available documents D into the new batch of unlabeled instances $B_c$;

obtaining sorted indices I of the sorted unlabeled set of available documents D that have a cosine angle $\geq t$ with respect to the inserted document I[1];

removing the documents with the obtained sorted indices I from the sorted unlabeled set of available documents D; and repeating the insert operation, the second obtain operation, and the remove operation until insert k documents into the new batch of unlabeled instances $B_c$.

18. The method of claim 16, wherein the Biased Probabilistic Sampler process comprises:

obtaining the current version of the hyperplane $h_c(x)$, the unlabeled set of available documents D, the batch size k, and a cosine similarity threshold t;

constructing a weight vector w based on an inverse operation of a distance from the current version of the hyperplane $h_c(x)$ for each document from the unlabeled set of available documents D;

normalizing the weight vector w to convert the weight vector w into a probability vector;

choosing a document I[1] from the unlabeled set of available documents D using the weight w of the probability vector;

inserting the chosen document I[1] into the new batch of unlabeled instances $B_c$;

obtaining sorted indices I of the remaining unlabeled set of available documents D that have a cosine angle $\geq t$ with respect to the chosen document I[1];

removing the documents with the obtained sorted indices I from the unlabeled set of available documents D;

re-normalizing the weight vector as documents have been removed from the sorted unlabeled set of available documents D; and, repeating the choosing step, the inserting step, the second obtaining step, the removing step, and the re-normalizing step until select the new batch of unlabeled instances $B_c$.

19. The method of claim 16, wherein the step of determining whether the stopping criteria has been met further comprises implementing a Kappa agreement which is a measure of how much the current version of the hyperplane $h_c(x)$ and the updated hyperplane $h(x)$ agree on respective prediction of labels of a chosen set of the documents D.

20. The method of claim 16, further comprising:

discriminating, using the updated hyperplane $h(x)$, remaining documents from the unlabeled set of available documents D where each of the remaining documents are classified as relevant or non-relevant.

* * * * *